US011345624B2

(12) United States Patent
Brown et al.

(10) Patent No.: US 11,345,624 B2
(45) Date of Patent: May 31, 2022

(54) PHOSPHORUS RELEASE REACTOR FOR WATER TREATMENT

(71) Applicant: Des Moines Metropolitan Wastewater Reclamation Authority, Des Moines, IA (US)

(72) Inventors: Patrick Anderson Brown, Bondurant, IA (US); Eric Anthony Evans, Ames, IA (US)

(73) Assignee: Des Moines Metropolitan Wastewater Reclamation Authority, Des Moines, IA (US)

( * ) Notice: Subject to any disclaimer, the term of this patent is extended or adjusted under 35 U.S.C. 154(b) by 193 days.

(21) Appl. No.: 16/821,362

(22) Filed: Mar. 17, 2020

(65) Prior Publication Data
US 2020/0216344 A1    Jul. 9, 2020

Related U.S. Application Data

(62) Division of application No. 16/213,218, filed on Dec. 7, 2018, now Pat. No. 10,968,127.
(Continued)

(51) Int. Cl.
*C02F 3/28* (2006.01)
*C02F 101/20* (2006.01)
(Continued)

(52) U.S. Cl.
CPC ............. *C02F 3/284* (2013.01); *C02F 3/286* (2013.01); *C02F 3/305* (2013.01); *C02F 3/308* (2013.01);
(Continued)

(58) Field of Classification Search
CPC .......... C02F 3/284; C02F 3/286; C02F 3/305; C02F 3/308; C02F 3/1221; C02F 3/301;
(Continued)

(56) References Cited

U.S. PATENT DOCUMENTS 4,173,531 A    11/1979    Matsch et al.
4,956,100 A  *  9/1990   Mikkleson ............. C02F 3/207
                                                                 210/776
(Continued)

FOREIGN PATENT DOCUMENTS

CA    2179575 C    3/2000
EP    0823887 B1   3/2002
(Continued)

*Primary Examiner* — Nam X Nguyen
*Assistant Examiner* — Julia L. Wun
(74) *Attorney, Agent, or Firm* — McKee, Voorhees & Sease, PLC

(57) ABSTRACT

The invention relates to treatment of microorganisms from an activated sludge process operating with enhanced biological phosphorus removal in a reactor with baffles or other devices to induce similar plug-flow effort, designed to optimally release phosphorus and/or magnesium from the microorganisms with or without chemical addition. Further, the disclosure relates to a process designed to produce both a lower solids, phosphorus and magnesium enriched liquid stream and a higher solids, phosphorus and magnesium enriched stream. The reactor operates to give optimal performance by operating in a plug-flow mode.

19 Claims, 9 Drawing Sheets

Related U.S. Application Data

(60) Provisional application No. 62/608,286, filed on Dec. 20, 2017.

(51) Int. Cl.
*C02F 101/10* (2006.01)
*C02F 3/30* (2006.01)
*C02F 3/12* (2006.01)

(52) U.S. Cl.
CPC ............ *C02F 3/1221* (2013.01); *C02F 3/301* (2013.01); *C02F 2101/105* (2013.01); *C02F 2101/20* (2013.01); *C02F 2203/006* (2013.01); *C02F 2209/005* (2013.01); *C02F 2209/04* (2013.01); *C02F 2301/046* (2013.01)

(58) Field of Classification Search
CPC ............ C02F 2101/105; C02F 2101/20; C02F 2209/005; C02F 2209/04; C02F 2203/006; C02F 2301/046; Y02W 10/10
USPC ....................................................... 210/609
See application file for complete search history.

(56) References Cited

U.S. PATENT DOCUMENTS

| | | | |
|---|---|---|---|
| 4,999,111 A | 3/1991 | Williamson | |
| 5,098,567 A | 3/1992 | Nishiguchi | |
| 6,982,035 B1* | 1/2006 | O'Keefe | C02F 3/28 210/258 |
| 6,984,323 B2 | 1/2006 | Khudenko | |
| 2003/0034300 A1 | 2/2003 | Srinivasan et al. | |
| 2018/0370830 A1 | 12/2018 | Fitch et al. | |

FOREIGN PATENT DOCUMENTS

| | | |
|---|---|---|
| EP | 1698595 A1 | 9/2006 |
| JP | 47099 A | 1/1992 |
| JP | 2002192185 A | 7/2002 |

\* cited by examiner

PHOSPHORUS RELEASE REACTOR FOR WATER TREATMENT

CROSS-REFERENCE TO RELATED APPLICATIONS

This application is a Divisional Application of U.S. Ser. No. 16/213,218, filed on Dec. 7, 2018, which claims priority under 35 U.S.C. § 119 to provisional application Ser. No. 62/608,286, filed Dec. 20, 2017, all of which are herein incorporated by reference in their entirety

FIELD OF THE INVENTION

The invention relates to treatment of microorganisms from an activated sludge process operating with enhanced biological phosphorus removal in a reactor with baffles or other devices to induce similar plug-flow effort, designed to optimally release phosphorus and/or magnesium from the microorganisms with or without chemical addition. Further, the invention relates to a process designed to produce both a lower solids, phosphorus and magnesium enriched liquid stream and a higher solids, phosphorus and magnesium enriched stream. The reactor operates to give optimal performance by operating in a plug-flow mode.

BACKGROUND OF THE INVENTION

Increasingly stringent wastewater treatment plant (WWTP) effluent phosphorus permit limits have led many utilities to consider a variety of enhanced biological phosphorus removal (EBPR) activated sludge systems. When using EBPR systems to achieve high effluent quality, the presence of phosphorus accumulating organisms (PAOs) in the EBPR process leads to an accumulation of phosphorus and magnesium content of the waste activated sludge, which can lead to the unintended consequence of increased mineral struvite ($MgNH_4PO_4.6H_2O$) formation for facilities with anaerobic digestion. This in turn causes decreased performance and high maintenance costs of the anaerobic digesters and associated equipment.

To mitigate struvite, some utilities are installing phosphorus recovery systems. These recovery systems often include a phosphorus release system. The release system receives waste activated sludge and/or activated sludge mixed liquor and utilizes an anaerobic process that focuses on the release of the phosphorus from PAOs and may release phosphorus from other organisms so that the phosphorus can be diverted to the recovery system and away from solids treatment processes where struvite has a high potential to form. Release systems may also release magnesium, which is also beneficial for some types of recovery processes such as those that produce phosphorus in the form of struvite. Other recovery systems produce phosphorus in the form of calcium phosphate or other forms that would still benefit from the high phosphorus content stream from the release system.

Referring to FIG. 1, conventional release systems typically utilize complete or well-mixed anaerobic reactors 1 with hydraulic retention times of 18 to 36 or more hours to release sufficient phosphorus in an effluent stream 4 for the subsequent recovery process from waste activated sludge and/or activated sludge mixed liquid feed 2, which may or may not be pre-thickened. Where solids are present such reactors, the hydraulic retention time of the reactor is equal to the solids retention time. A complete or well-mixed reactor configuration also provides no elutriation benefit. In some cases, the hydraulic retention time may be reduced, however this requires additional equipment, processes and/or chemicals at additional expense. Further, prior art release systems, such as that shown in FIG. 1, use reactors with long hydraulic retention times (HRT), and may exceed 18 to 36 or more hours. HRT in prior art reactors may be reduced, however, require additional processes such as: addition of a chemical and/or supplemental biodegradable organic compounds stream 3, which may be expensive and requires additional equipment, facilities, operations, and maintenance effort; and/or pre-reactor solids thickening which is expensive and requires additional equipment, facilities, operations, and maintenance effort. Post-reactor dilution and/or re-thickening is also required of these systems. The accompanying lower reactor solids concentrations of prior art reactor systems result in lower phosphorus release kinetics, as well as lower solids concentrations in reactor effluent results, lower post-reactor (external) solids separator efficiency and increased demand for chemical input to support separation performance. Still further, the prior art reactors systems have longer HRT and therefore, larger volumes, costs and footprint requirements compared to equivalent performance of the reactor systems described in the present invention. Another disadvantage of the prior art reactor systems is potentially higher operating dissolved oxygen concentrations and/or oxidation reduction potential exists due to air entrainment from use of continuous mixing thus resulting in lower efficiency operation.

Accordingly, it is an objective of the invention to provide a reactor system to treat microorganisms from an activated sludge process operating with enhanced biological phosphorus removal in a reactor with baffles or other devices to induce similar plug-flow effort, designed to optimally release phosphorus and/or magnesium from the microorganisms with or without chemical addition.

A further object of the invention is to provide a reactor system which reduces headspace volume, thereby eliminating excessive malodor generation.

A further object of the invention is to provide thickening and/or solids separation benefits internal to the reactor system.

A further object of the invention is to provide a reactor system which provides expanded monitoring and control capabilities for conditions favorable to phosphorus and/or magnesium release.

Other objects, advantages and features of the present invention will become apparent from the following specification taken in conjunction with the accompanying figures.

SUMMARY OF THE INVENTION

In one embodiment, the present invention is a wastewater treatment system comprising an influent stream, a plug-flow reactor with at least two zones, and an effluent stream. The system further comprises a first zone, wherein concurrent thickening and denitrification occurs; a second zone, wherein further thickening, volatile fatty acid production, and/or phosphorus and/or magnesium release occurs; and a final zone, wherein solids separation occurs. The reactor further comprises baffles or walls which separate the zones. In a still further embodiment, the effluent is discharged to one or more of the following: a phosphorus recovery process, solids thickening and/or separation, solids treatment process, and/or other beneficial use for the enriched phosphorus and/or magnesium stream. In a still further embodiment, the system further comprises a means for mixing located within the reactor, wherein the mixing occurs intermittently and at a shear rate of from about 10 s−1 to about 50 s−1. The system further comprises a reactor float configured to remove solids from the top of one or any combination of the zones. The reactor float is configured to discharge solids to one or more of the following: solids thickening and/or separation, phosphorus recovery, returned to wastewater treatment plant, such as activated sludge process to seed the system with diverse population of phosphorus accumulating organisms, solids treatment process such as anaerobic digestion, recycled to another zone, and/or any other beneficial uses. In one embodiment, the system further comprises a solids recycle stream configured to remove solids separated from at least one zone of the reactor and/or configured to convey higher concentration solids to a first zone of the reactor. In a further embodiment, the system further comprises a solids recycle pump sized from about 0% to 200% of a desired reactor flow rate. In a still further embodiment, the system further comprises at least one measurement device, at least one safety device, at least one control system, and combinations thereof.

The present invention also is directed towards a method of phosphorus and/or magnesium removal comprising: providing an influent stream to a plug flow reactor; allowing the influent stream to pass through at least two zones of the plug flow reactor; and removing phosphorus and/or magnesium from the influent stream. The removal step is performed by holding the influent stream in the reactor for a defined period of time. The influent stream is a waste activated sludge and/or activated sludge mixed liquid. The influent stream is passed through a first zone, wherein concurrent thickening and denitrification occurs; a second zone, wherein further thickening, volatile fatty acid production, and/or phosphorus and/or magnesium release occurs; and a final zone, wherein solids separation occurs. In one embodiment, the hydraulic retention time of the reactor is between about 4 and about 20 hours. In another embodiment, the solids retention time of the reactor is between about 8 and about 72 hours. In a still further embodiment, the hydraulic retention time and the solids retention time of the reactor is based on total volume of the zones. In a still further embodiment, the hydraulic retention time and the solids retention time of the reactor are decoupled. The phosphorus and/or magnesium is removed in an amount from about 10% to about 60%. In one embodiment, the method further comprises a thickening of solids step, configured to produce a thickened solids concentration between approximately 1% and 6%. In a further embodiment, the method is free of the addition of supplemental chemicals and/or readily biodegradable compounds.

While multiple embodiments are disclosed, still other embodiments of the present invention will become apparent to those skilled in the art from the following detailed description, which shows and describes illustrative embodiments of the invention. Accordingly, the figures and detailed description are to be regarded as illustrative in nature and not restrictive.

Figure 1:
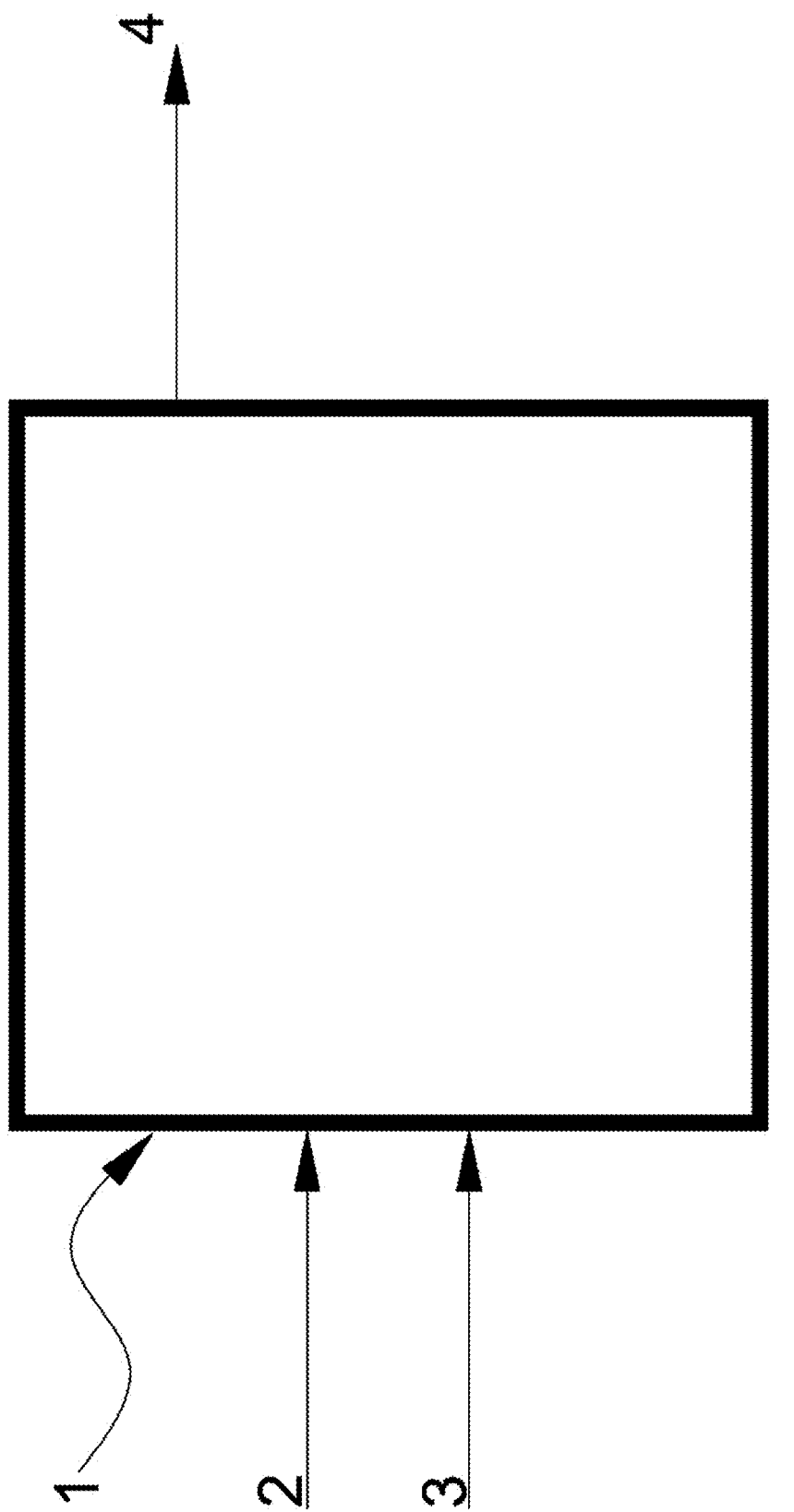
FIG. 1 is a block diagram of a prior art reactor system.

Various embodiments of the present invention will be described in detail with reference to the figures, wherein like reference numerals represent like parts throughout the views. Reference to various embodiments does not limit the scope of the invention. Figures represented herein are not limitations to the various embodiments according to the invention and are presented for exemplary illustration of the invention.

DETAILED DESCRIPTION OF THE INVENTION

The present invention relates to reactor systems and methods for removal of phosphorus and/or magnesium from waste activated sludge. These systems and methods have many advantages over conventional/existing/traditional reactor systems. For example, the systems and methods provide phosphorus and/or magnesium release rates exceeding rates observed by prior art. Further, the systems and methods provide enhanced phosphorus release (phosphorus release without concurrent magnesium release) due to microorganism decay products. Still further, the systems and methods incorporate internal thickening resulting in a thickened solids concentration between approximately 1% and 6%.

The embodiments of this invention are not limited to particular systems, and methods, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this invention, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, and the like. Further, given solid and liquid handling procedures used in the real world, there is certain inadvertent error and variation that is likely through differences in the manufacture, source, or purity of the ingredients used to make the compositions or carry out the methods and the like. Whether or not modified by the term "about," the claims include equivalents to the quantities.

The methods and systems of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

The term "weight percent," "wt. %," "wt-%," "percent by weight," "% by weight," and variations thereof, as used herein, refer to the concentration of a substance as the weight of that substance divided by the total weight of the composition and multiplied by 100.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the phrases "objectionable odor," "offensive odor," or "malodor," refer to a sharp, pungent, or acrid odor or atmospheric environment from which a typical person withdraws if they are able to. Hedonic tone provides a measure of the degree to which an odor is pleasant or unpleasant. An "objectionable odor," "offensive odor," or "malodor" has an hedonic tone rating it as unpleasant as or more unpleasant than a solution of 5 wt-% acetic acid, propionic acid, butyric acid, or mixtures thereof.

As used herein, the term "chemical-free" or "free of supplemental chemicals" refers to a system or method that does not contain a chemical treatment compound or to which a chemical treatment compound has not been added. Should a chemical treatment compound be present through contamination of system or method, the amount of chemical treatment compound shall be less than 0.5 wt %. More preferably, the amount is less than 0.1 wt-%, and most preferably, the amount is less than 0.01 wt %.

As used herein, the term "readily biodegradable organic compound-free" or "substantially readily biodegradable organic compound-free" or "free of readily biodegradable organic compound(s) refers to a system or method that does not contain readily biodegradable organic compound or to which a readily biodegradable organic compound has not been added. Should a readily biodegradable organic compound be present through contamination of a system or method, the amount of the readily biodegradable organic compound shall be less than 0.5 wt %. More preferably, the amount is less than 0.1 wt-%, and most preferably the amount is less than 0.01 wt %.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged, constructed, adapted, manufactured, and the like.

Reactor System and Methods

Figure 2:
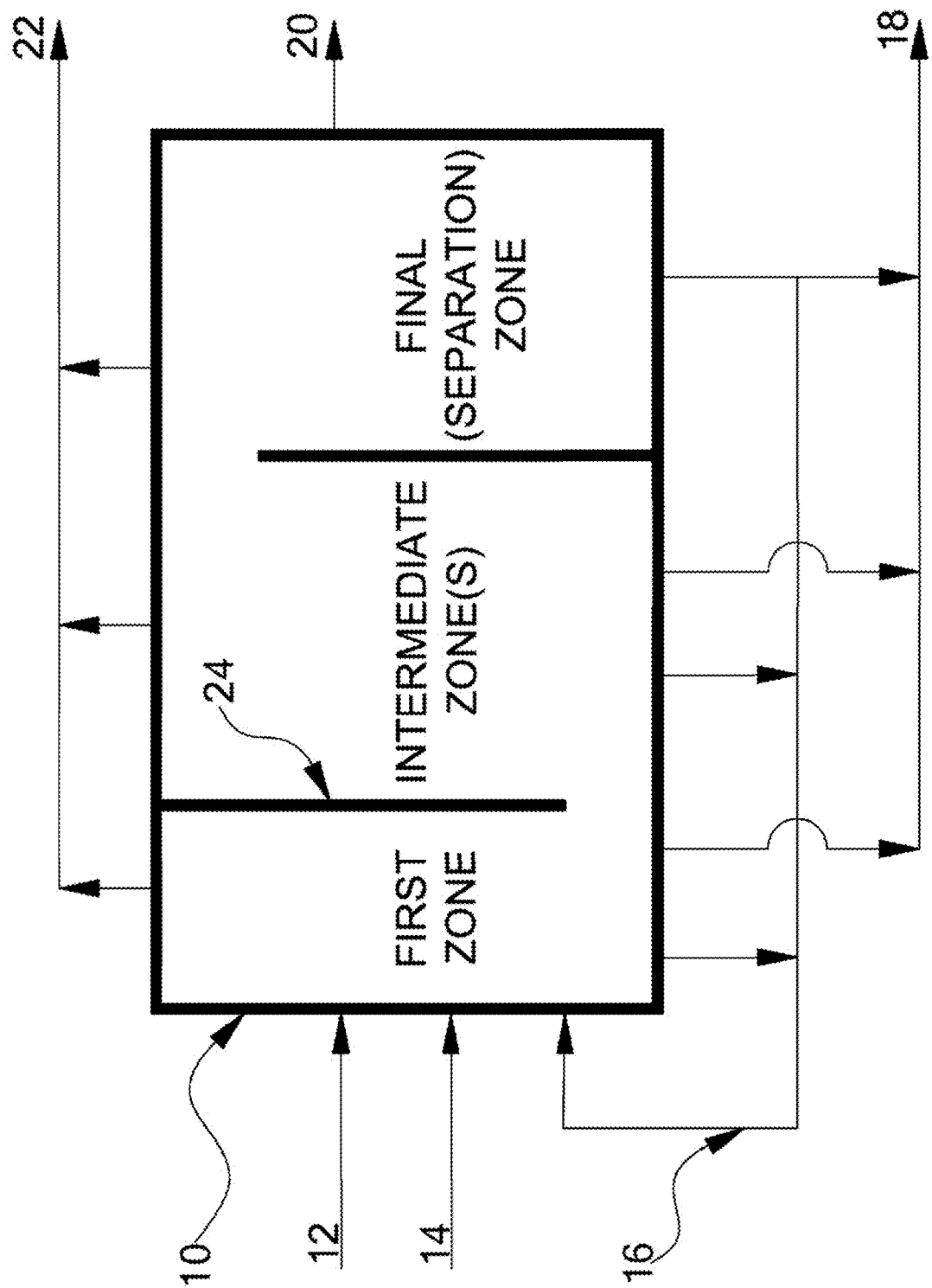
FIG. 2 is a block diagram of a first embodiment of the reactor system according to the present invention.
Figure 3:
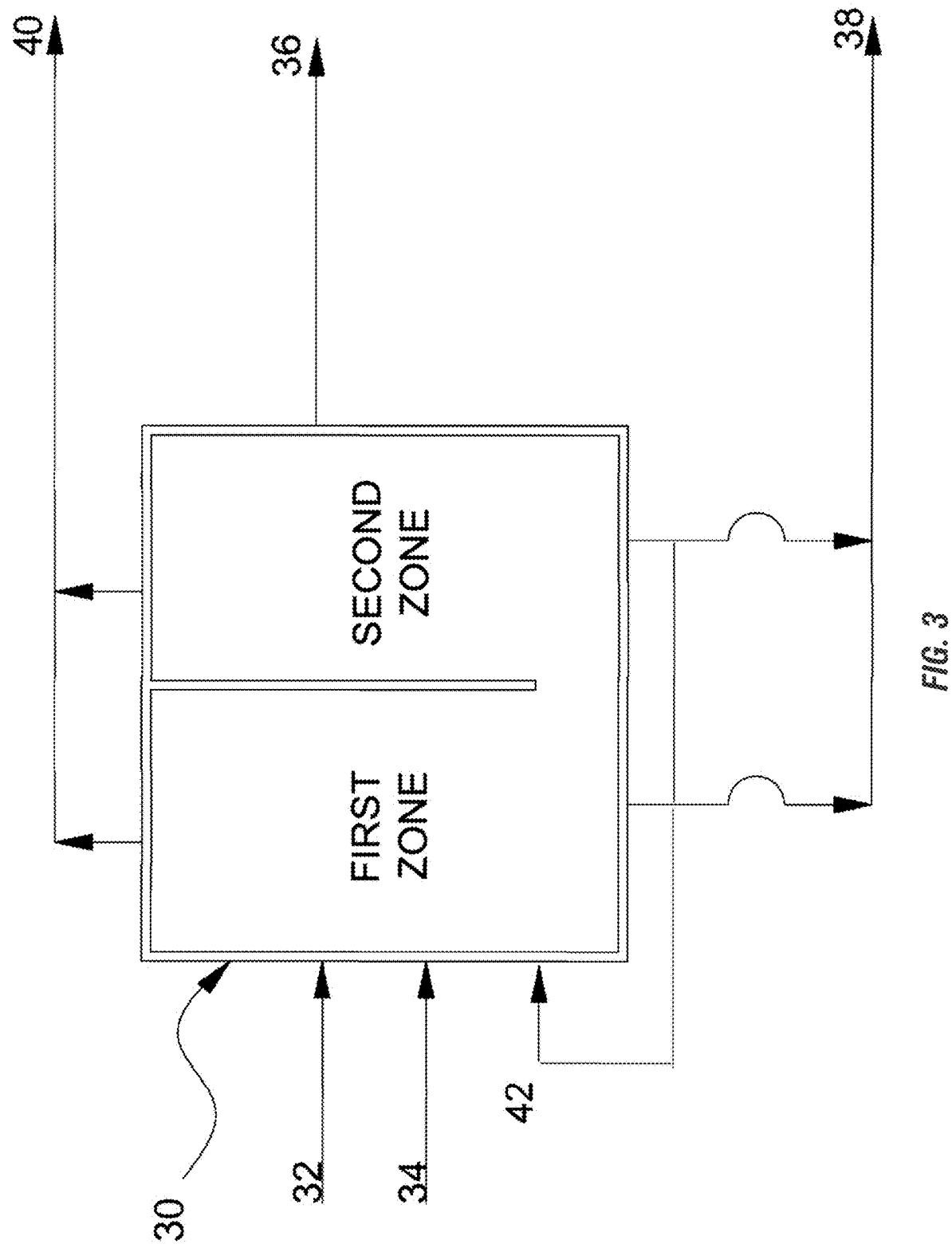
FIG. 3 is a block diagram of a second embodiment of the reactor system according to the present invention.

Referring to FIGS. 2 and 3, in preferred embodiments of reactor systems 10, 30 and methods for treatment of microorganisms from an activated sludge process, phosphorus and/or magnesium is released. One method for effecting this release is by adding feedstock(s) to the reactor via a feedstock influent 12, 32. The feedstock influent may include waste activated sludge and/or activated sludge mixed liquor. As one of skill in the art will appreciate, alternative embodiments may vary the number of zones to accommodate variation in feedstock characteristics or other operating conditions/restrictions. Zones may be present in the amount of at least two, three, four, five, or more zones.

In a preferred aspect of the invention, the influent to the reactor does not contain the addition of supplemental chemicals and/or readily biodegradable compounds. Once the influent enters the reactor 10, 30, zones are present in the reactor to facilitate phosphorus and/or magnesium removal. Without seeking to be limited to a particular theory or mechanism of the invention, it is believed that in a first zone, concurrent thickening and denitrification occurs. Solids separated from second, third, and/or subsequent zones may be recycled, as indicated by arrows 16,42 to the first zone. Further, it is believed that in a second zone, further thickening, volatile fatty acid production, and phosphorus and/or magnesium release predominantly occurs. Still further, it is believed that in a third and/or final zone, solids separation predominantly occurs. As the feedstock influent 12, 32 moves through the zones of the reactor systems and methods 10, 30, a phosphorus and/or magnesium enriched effluent with lower solids concentration 20, 36 is produced. The effluent 20, 36 may be discharged to one or more of the following: a phosphorus recovery process, solids thickening and/or separation, solids treatment process, or other beneficial use for enriched phosphorus and/or magnesium stream. Thickened solids are removed from the system via a thickened solids stream 18, 38, wherein the thickened solids are then discharged to one or more of the following: additional solids separation, additional thickening, phosphorus recovery, return to activated sludge process, solids treatment or other beneficial uses. According to an embodiment of the invention, the zones are separated by baffles 24 or a wall or other physical barrier.

Intermittent mixing may be used to incorporate floating solids to the reactor contents and/or to reduce short circuiting caused by channeling formed during high solids concentration conditions. Mixing, when employed, functions to break up solids, provide a homogenous mixture as the influent moves through the reactor system, and relieve any stratification which may occur. Such intermittent mixing may occur by any mechanical or flow-induced means and may be present in any one or a combination of the zones of the reactor system. Mixing is minimal so as to maintain a plug flow profile throughout the reactor. Mixing preferably occurs at a shear rate of from about $10\ s^{-1}$ to about $50\ s^{-1}$, preferably from $20\ s^{-1}$ to about $40\ s^{-1}$.

A reactor float or top solids removal stream 22, 40 may exit any one or combination of the zones. Such a solids removal stream 22, 40 may be discharged to one or more of the following: solids thickening and/or separation, phosphorus recovery, returned to wastewater treatment plant, such as activated sludge process to seed the system with diverse population of phosphorus accumulating organisms, solids treatment process such as anaerobic digestion, recycled to another zone, and/or any other beneficial uses.

The hydraulic retention time of the reactor of the present invention is separated or decoupled from the solids retention time. In a preferred embodiment, the hydraulic retention time is between about 4 and about 20 hours, preferably between about 8 and about 16 hours. In a preferred embodiment, the solids retention time is between about 8 and about 72 hours, preferably between about 16 and about 48 hours. In a still further preferred embodiment, the hydraulic and solids retention time is based on total volume of all reactor zones. The decoupling of the hydraulic and solids retentions times is achieved using the separation (final) zone to produce a lower solids concentration effluent and higher concentration solids. In this zone, and through the zones of the reactor, solids are allowed to settle and/or are removed. The removed solids are then present in higher concentration and are then conveyed to a solids recycle pump and stream 16,42 which conveys the higher concentration solids within the reactor to increase the residence time of the solids, thereby decoupling the hydraulic retention time and the solids retention time. The solid retention time is controlled by wasting solids from the system via the reactor float stream 22, 40 and/or the effluent stream 20, 36 and are balanced by the recycling of solids within the reactor via the recycle stream 16, 42 and pump.

The solids recycle pump is sized to pump from about 0% to 200% of the reactor feed flow rate. In a preferred embodiment, solids are recycled from the separation (final) zone to the first zone of the reactor; however, the system is configured so that solids can be conveyed to and from any zone. It is believed the recycle pump provides the benefit of elutriation of reactor solids to promote the release of phosphorus and/or magnesium into the bulk liquid effluent 20.

In an alternative embodiment of the invention, the recycle stream 18 returns a portion of the solids from the reactor to the activated sludge process located upstream of the influent in order to see the reactor with phosphorus accumulating organisms. The longer solids retention time in the reactor compared with the current state of the art (18 to 36 or more hours) results in a deeper anaerobic condition as confirmed by oxidation reduction potential measurements. The deeper anaerobic condition of the present invention promotes microorganism diversity including selection of a more diverse population of phosphorus accumulating organisms compared to prior art phosphorus release systems or compared to microorganisms selected in enhanced biological phosphorus removal activated sludge systems. Diverse populations of PAOs increase the reliability and performance of EBPR systems.

According to the methods and system of the present invention, phosphorus and/or magnesium is released in an amount from about 10% to about 60%, preferably from about 20% to about 40%, and more preferably from about 25% to about 35%.

Measurement Devices

In some aspects of the invention, the system may include at least one measurement device or a plurality of measurement devices. Such measurement devices are those suitable to measure one or more reaction kinetics or system operations for phosphorus and/or magnesium removal, including for example devices to measure oxidation reduction potential sensors, total suspended solids concentration sensors, nitrate/nitrite concentration sensors, ortho-phosphorus/phosphorus concentration sensors, magnesium concentration sensors, weight, flow (e.g. flow meters or switches), pH, pressure, temperature and combinations thereof. Such measurement devices may measure the system's inlets, piping, outlets, etc.

Examples of additional suitable measurement devices include, for example, concentration sensors, thermometers, alarms, monitors, and pressure switches. For example, temperature may be monitored at various points in the apparatus to ensure consistent temperature. In another embodiment of the invention, oxidation reduction potential (ORP) is monitored for an indication of reactor conditions and performance. Positive ORP indicates an oxidative condition and negative values indicates a reducing condition. ORP can be used to indicate the type of biochemical activity/conditions present, such as aerobic, anoxic or anaerobic. ORP values for specific conditions can vary based on wastewater characteristics and the type of ORP probe used, however aerobic environments will have higher ORP values than anoxic, which will be higher than anaerobic environments. The differences in biological activity within an anaerobic environment can be correlated to ORP, for example denitrification occurs at a higher ORP than phosphorus release. The reactor recycle rate, SRT or other functions can be controlled based on the ORP to optimize phosphorus release or other parameters.

In a further embodiment of the invention, flow rate is monitored with either a pressure sensor, magnetic meter, ultrasonic sensor, or an orifice plate/meter. In a further embodiment, solids retention time, hydraulic retention time, recycle rate, temperatures, pH and concentrations can all be optimized via monitoring systems and/or controllers. Additionally, an embodiment of the invention would allow for rinsing of the system for cleaning and maintenance.

Control System

In a preferred embodiment, the system for removal of phosphorus and/or magnesium removal further comprises an optional controller or software platform. The software platform provides a user or system to select a mode for a desired hydraulic retention and/or solids retention time. As a result, use of the system provides significant user flexibility to achieve phosphorus and/or magnesium removal for particular user-identified purposes. The control system preferably includes the above described measurement devices.

The controller may further include a mechanism for manually starting/stopping any of the same functions, including for example a manual switch panel for the same. In addition to manual controls, such as a manual switch panel, the controller preferably has buttons or other means for selecting particular embodiments according to option displayed by the control software platform. An embodiment of the controller may further include a display screen to assist a user in selecting a mode for a desired orthophosphorus release and any other options for user selection as one skilled in the art will ascertain based upon the description of the invention. Concomitant with the control software are user-friendly instructions for use displayed on the display screen (or the like).

The control software utilizes a control software algorithm to maximize desired conditions and provide safe operating conditions for the reactor vessel(s) of the system.

The system may include a data output means for sharing information related to the phosphorus and/or magnesium release according to the system. For example, an information backbone may be used to both collect and disseminate data from the process of release including, for example, concentration, recycle rate, and/or additional related data. Such data may be generated in real-time and/or provided in a historical log of operational data detectable or storable by a user or system. A user of the system is able to monitor usage and performance, including for example, hydraulic retention time, solids retention time, recycle rate, phosphorus and/or magnesium release and the like. According to an additional embodiment of the invention, a user or system is able to control systems, including program systems, remotely. Control systems also include safety shut off of pumps at no flow and shut offs when monitoring devices indicate equipment failures or other problems.

According to another aspect of the invention, any system operations suitable for use with the invention may be controlled and/or monitored from a remote location. Remote system operations control and/or monitoring may further include the system updates and/or upgrades. Such updates and/or upgrades to system operations may be downloaded remotely.

In another aspect of the invention, the data output for sharing information related to the removal according to the system may coordinate multiple systems on at a single site. According to this embodiment of the invention, information sharing between the multiple systems may take place using any communications network capable of coupling one or more systems according to the present invention, including for example, using a server computer and a database.

Safety Devices

In some aspects of the invention, the system may include a variety of safety mechanisms. Various safety mechanisms can measure water level, solids concentration, equipment operational status, difference in level, difference in solids concentration, or a combination thereof and provide a perceptible signal if one or more of these increases above a predetermined level. The level of measured difference, or a combination thereof at which safety system provides a perceptible signal can be selected to allow intervention to avoid undesirable or unsafe conditions.

Figure 4:
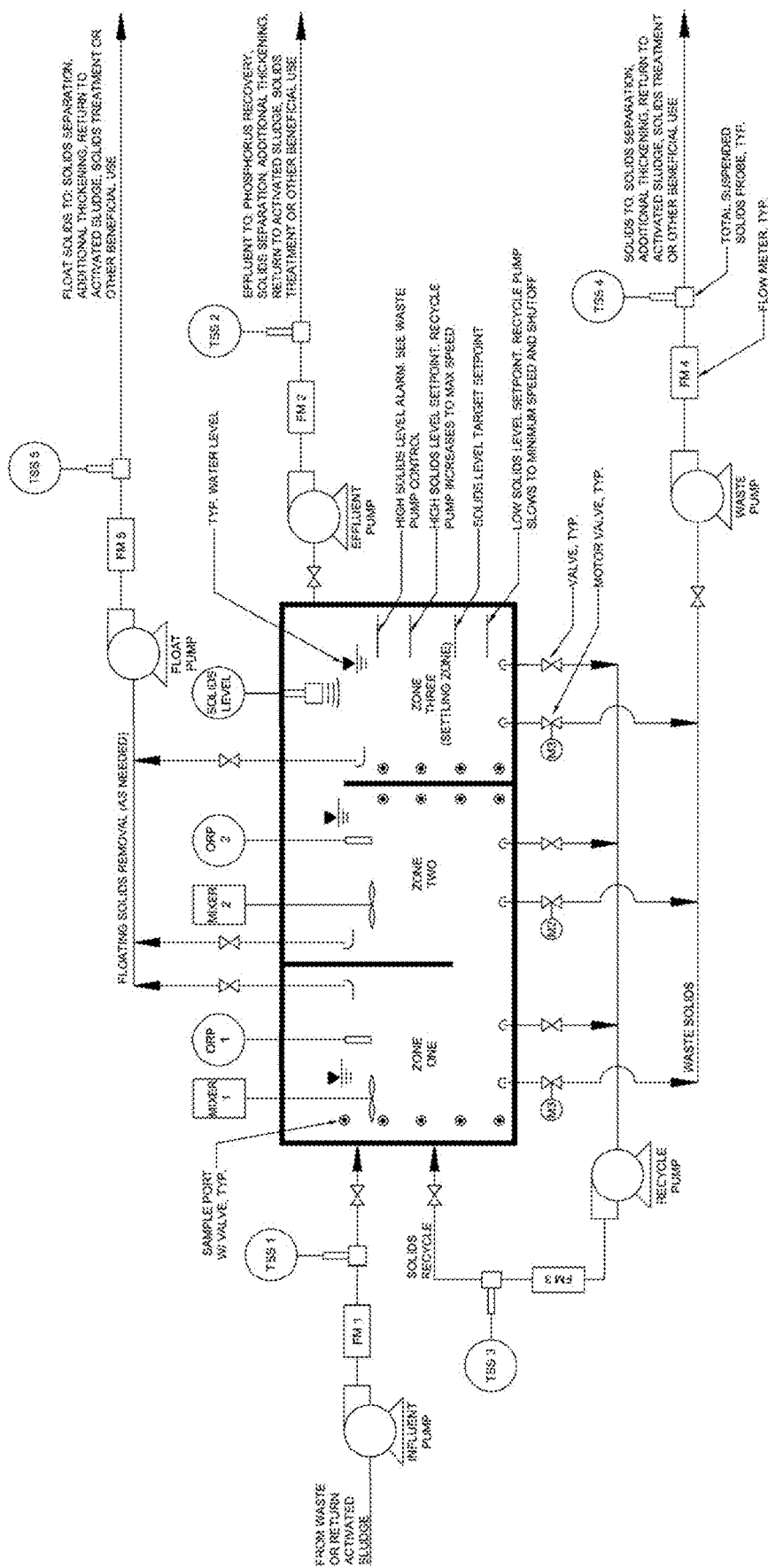
FIG. 4 is a block diagram of a third embodiment of the reactor system, including safety and control mechanisms, according to the present invention.

A preferred embodiment of the control system is depicted in FIG. 4. Equipment represented in FIG. 4, is shown in Table A.

TABLE A

Equipment Listing for FIG. 4

| Abbreviation in Diagram | Description | Note |
| --- | --- | --- |
| FM 1 | Influent flow meter | Flowrate and solids measurement is important to determine hydraulic and solids retention time. However, could be accomplished with various methods and instrumentation. The controls diagram shows a preferred embodiment. |
| TSS 1 | Influent total suspended solids probe | |
| FM 2 | Effluent flow meter | |
| TSS 2 | Effluent total suspended solids probe | |
| FM 3 | Recycle flow meter | |
| TSS 3 | Recycle total suspended solids probe | |
| FM 4 | Solids flow meter | |
| TSS 4 | Solids total suspended solids probe | |
| FM 5 | Float solids flow meter | |
| TSS 5 | Float solids total suspended solids probe | |
| Mixer 1 | Zone 1 mixer | Used intermittently/as needed to prevent channelizing of the solids. Not intended for complete mixing. |
| ORP 1 | Zone 1 ORP probe | Indicates extent of anoxic/anaerobic condition, useful for process control. |
| Mixer 2 | Zone 2 | Used intermittently/as needed to prevent channelizing of the solids. Not intended for complete mixing. |
| ORP 2 | Zone 2 ORP probe | Indicates extent of anoxic/anaerobic condition, useful for process control. |
| Solids Level | Solids blanket level sensor in settling zone | Indicates the depth of the sludge blanket in the settling zone. Useful to control process and solids balance. |
| Influent Pump | Influent Pump | Depending on configuration, alternative methods such as a valve may be used to control flow. |
| Recycle Pump | Recycle pump | Recycle pump is critical to process to maintain solids balance in reactor. Depending on configuration, alternative methods such as a valve may be used to control flow. |
| Waste Pump | Waste pump | Waste pump is critical to process to maintain solids balance and target SRT in reactor. Depending on configuration, alternative methods such as a valve may be used to control flow. |

TABLE A-continued

Equipment Listing for FIG. 4

| Abbreviation in Diagram | Description | Note |
|---|---|---|
| Float Pump | Float Pump | Float pump removes floating solids from reactor. Depending on configuration, alternative methods such as a valve may be used to control flow. |
| Effluent Pump | Effluent Pump | Effluent pump conveys effluent from the reactor. Depending on configuration, alternative methods such as a valve may be used to control flow. |
| M1 | Motor Valve 1 - Zone 1 | When selected, valve opens when waste pump is on to allow solids removal from reactor. Valve closes when waste pump is off to prevent solids from leaking out of reactor. |
| M2 | Motor Valve 2 - Zone 2 | When selected, valve opens when waste pump is on to allow solids removal from reactor. Valve closes when waste pump is off to prevent solids from leaking out of reactor. |
| M3 | Motor Valve 3 - Settling Zone | Valve opens when sludge blanket depth in settling zone reaches high level (adjustable) and coordinated with recycle and/or waste solids removal. |

In the preferred embodiment shown in FIG. 4, the influent flow meter (FM 1) sends a signal to influent control valve, pump or other device to control rate of flow into the reactor. A recycle pump maintains user adjustable sludge/solids blanket level in settling zone based on signal from solids level sensor (SOLIDS LEVEL). The recycle pump adjusts flow rate by variable frequency drive (VFD) (or other method) to maintain solids blanket level setpoint. An operator can enter minimum and maximum values for recycle pump speed/flow rate when in automatic operation. Further, an operator may enter values for low level, target level setpoint, high level and alarm level. In one aspect of operation, the recycle pump decreases to minimum speed and shuts off at low solids level setpoint. Alternatively, the recycle pump increases speed to max speed at high solids level setpoint. At high solids alarm level, the waste pump is started and user selectable waste motor valve is opened as described below. Any combination of one or multiple waste motor valves can be selected to be active, but normally zone 2 (motor valve M2) is opened, as described below. A time delay/deadband is included for the recycle pump control to avoid frequent on/off and/or high/low speed cycles.

A waste pump is interlocked with the user selected waste solids motor valve so that the valve opens when the pump is on, and the valve is closed when the pump is off. The pump will not start if the user selected waste solids motor valve is not open. The waste pump maintains user adjustable solids retention time (SRT) by adjusting pump operating speed using VFD (or other method) and/or by turning the pump on and off. The SRT is calculated in the programmable logic controller (PLC), or similar device, as discussed below. It is preferred to maintain constant or near constant pump flow rate and operation. A time or other method of delay/deadband is included for the waste pump control to avoid frequent on/off and/or high/low speed cycles. If high solids level alarm in the final zone of the reactor is triggered, the motor valve 3 will open and the waste pump will either turn on or, if the waste pump is already on, the waste pump will increase speed. The motor valve 3 will close when solids level setpoint is reached and the waste pump will revert to SRT based control. In all scenarios, the waste pump will not operate unless the user selected motor valve is opened.

Solids retention time is calculated using a PLC, or similar device. Measurements and calculations could also be accomplished manually. The following formula is assumed; however, variations in the calculation could successfully be used. Table B provides a description of the variables included in the formula.

$$SRT = \frac{S_{reactor} \times V_{reactor} \times \left(8.34 * 10^{-6} \frac{lb}{gal}\right)}{[(S_{eff} \times Q_{eff}) + (S_{waste} \times Q_{waste}) + (S_{float} \times Q_{float})] \times \left(\frac{1440 \text{ min}}{1 \text{ day}}\right) \times \left(8.34 * 10^{-6} \frac{lb}{gal}\right)}$$

TABLE B

SRT Formula Variables

| Parameter | Description | Unit | Source of Data |
|---|---|---|---|
| SRT | Solids Retention Time | Days | Calculated in PLC |
| $S_{reactor}$ | Average total suspended solids concentration in reactor | mg/L | Averaged/composited suspended solids as measured from sample ports and values entered into PLC. This value is stored until overwritten by operator. Alternatively, solids probes could be used to directly convey values to PLC. |
| $V_{reactor}$ | Volume of reactor | Gallons | Constant based on constructed reactor dimensions |
| $S_{eff}$ | Effluent total suspended solids concentration | mg/L | Effluent solids probe (TSS 2) based on user adjustable time average |
| $Q_{eff}$ | Effluent flow rate | Gal/Min | Directly from flow meter FM 2 or calculated by: FM 2 = FM 1 − FM 4 based on user adjustable time average |

TABLE B-continued

SRT Formula Variables

| Parameter | Description | Unit | Source of Data |
|---|---|---|---|
| $S_{waste}$ | Waste total suspended solids concentration | mg/L | Waste solids probe (TSS 4) based on user adjustable time average |
| $Q_{waste}$ | Waste flow rate | Gal/Min | Flow meter FM 4 based on user adjustable time average |
| $S_{Float}$ | Float solids total suspended solids concentration | mg/L | Float solids probe (TSS 5) based on user adjustable time average |
| $Q_{Float}$ | Float solids flow rate | Gal/Min | Flow meter FM 5 based on user adjustable time average |

In a further aspect of the invention, mixer number 1 and 2 are controlled by user adjustable timers for each mixer (time on and time off) in minutes. The timers could be in the PLC, part of local mixer control panel or elsewhere. For example, the initial setpoint on for a first mixer (time running) could be 10 minutes, with an initial setpoint delay (off) of 11 hours 50 minutes. Further, the initial set point on for a second mixer (time running) could be 10 minutes, with an initial setpoint delay (off) of 11 hours 50 minutes. The mixers could also be controlled by differential level based on adjustable setpoints; by ORP to maintain a setpoint (adjustable) or manually by the operator.

EXAMPLES

Embodiments of the present invention are further defined in the following non-limiting Examples. It should be understood that these examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Figure 5:
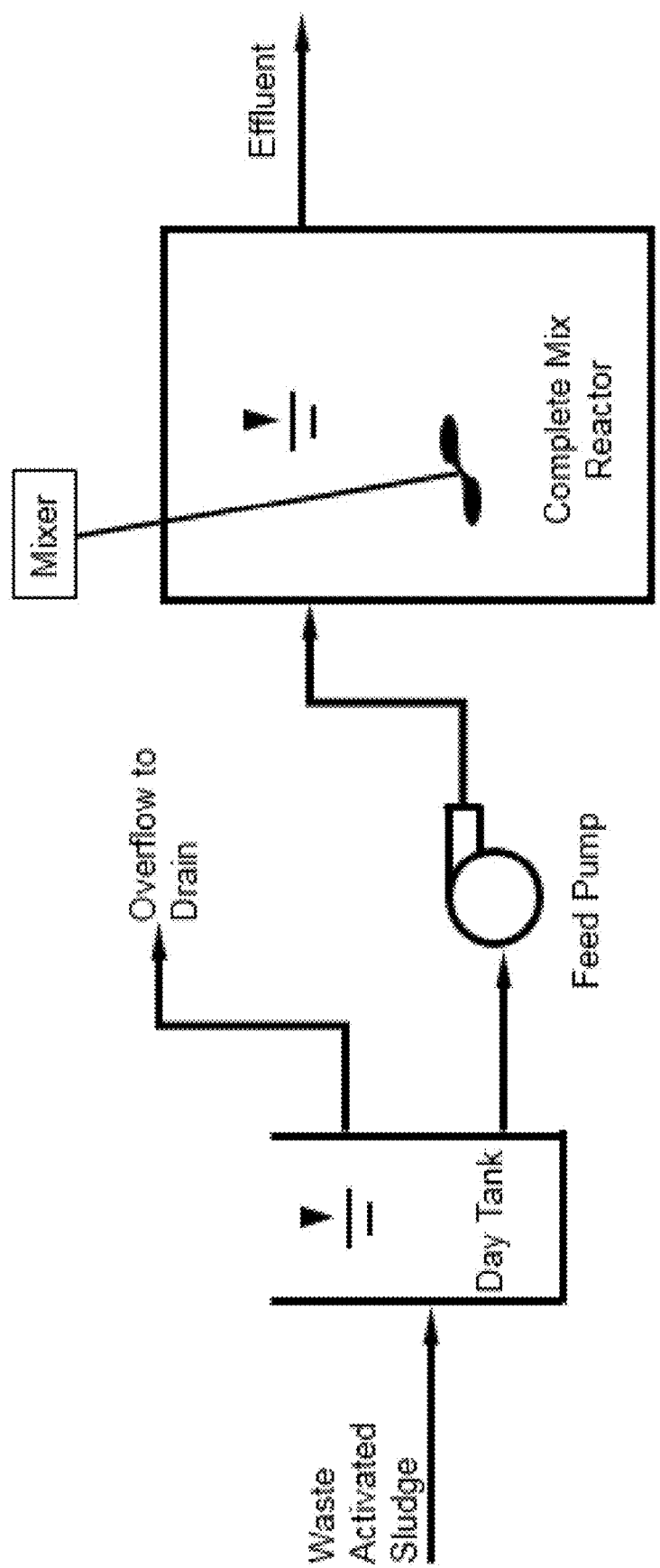
FIG. 5 is a flow diagram for a complete mix reactor.
Figure 6:
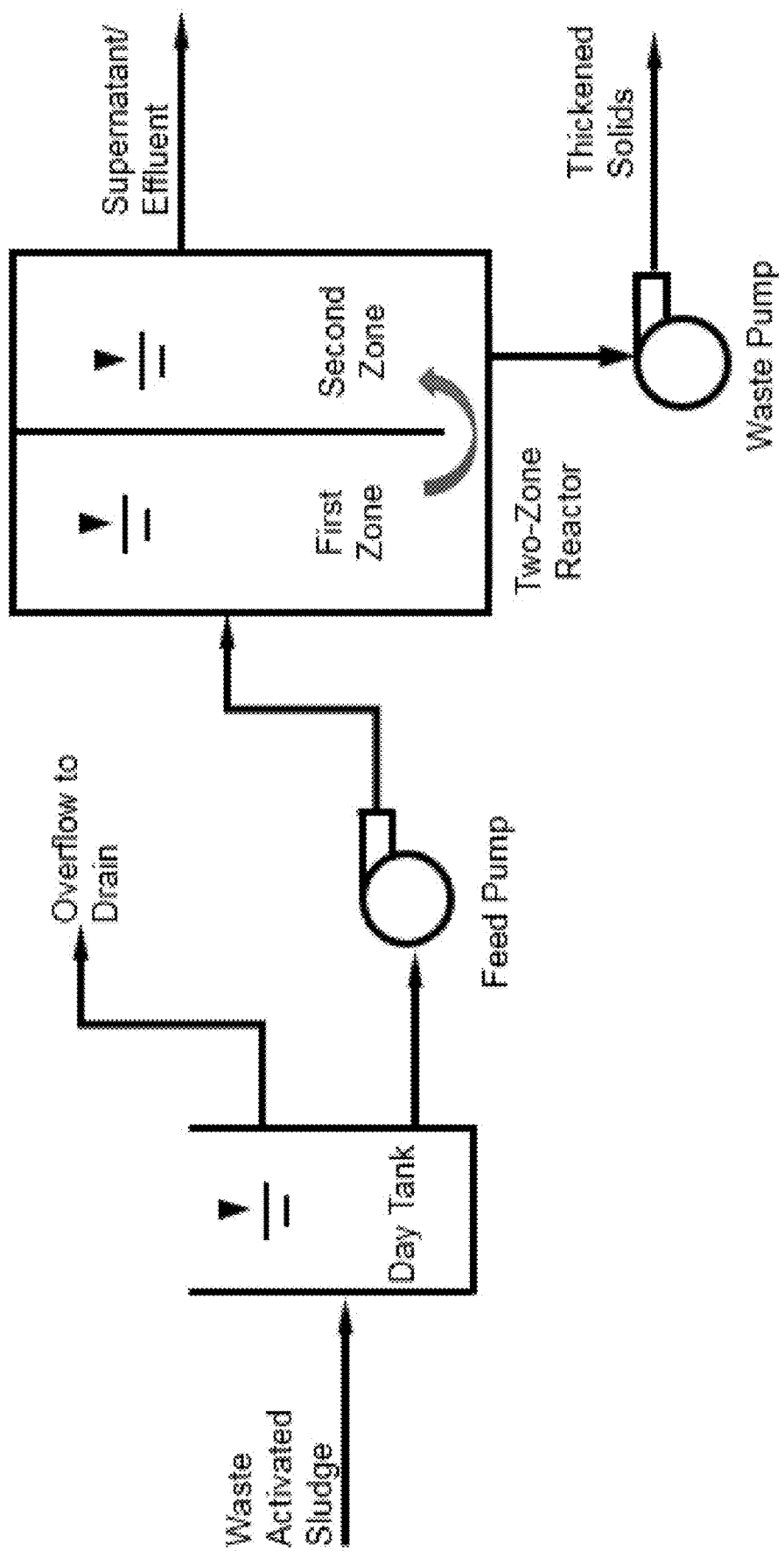
FIG. 6 is a flow diagram for a two-zone reactor system according to the present invention.
Figure 7:
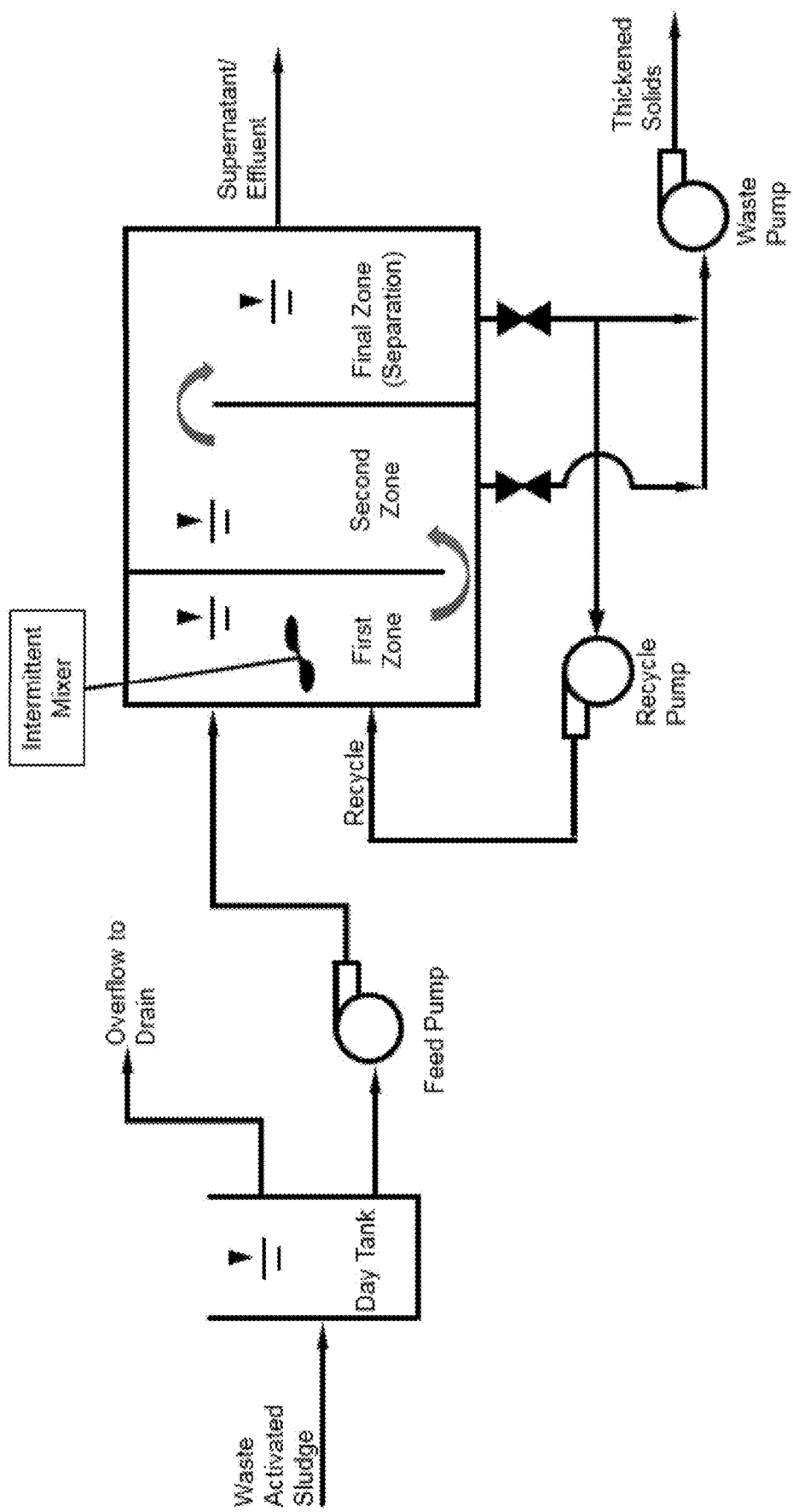
FIG. 7 is flow diagram a three-zone reactor system according to the present invention.
Figure 8:
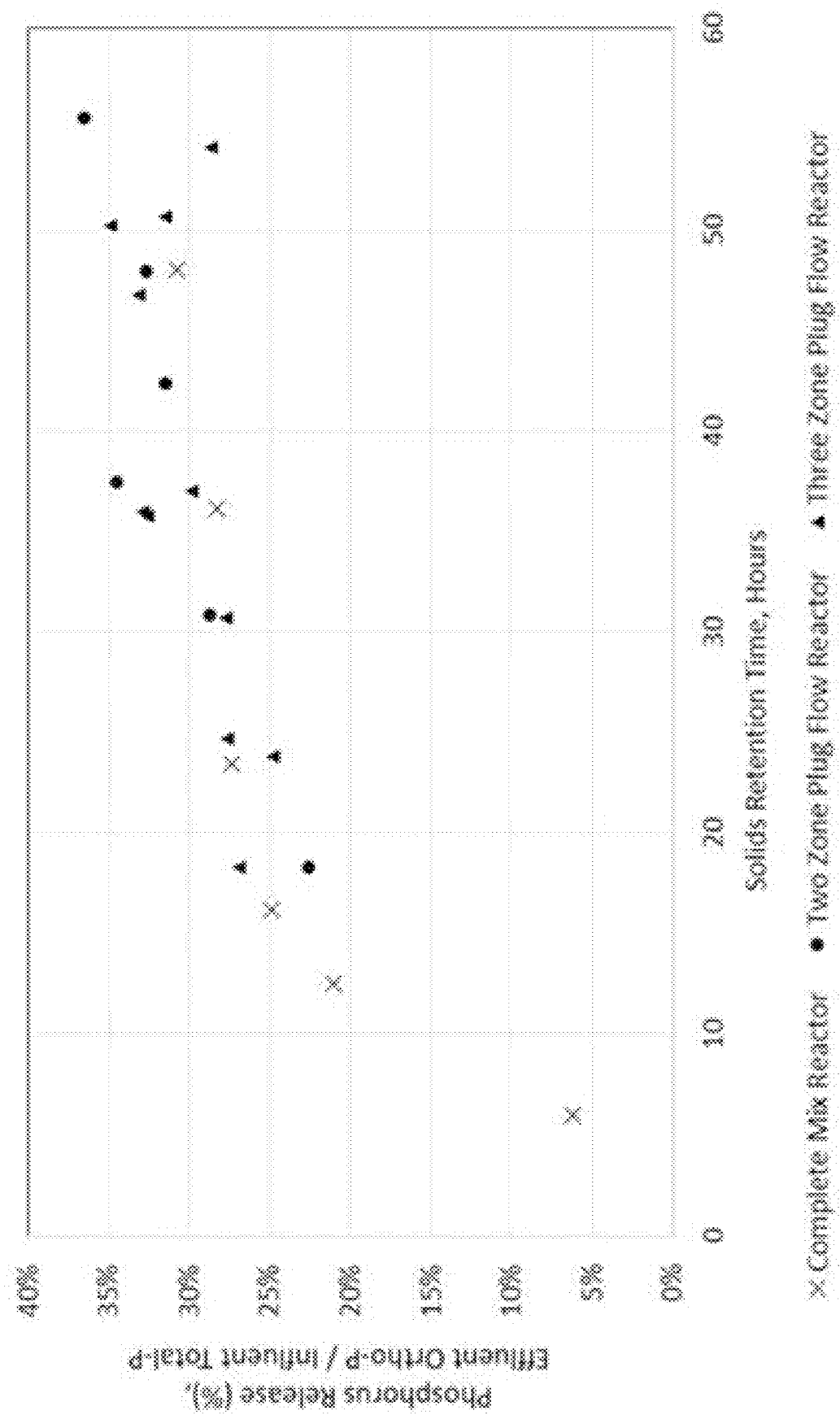
FIG. 8 is a graph showing test results of phosphorus release at varied solids retention times.
Figure 9:
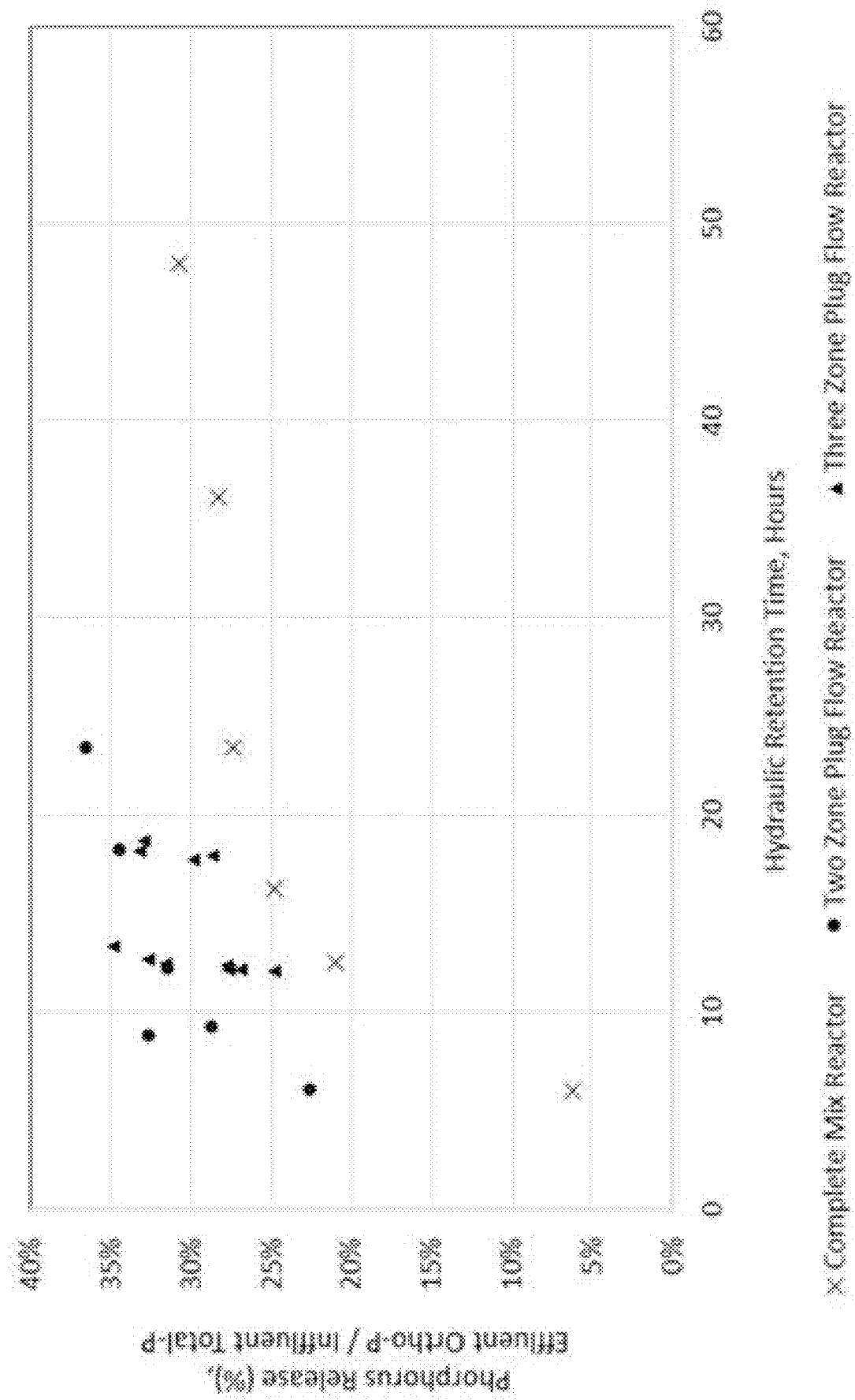
FIG. 9 is a graph showing test results of phosphorus release at varied hydraulic retention time.

Three 10-liter bench-scale phosphorus release reactors were developed, constructed, tested and compared as shown in FIGS. 5-7 and described below: FIG. 5—traditional complete mix; FIG. 6—two-zone plug flow; FIG. 7—three-zone plug flow. Photos of the respective test set-ups are shown in FIGS. 8-10.

FIG. 5 shows the test configuration of the complete mix reactor. Waste activated sludge was conveyed to a day tank that was well mixed and continuously overflowed to drain. The day tank was completely turned over every 1-2 minutes to provide a fresh feed source to the reactor. A feed pump was used to convey waste sludge from the day tank to the reactor and control the flow rate to the reactor. The influent pump flow rate was verified daily by collecting all the effluent from the reactor and measuring the total volume.

A mechanical mixer was used to maintain complete mix conditions sufficient to suspend solids throughout the reactor while maintaining anaerobic conditions to support phosphorus release. In the complete mix reactor, the hydraulic retention time (HRT) was always equal to the solids retention time (SRT) and was controlled by the influent flow rate. The solids concentration in the reactor was directly controlled by the solids concentration and flow rate of the influent.

FIG. 6 illustrates the test configuration of the two-zone plug flow reactor. Without seeking to be limited to a particular mechanism or theory, it is believed that the following main processes predominantly occur in each zone. In the first zone, concurrent thickening, denitrification with off-gassing and potentially some VFA production depending on retention time. In the second zone, further thickening, VFA production, phosphorus release, and solids separation which permits uncoupling of the HRT/SRT. Thickened solids are typically removed from the bottom of the second zone to maintain a solids balance within the reactor.

Waste activated sludge was drawn from the same day tank as was used for the other reactors to maintain consistency. A feed pump was used to convey waste sludge from the day tank to the reactor and control the flow rate to the reactor. The influent pump flow rate was verified daily by collecting all the effluent from the reactor and measuring the total volume.

A waste pump was used to waste solids from the system to maintain a target SRT/solids balance. The SRT was determined by calculating a mass balance around the reactor using the reactor contents, influent, effluent and waste solids streams (flow rate and solids concentrations). The waste pump flow rate was verified daily by collecting all the discharge from the waste pump and measuring the total volume.

FIG. 7 shows the test configuration of the three-zone reactor, which was developed with goals to increase SRT control flexibility, reliability and reduce the effluent solids concentration in the effluent. Some P-recovery systems require low solids concentrations to produce struvite. Reducing the P-release reactor effluent solids concentration in the would eliminate or reduce the need for subsequent solids separation prior to conveyance to the P-recovery system. Without seeking to be limited to a particular mechanism or theory, it is believed the following processes predominately occur in each zone. In the first zone, concurrent thickening, denitrification with off-gassing and potentially some VFA production depending on retention time occurs. Intermittent mixing is included. In the second zone, further thickening, VFA production and phosphorus release occurs. In the final zone, solids separation and recycling occurs. The final zone solids separation and internal recycle improves the solids balance and decreases effluent solids concentration compared to the two-zone plug flow reactor, which improves the ability to uncouple HRT and SRT. The internal recycle is conveyed back to the first zone. Solids may be wasted from any portion of the reactor, however typically are removed from the bottom of the second zone and/or the bottom (thickened) portion of the final settling zone.

Waste activated sludge was drawn from the same day tank as was used for the other reactors to maintain consistency. A feed pump was used to convey waste sludge from the day tank to the reactor and control the flow rate to the reactor. The influent pump flow rate was verified daily by collecting all the effluent from the reactor and measuring the total volume.

The recycle pump flow rate was verified at least three times a week by directly measuring pump output.

A waste pump was used to waste solids from the system to maintain a target SRT/solids balance. The SRT was determined by calculating a mass balance around the reactor using the reactor contents, influent, effluent and waste solids streams (flow rate and solids concentrations). The waste pump flow rate was verified daily by collecting all the discharge from the waste pump and measuring the total volume.

The key control variables were the hydraulic and solids retention times. In the three-zone reactor, recycle pump rate was also a control variable. In the complete mix reactor, the HRT was equal to the SRT and was varied between 6 and 48 hours.

The two and three-zone plug flow reactors had the ability to decouple HRT and SRT. To demonstrate reduced volume requirements and cost reduction compared to a complete mix reactor, HRT was less than SRT for each run. HRT was varied between 6 and 24 hours and SRT between 18 and 54 hours. Table 1 presents the experimental plan for the reactor comparison evaluation and Table 2 shows samples and measurements regularly collected for each of the reactors. Additional constituents were sampled intermittently. A complete representation of the data can be found in the Appendix attached hereto.

TABLE 1

Bench Scale Test Conditions

| Run | Hydraulic Retention Time, HR | Solids Retention Time, HR | Internal Recycle Flow Rate, % of Influent Flow |
|---|---|---|---|
| Complete Mix Reactor | | | |
| 1 | 24 | 24 | N/A |
| 2 | 16 | 16 | N/A |
| 3 | 12 | 12 | N/A |
| 4 | 6 | 6 | N/A |
| 5 | 10 | 10 | N/A |
| 6 | 48 | 48 | N/A |
| Two Zone Plug Flow Reactor | | | |
| 7 | 12 | 42 | N/A |
| 8 | 9 | 30 | N/A |
| 9 | 9 | 48 | N/A |
| 10 | 6 | 18 | N/A |
| 11 | 18 | 36 | N/A |
| 12 | 24 | 54 | N/A |
| Three Zone Plug Flow Reactor | | | |
| 13 | 12 | 24 | 200% |
| 14 | 12 | 36 | 100% |
| 15 | 18 | 36 | 100% |
| 16 | 12 | 24 | 50% |
| 17 | 12 | 18 | 200% |
| 18 | 18 | 36 | 100% |
| 19 | 12 | 30 | 200% |
| 20 | 12 | 54 | 50% |
| 21 | 18 | 48 | 50% |
| 22 | 12 | 54 | 100% |
| 23 | 18 | 54 | 200% |

TABLE 2

Reactor Sampling Plan

| Location | Flow Rate | T | pH | ORP | TSS/ VSS | VFA | TKN, NO2−, NO3−, NH3 | Soluble TKN, NO2−, NO3−, NH3 | Mg | TP, sTP, Ortho-P |
|---|---|---|---|---|---|---|---|---|---|---|
| Influent | Daily | Daily | Daily | Daily | 3/day | 3-4/week | 2-3/week | 2-3/week | 2-3/week | 3-4/week |
| Reactor Contents | N/A | Daily | Daily | Daily | Daily | 3-4/week | 2-3/week | 2-3/week | 2-3/week | 3-4/week |
| Effluent | Daily | N/A | Daily | Daily | Daily | 3-4/week | 2-3/week | 2-3/week | 2-3/week | 3-4/week |
| Waste Solids | Daily | N/A | N/A | N/A | Daily | N/A | 2-3/week | 2-3/week | 2-3/week | 3-4/week |

Effluent ortho-P concentrations were dependent on the SRT and reactor ortho-P release was similar to batch testing when comparing equivalent SRT. The two-zone plug flow reactor concentrated the feed sludge in the reactor by natural thickening action, and a lower solids concentration supernatant stream was created. The separation and thickening facilitated uncoupling of HRT from SRT. While HRTs were reduced between 6 and 24 hours, SRTs were maintained in the range from 18 to 54 hours, resulting in a significant reduction in required reactor size compared to the conventional complete mix reactor, while maintaining a high level of performance.

The two-zone reactor required frequent operator adjustments to sludge wasting rate to maintain a stable SRT and solids balance when the solids inventory was high (high SRT conditions) and/or during periods with high reactor flow velocities (low HRT conditions), leading to solids washout. To improve operational control and reliability, the three-zone reactor was developed, and a bench scale reactor was tested for comparison to the complete mix and two-zone reactors. The three-zone reactor operated with a more stable SRT than the two-zone reactor, maintained high ortho-P release performance and a lower, more stable effluent/supernatant solids concentration.

Increasing the internal recycle rate of the three-zone reactor generally decreased reactor phosphorus release performance. Increasing the internal flow rate through the reactor conveyed nitrates from the influent further into the reactor, increasing the portion of the reactor in denitrification mode and decreasing the anaerobic portion of the reactor. Additionally, higher recycle rates shift the reactor from plug-flow to more mixed (hydraulic mixing effect). Recycle pump flow rates were fixed for each run during the bench tests to determine the impact of varied flow rates. However, it is anticipated that in practice variable flow rate recycle pumps will be used to maintain the target solids balance/SRT in the reactor using the lowest possible flow rate.

Based on batch testing periodically conducted during the reactor testing, the maximum percent phosphorus release (effluent ortho-P/influent total P) possible was approximately 34%-38%. The percent phosphorus release is a parameter that is commonly used to measure and compare performance of P-release systems. The maximum release was found to occur with long SRTs (typically >48 hours) and/or significant VFA addition. FIG. 11 illustrates the relationship. All three bench scale reactors showed similar response of increased phosphorus release with increased SRT. As previously noted, the practical maximum phosphorus release occurred at SRT of approximately 48+ hours.

However, when comparing HRT and phosphorus release, the plug flow reactors showed increased phosphorus release at lower HRTs, due to higher corresponding SRT, compared to the complete mix reactor as shown in FIG. 12. Also, as HRT is equal to SRT for the complete mix reactor (by definition), FIG. 12 further supports the need for a longer HRT=SRT and therefore larger reactor volumes to facilitate phosphorus release for a complete-mix reactor configuration. Table 3 summarizes the phosphorus release for each of the test runs. By definition, a complete-mix reactor has a HRT equal to SRT.

TABLE 3

Reactor Phosphorus Release Comparison

| Run | Hydraulic Retention Time, HR | Solids Retention Time, HR | Internal Recycle Flow Rate, % Inf. | Average Percent Phosphorus Release (Effluent Ortho-P/ Influent Total-P) |
|---|---|---|---|---|
| Complete Mix Reactor* | | | | |
| 1 | 24 | 24 | N/A | 26.2% |
| 2 | 16 | 16 | N/A | 24.9% |
| 3 | 12 | 12 | N/A | 21.0% |
| 4 | 6 | 6 | N/A | 6.3% |
| 5 | 10 | 10 | N/A | 28.4% |
| 6 | 48 | 48 | N/A | 30.8% |
| Two Zone Plug Flow Reactor | | | | |
| 7 | 12 | 42 | N/A | 31.4% |
| 8 | 9 | 30 | N/A | 28.7% |
| 9 | 9 | 48 | N/A | 31.6% |
| 10 | 6 | 18 | N/A | 22.5% |
| 11 | 18 | 36 | N/A | 34.5% |
| 12 | 24 | 54 | N/A | 36.5% |
| Three Zone Plug Flow Reactor | | | | |
| 13 | 12 | 24 | 200% | 25.2% |
| 14 | 12 | 36 | 100% | 32.6% |
| 15 | 18 | 36 | 100% | 33.0% |
| 16 | 12 | 24 | 50% | 27.8% |
| 17 | 12 | 18 | 200% | 27.0% |
| 18 | 18 | 36 | 100% | 32.9% |
| 19 | 12 | 30 | 200% | 27.7% |
| 20 | 12 | 54 | 50% | 34.9% |
| 21 | 18 | 48 | 50% | 34.0% |
| 22 | 12 | 54 | 100% | 30.7% |
| 23 | 18 | 54 | 200% | 27.1% |

The inventions being thus described, variations may be made, but are not to be regarded as a departure from the spirit and scope of the inventions and all such modifications are intended to be included within the scope of the following claims.

| | | | | Influent/Feed | | | | |
|---|---|---|---|---|---|---|---|---|
| Date | Scenario | Actual HRT, Hr | Actual SRT, Hr | Reactor T, F | TSS, mg/L | VSS, mg/L | pH | ORP, mV | VFA, mg-HAc/L |
| Sep. 29, 2016 | Baseline | | | | | | | | |
| Sep. 30, 2016 | Two Zone | | | | | | | | |
| Oct. 1, 2016 | Reactor | | | | 12,114 | | | | |
| Oct. 2, 2016 | | | | | 11,778 | | | | |
| Oct. 3, 2016 | | | | | 10,432 | | | | |
| Oct. 4, 2016 | | | | | 11,665 | | | | |
| Oct. 5, 2016 | | | | | 12,074 | | | | |
| Oct. 6, 2016 | | | | | 11,264 | | | | |
| Oct. 7, 2016 | | | | | 12,338 | | | | |
| Oct. 8, 2016 | | | | | 10,623 | | | | |
| Oct. 9, 2016 | | | | | 10,815 | | | | |
| Oct. 10, 2016 | | | | | 11,857 | | | | |

| Date | Scenario | | | | | | | | |
|---|---|---|---|---|---|---|---|---|---|
| Oct. 11, 2016 | | 21.6 | 39.3 | | 14,623 | | | | |
| Oct. 12, 2016 | | 13.2 | 50.5 | | 12,674 | | | | |
| Oct. 13, 2016 | | 14.0 | 21.3 | | 10,479 | | | | |
| Oct. 14, 2016 | | 14.2 | 52.1 | | 11,692 | | | | |
| Oct. 15, 2016 | | 13.2 | 40.1 | | 11,269 | | | | |
| Oct. 16, 2016 | | 11.4 | 44.8 | 69 | 7,874 | | | | |
| Oct. 17, 2016 | | 11.6 | 43.3 | 72 | 10,008 | | | | |
| Oct. 18, 2016 | | 12.9 | 41.5 | | 11,414 | | | | |
| Oct. 19, 2016 | | 12.2 | 36.2 | 70 | 9,536 | | | | |
| Oct. 20, 2016 | | 12.9 | 40.0 | 71 | 7,300 | 6,200 | | | |
| Oct. 21, 2016 | | 12.9 | 45.7 | 75 | 9,837 | | | | |
| Oct. 22, 2016 | | 13.1 | 45.5 | 78 | 9,212 | 7,185 | | | |
| Oct. 23, 2016 | | 12.8 | 47.6 | | 8,454 | | | | |
| Oct. 24, 2016 | | 11.1 | 34.7 | 72 | 5,900 | 4,600 | | | |
| Oct. 25, 2016 | | 11.6 | 49.8 | 71 | 8,900 | 7,100 | 7.8 | | |
| Oct. 26, 2016 | Scenario 7 | 11.7 | 38.4 | 68 | 7,890 | 6,890 | 7.7 | | |
| Oct. 27, 2016 | HRT12; SRT42 | 11.8 | 39.2 | 69 | 8,100 | 6,200 | | | |
| Oct. 28, 2016 | | 13.1 | 40.2 | 68 | 9,929 | | | | |
| Oct. 29, 2016 | | 13.1 | 38.8 | | 9,890 | | | | |
| Oct. 30, 2016 | | 12.3 | 39.5 | 71 | 10,285 | | 7.6 | | |
| Oct. 31, 2016 | | 11.0 | 50.2 | | 11,066 | | 7.4 | | |
| Nov. 1, 2016 | | 12.1 | 42.2 | | 8,100 | 6,800 | | | |
| Nov. 2, 2016 | | 10.2 | 33.9 | 74 | 9,974 | | 7.3 | 215 | |
| Nov. 3, 2016 | scenario 8 | 9.4 | 26.8 | 73 | 7,100 | 5,700 | 7.2 | 204 | |
| Nov. 4, 2016 | HRT9, SRT30 | 9.2 | 31.9 | 74 | 9,260 | | 7.2 | 210 | |
| Nov. 5, 2016 | | 9.8 | 32.0 | 75 | 11,199 | | 7.5 | 225 | |
| Nov. 6, 2016 | | 8.9 | 31.6 | 72 | 10,330 | | 7.3 | 198 | |
| Nov. 7, 2016 | | 8.8 | 25.5 | 74 | 7,600 | 6,380 | 6.9 | 272 | 79.6 |
| Nov. 8, 2016 | | 8.4 | 34.7 | | 9,500 | 7,700 | 7.7 | | |
| Nov. 9, 2016 | | 9.2 | 47.3 | | 9,000 | 6,980 | 7.1 | | |
| Nov. 10, 2016 | scenario 9 | 8.4 | 55.8 | 72 | 10,285 | | 7.4 | 211 | |
| Nov. 11, 2016 | HRT9, SRT48 | 9.0 | 45.4 | 73 | 9,381 | | 7.3 | 285 | |
| Nov. 12, 2016 | | 10.8 | 47.5 | | 8,094 | | | | |
| Nov. 13, 2016 | | 9.7 | 51.4 | | 9,947 | | | | 69.4 |
| Nov. 14, 2016 | | 9.7 | 42.5 | 75 | 8,300 | 6,900 | 7.2 | 230 | |
| Nov. 15, 2016 | | 6.1 | 37.5 | 74 | 10,200 | 8,200 | 7.4 | 225 | 85.9 |
| Nov. 16, 2016 | | 6.0 | 19.8 | 75 | 9,000 | 7,300 | 7.0 | 255 | 69.1 |
| Nov. 17, 2016 | scenario 10 | 6.1 | 18.9 | 76 | 10,689 | | | | |
| Nov. 18, 2016 | HRT6, SRT18 | 6.2 | 17.6 | | 11,034 | | 6.7 | 304 | 74.5 |
| Nov. 19, 2016 | | 6.7 | 17.7 | | 10,576 | | | | |
| Nov. 20, 2016 | | 6.1 | 18.0 | 74 | 10,913 | 7,900 | 6.9 | 215 | |
| Nov. 21, 2016 | | 6.2 | 18.7 | 76 | 11,363 | | 7.4 | 241 | |
| Nov. 22, 2016 | | 6.2 | 17.9 | 77 | 8,992 | | 7.2 | 236 | |
| Nov. 23, 2016 | | 17.7 | 36.4 | | 6,844 | 4,859 | | | 95.3 |
| Nov. 24, 2016 | | 18.4 | 39.9 | 75 | 7,822 | | | | |
| Nov. 25, 2016 | | 17.9 | 37.5 | 75 | 7,089 | | | | |
| Nov. 26, 2016 | | 18.3 | 39.5 | 73 | 8,336 | | | | |
| Nov. 27, 2016 | scenario 11 | 18.3 | 35.7 | 75 | 9,044 | | | | |
| Nov. 28, 2016 | HRT18, SRT36 | 18.2 | 38.5 | 71 | 8,800 | 7,040 | 7.3 | 210 | 86.7 |
| Nov. 29, 2016 | | 18.4 | 37.6 | 76 | 9,500 | | | | |
| Nov. 30, 2016 | | 18.2 | 36.8 | 76 | 11,333 | | 7.1 | 200 | |
| Dec. 1, 2016 | | 18.9 | 35.8 | 74 | 11,689 | 7,460 | 7.5 | 198 | 78.3 |
| Dec. 2, 2016 | Scenario 12 | 23.1 | 54.1 | 73 | 8,800 | 7,500 | | | |
| Dec. 3, 2016 | HRT24, SRT54 | 23.5 | 54.8 | 76 | 8,800 | 8,500 | 7.2 | | |
| Dec. 4, 2016 | | 23.9 | 56.0 | 76 | 10,267 | | 7.1 | 202 | 96.0 |
| Dec. 5, 2016 | | 23.0 | 56.9 | 72 | 11,611 | 8,200 | 7.3 | | |
| Dec. 6, 2016 | | 23.9 | 57.6 | 75 | 10,882 | | | | 81.2 |
| Dec. 7, 2017 | n/a | 23.4 | 56.1 | 75 | 10,820 | | 7.1 | 186 | |
| Dec. 8, 2017 | n/a | 23.8 | 55.5 | 73 | 10,820 | | | | |
| Dec. 9, 2017 | | 23.1 | 52.5 | 68 | 9,075 | | 7.0 | 191 | 74.6 |
| Dec. 10, 2017 | | 24.1 | 57.1 | 70 | 11,169 | 7,900 | | | |
| Feb. 27, 2017 | | 10.6 | 25.3 | 68 | 15,570 | | | | 68.4 |
| Feb. 28, 2017 | | 12.2 | 27.0 | 72 | 15,390 | 11,390 | | | |
| Mar. 1, 2017 | | 12.1 | 16.7 | 68 | 14,569 | 11,360 | | | 74.5 |
| Mar. 2, 2017 | SCENARIO 13 | 12.4 | 21.3 | 73 | 14,327 | 10,460 | 6.9 | 25 | |
| Mar. 3, 2017 | HRT12, SRT24 | 11.7 | 23.2 | 70 | 12,746 | 9,300 | | 109 | 96.4 |
| Mar. 4, 2017 | Qr = 200 | 11.6 | 27.1 | 71 | 14,802 | 11,840 | | 127 | |
| Mar. 5, 2017 | | 12.4 | 23.8 | 69 | 14,194 | 10,500 | | 107 | 95.1 |
| Mar. 6, 2017 | | 12.6 | 25.6 | 73 | 13,506 | 10,530 | | 168 | |
| Mar. 7, 2017 | | 12.9 | 23.3 | 69 | 13,569 | 10,040 | 6.9 | −114 | 86.6 |
| Mar. 8, 2017 | | 12.7 | 24.7 | 74 | 13,939 | 11,150 | | | |

-continued

| Date | Scenario | | | | | | | | |
|---|---|---|---|---|---|---|---|---|---|
| Mar. 9, 2017 | | 14.5 | 35.0 | 70 | 13,521 | 10,820 | 7.1 | 196 | 59.0 |
| Mar. 10, 2017 | Scenario 14 | 12.6 | 36.2 | 69 | 15,476 | 12,690 | | | |
| Mar. 11, 2017 | HRT = 12, | 11.7 | 35.3 | 68 | 14,475 | 11,000 | 7.0 | 212 | 74.0 |
| | SRT = 42 | | | | | | | | |
| Mar. 12, 2017 | Qr = 100 | 11.8 | 37.6 | 67 | 12,766 | 10,340 | | | |
| Mar. 13, 2017 | | 12.8 | 34.6 | 68 | 11,263 | 9,240 | | 157 | 88.3 |
| Mar. 14, 2017 | | 12.7 | 35.6 | 69 | 10,850 | 8,350 | 7.2 | 206 | |
| Mar. 15, 2017 | | 12.5 | 36.1 | | 10.699 | 8,350 | | 168 | 64.1 |
| Mar. 16, 2017 | | 17.7 | 36.8 | 68 | 8,612 | 6,800 | 7.1 | 89 | |
| Mar. 17, 2017 | | 16.7 | 38.8 | 66 | 13,339 | 10,540 | | 93 | 54.8 |
| Mar. 18, 2017 | Scenario 15 | 18.5 | 35.6 | 66 | 12,150 | 9,960 | 7.0 | 179 | |
| Mar. 19, 2017 | H = 18, | 17.6 | 38.7 | 70 | 12,833 | 9,750 | | 141 | 55.1 |
| | H = 48 | | | | | | | | |
| Mar. 20, 2017 | Qr = 200 | 17.8 | 35.5 | 65 | 14,080 | 10,980 | 6.9 | 140 | |
| Mar. 21, 2017 | | 18.1 | 36.5 | 65 | 13,912 | 10,710 | | 164 | |
| Mar. 22, 2017 | | 17.8 | 36.9 | | 13,650 | 11,060 | 7.4 | 185 | 91.0 |
| Mar. 23, 2017 | | 17.4 | 36.7 | 69 | 13,125 | 10,240 | | 135 | |
| Mar. 24, 2017 | | 17.4 | 37.2 | 70 | 13,000 | 10,010 | 7.2 | | 92.0 |
| May 1, 2017 | | 12.7 | 25.7 | | 9,500 | 7,000 | 6.8 | | |
| May 2, 2017 | | 12.8 | 23.4 | 66 | | | 7.4 | | |
| May 3, 2017 | Scenario 16 | 12.3 | 24.6 | 64 | | | 7.3 | | |
| May 4, 2017 | HRT = 12 | 12.0 | 24.6 | 68 | 12,400 | 9,000 | 6.6 | | 68.0 |
| May 5, 2017 | SRT = 24 | 12.3 | 24.7 | 62 | 12,600 | 9,400 | 6.7 | −217 | |
| May 6, 2017 | Qr = 50 | 12.3 | 27.9 | 66 | 11,480 | | 7.3 | 24 | |
| May 7, 2017 | | 12.2 | 23.7 | 74 | 10,450 | | 7.3 | 69 | |
| May 8, 2017 | | 12.2 | 23.8 | 69 | 10,500 | 7,900 | 7.2 | 54 | |
| May 9, 2017 | | 11.7 | 25.2 | 69 | 11,800 | | 6.7 | 10 | |
| May 10, 2017 | | 11.8 | 23.4 | 62 | 11,200 | 8,100 | 6.7 | −27 | 128.0 |
| May 11, 2017 | | 11.7 | 26.8 | 74 | 8,900 | | 7.0 | 24 | |
| May 12, 2017 | | 11.8 | 22.8 | 64 | 9,930 | | 6.9 | 3 | 85.0 |
| May 13, 2017 | | 12.1 | 24.0 | 63 | 10,300 | 8,000 | 7.2 | 32 | |
| May 14, 2017 | | 12.7 | 18.6 | 62 | 9,820 | | 6.8 | −36 | |
| May 15, 2017 | Scenario 17 | 12.3 | 18.5 | 64 | 9,100 | 6,700 | 7.3 | 32 | 69.3 |
| May 16, 2017 | HRT = 18 | 11.9 | 18.0 | 75 | 8,400 | | 6.9 | 68 | |
| May 17, 2017 | SRT = 24 | 12.0 | 18.5 | 74 | 9,100 | | | | |
| May 18, 2017 | Qr = 200 | 12.6 | 17.7 | 68 | 9,600 | 7,300 | 7.0 | 68 | |
| May 19, 2017 | | 12.0 | 18.3 | 65 | 10,300 | 7,700 | 7.1 | 59 | |
| May 20, 2017 | | 11.7 | 18.1 | 69 | 10,000 | 7,500 | 6.7 | 78 | 79.0 |
| May 21, 2017 | | 11.9 | 18.3 | 65 | 10,300 | | 6.9 | 41 | |
| May 22, 2017 | | 17.9 | 37.6 | | 9,700 | 7,200 | 7.3 | 35 | |
| May 23, 2017 | | 17.7 | 36.1 | 65 | 9,900 | | 7.0 | | |
| May 24, 2017 | Scenario 18 | 17.7 | 36.1 | 63 | 10,200 | | | 22 | 47.0 |
| May 25, 2017 | H = 18 | 17.8 | 35.2 | | 9,400 | | 7.2 | | |
| May 26, 2017 | S = 36 | 19.7 | 36.2 | 67 | 9,800 | | 7.1 | 95 | |
| May 27, 2017 | Qr = 200 | 19.7 | 37.1 | 64 | 11,300 | | 6.8 | 58 | |
| May 28, 2017 | | 19.9 | 34.3 | 68 | 8,000 | | 6.6 | −36 | 82.0 |
| May 29, 2017 | | 18.1 | 35.2 | 65 | 10,000 | 7,300 | 6.8 | −15 | |
| May 30, 2017 | | 19.7 | 36.2 | 74 | | | 7.2 | −19 | |
| May 31, 2017 | | 12.4 | 32.5 | 70 | 8,900 | | 6.7 | 8 | 59.0 |
| Jun. 1, 2017 | | 11.6 | 28.7 | 66 | | | 7.3 | −16 | |
| Jun. 2, 2017 | Scenario 19 | 12.4 | 32.9 | 66 | 11,300 | 10,900 | 6.9 | 39 | |
| Jun. 3, 2017 | h = 12 | 12.1 | 28.2 | 66 | | | 6.7 | 13 | 86.0 |
| Jun. 4, 2017 | s = 30 | 12.4 | 29.6 | 75 | 10,900 | | 7.3 | −24 | |
| Jun. 5, 2017 | Qr = 200 | 13.0 | 29.3 | 74 | 10,700 | 7,500 | 6.9 | −8 | |
| Jun. 6, 2017 | | 12.1 | 29.6 | 74 | 9,400 | | 6.7 | 35 | |
| Jun. 7, 2017 | | 12.8 | 30.0 | 70 | | | 7.2 | 8 | |
| Jun. 8, 2017 | | 12.3 | 34.8 | 73 | 12,500 | 9,300 | 6.9 | 46 | |
| Jun. 9, 2017 | | 12.2 | 31.5 | 63 | 9,200 | 6,300 | 6.8 | 36 | 110.0 |
| Jun. 10, 2017 | | 12.2 | 58.1 | 65 | 10,600 | 7,200 | 6.9 | 22 | |
| Jun. 11, 2017 | RUN 20 | 13.2 | 51.7 | 66 | | | 7.2 | −24 | |
| Jun. 12, 2017 | h = 12 | 12.4 | 56.7 | 69 | 9,800 | 7,000 | 7.3 | −10 | 52.0 |
| Jun. 13, 2017 | s = 54 | 14.2 | 45.6 | 65 | 10,500 | 7,700 | 7.3 | −8 | |
| Jun. 14, 2017 | Qr = 50 | 14.3 | 43.7 | 70 | | | 7.3 | −12 | |
| Jun. 15, 2017 | | 14.5 | 50.7 | 66 | 10,700 | 7,800 | 7.2 | 80 | 85.0 |
| Jun. 16, 2017 | | 13.9 | 50.0 | 65 | 9,900 | 7,400 | 7.2 | −25 | |
| Jun. 17, 2017 | | 13.5 | 50.3 | 68 | | | 6.7 | 54 | |
| Jun. 18, 2017 | | 11.7 | 46.9 | 66 | | | 7.1 | −12 | 67.0 |
| Jun. 19, 2017 | | 13.4 | 50.1 | 66 | 9,600 | 7,300 | 6.6 | −40 | |
| Jun. 20, 2017 | | 13.1 | 48.6 | 66 | 7,700 | 5,900 | 6.8 | −10 | |
| Jun. 21, 2017 | | 13.7 | 50.4 | 67 | 8,600 | | 6.9 | 57 | |
| Jun. 22, 2017 | | 18.0 | 45.3 | 69 | | | 6.9 | −5 | 112.0 |
| Jun. 23, 2017 | | 17.9 | 48.0 | 67 | 9,500 | | 6.8 | 47 | |
| Jun. 24, 2017 | run 21 | 18.7 | 44.6 | 66 | 10,200 | | 6.6 | 79 | |
| Jun. 25, 2017 | H = 18 | 18.2 | 45.8 | 69 | | | 6.9 | −18 | 132.0 |
| Jun. 26, 2017 | S = 48 | 18.1 | 45.9 | 66 | 11,900 | 8,000 | 7.1 | 59 | |
| Jun. 27, 2017 | Qr = 50 | 18.4 | 47.4 | 70 | 8,600 | | 7.0 | 3 | |
| Jun. 28, 2017 | | 17.4 | 49.2 | 70 | | | 6.6 | 32 | 99.0 |
| Jun. 29, 2017 | | 18.0 | 47.7 | 68 | 5,500 | 4,000 | 7.0 | 75 | |
| Jun. 30, 2017 | | 17.9 | 49.5 | 66 | 10,500 | 8,100 | 7.0 | 51 | |

-continued

| Date | | | | | | | | | |
|---|---|---|---|---|---|---|---|---|---|
| Jul. 1, 2017 | | 18.1 | 44.4 | 66 | 7,100 | 5,200 | 7.4 | −41 | 97.0 |
| Jul. 2, 2017 | | 17.9 | 41.2 | 69 | 7,400 | 5,600 | 7.4 | 5 | |
| Jul. 3, 2017 | | 18.4 | 46.9 | 68 | 6,000 | 4,800 | 7.2 | 64 | |
| Jul. 4, 2017 | | 18.1 | 49.4 | 68 | | | 6.9 | −33 | 58.0 |
| Jul. 5, 2017 | | 18.4 | 49.5 | 69 | | | 7.3 | 49 | |
| Jul. 6, 2017 | | 12.5 | 56.8 | 70 | 9,800 | 8,300 | 7.3 | 64 | |
| Jul. 7, 2017 | | 12.2 | 46.2 | 70 | 9,600 | | 6.9 | 15 | 98.0 |
| Jul. 8, 2017 | run 22 | 12.7 | 54.5 | 71 | | | 7.3 | 63 | |
| Jul. 9, 2017 | h = 12 | 12.6 | 54.5 | 69 | 10,200 | | 7.4 | 32 | 95.0 |
| Jul. 10, 2017 | s = 54 | 12.5 | 52.3 | 68 | 8,500 | 6,900 | 6.7 | 48 | |
| Jul. 11, 2017 | Qr = 100 | 12.8 | 44.5 | 70 | 9,000 | | 7.1 | 64 | 68.7 |
| Jul. 12, 2017 | | 12.5 | 54.7 | 68 | 9,400 | | 7.3 | 97 | |
| Jul. 13, 2017 | | 12.2 | 38.1 | 71 | 9,900 | | 6.6 | −34 | 57.0 |
| Jul. 14, 2017 | | 12.2 | 42.4 | 71 | | | 7.3 | 72 | |
| Jul. 15, 2017 | | 12.3 | 39.6 | 71 | 10,400 | | 7.1 | −24 | 61.0 |
| Jul. 16, 2017 | | 12.7 | 51.3 | 71 | 8,400 | | 7.0 | 78 | |
| Jul. 17, 2017 | | 12.3 | 53.6 | 70 | 7,800 | 6,500 | 6.6 | 79 | 49.5 |
| Jul. 18, 2017 | | 12.3 | 53.5 | 69 | 6,100 | 4,900 | 7.1 | 48 | |
| Jul. 19, 2017 | | 11.7 | 52.2 | 68 | | | 6.7 | 26 | |
| Jul. 20, 2017 | | 18.3 | 60.7 | 71 | | | 7.0 | 20 | 41.0 |
| Jul. 21, 2017 | | 18.2 | 53.6 | 69 | 6,400 | | 7.3 | −32 | |
| Jul. 22, 2017 | | 17.3 | 56.0 | 68 | | | 6.8 | 64 | |
| Jul. 23, 2017 | run 23 | 18.2 | 52.7 | 71 | 6,900 | | 7.4 | −41 | 49.0 |
| Jul. 24, 2017 | h = 18 | 17.5 | 52.8 | 74 | 6,200 | 4,600 | 6.8 | 76 | |
| Jul. 25, 2017 | s = 54 | 17.7 | 51.5 | 70 | | | 6.9 | −32 | 67.0 |
| Jul. 26, 2017 | Qr = 200 | 17.6 | 52.7 | 71 | 7,900 | | 6.9 | 84 | |
| Jul. 27, 2017 | | 18.2 | 55.3 | 70 | | | 6.9 | 42 | |
| Jul. 28, 2017 | | 17.8 | 53.4 | 70 | 8,900 | | 7.3 | 37 | 72.0 |
| Jul. 29, 2017 | | 18.1 | 55.8 | 71 | 9,600 | | 7.0 | −23 | |
| Jul. 30, 2017 | | 18.0 | 54.7 | 70 | | | 7.1 | 15 | 64.0 |
| Jul. 31, 2017 | | 18.0 | 48.9 | 68 | 11,500 | 9,200 | 6.8 | −22 | |
| Aug. 1, 2017 | | 17.7 | 55.2 | 68 | 10,600 | 8,300 | 6.8 | 71 | 107.0 |
| Aug. 2, 2017 | | 18.0 | 54.1 | 70 | 12,200 | 10,000 | 6.6 | −33 | |

Influent/Feed

| | TKN, mg/L | Soluble TKN, mg/L | NH3, mg/L | sol. NH3, mg/L | NO2+ NO3, mg/L | sol. NO2+ NO3, mg/L | Mg, mg/L | TP, mg-P/L | sTP, mg-P/L | OrthoP, mg-P/L |
|---|---|---|---|---|---|---|---|---|---|---|
| Sep. 29, 2016 | | | | | | | | | | |
| Sep. 30, 2016 | | | | | | | | | | |
| Oct. 1, 2016 | | | | | | | | | | |
| Oct. 2, 2016 | | | | | | | | | | |
| Oct. 3, 2016 | | | | | | | | | | |
| Oct. 4, 2016 | | | | | | | | | | |
| Oct. 5, 2016 | | | | | | | | | | |
| Oct. 6, 2016 | | | | | | | | | | |
| Oct. 7, 2016 | | | | | | | | | | |
| Oct. 8, 2016 | | | | | | | | | | |
| Oct. 9, 2016 | | | | | | | | | | |
| Oct. 10, 2016 | | | | | | | | | | |
| Oct. 11, 2016 | | | | | | | | | | |
| Oct. 12, 2016 | | | | | | | | | | |
| Oct. 13, 2016 | | | | | | | | | | |
| Oct. 14, 2016 | | | | | | | | | | |
| Oct. 15, 2016 | | | | | | | | | | |
| Oct. 16, 2016 | | | | | | | | | | |
| Oct. 17, 2016 | | | | | | | | | | |
| Oct. 18, 2016 | | | | | | | | | | |
| Oct. 19, 2016 | | | | | | | | | | |
| Oct. 20, 2016 | | | | | | | | | 227.0 | 7.4 | 7.3 |
| Oct. 21, 2016 | | | | | | | | | | |
| Oct. 22, 2016 | | | | | | | | | 265.0 | | |
| Oct. 23, 2016 | | | | | | | | | | |
| Oct. 24, 2016 | | | | | | | | 21.0 | 167.0 | 37.4 | 8.0 |
| Oct. 25, 2016 | | | 3.1 | | | | | 20.2 | 171.0 | 36.7 | 8.7 |
| Oct. 26, 2016 | 494 | 20.7 | 2.5 | 1.3 | | | 19.8 | | | |
| Oct. 27, 2016 | 581 | 22.7 | 2.4 | 1.2 | | | | 199.0 | 25.9 | 9.3 |
| Oct. 28, 2016 | | | | | | | 23.1 | 225.6 | | |
| Oct. 29, 2016 | | | | | | | | 236.0 | | |
| Oct. 30, 2016 | | | | | | | | | | |
| Oct. 31, 2016 | | | | | | | | 245.0 | 69.0 | 11.0 |
| Nov. 1, 2016 | 576 | 42.7 | 2.5 | 1.3 | 16.0 | 0.9 | 37.2 | 196.0 | | |
| Nov. 2, 2016 | 476 | 26.2 | 2.0 | 1.1 | 19.0 | 0.0 | 26.2 | 194.0 | 21.2 | 10.1 |
| Nov. 3, 2016 | | | | | | | 23.4 | 197.0 | 14.3 | 9.1 |
| Nov. 4, 2016 | 708 | 21.4 | 3.0 | 1.6 | 19.9 | 0.0 | | 248.0 | 59.9 | 11.3 |
| Nov. 5, 2016 | | | | | | | | 177.0 | | |

-continued

| Date | | | | | | | | | | |
|---|---|---|---|---|---|---|---|---|---|---|
| Nov. 6, 2016 | | | | | | | | 182.0 | | |
| Nov. 7, 2016 | 603 | 16.5 | 2.8 | 1.3 | | | 24.1 | 187.0 | 20.4 | |
| Nov. 8, 2016 | | | 2.1 | | | | | 204.0 | 32.8 | 8.3 |
| Nov. 9, 2016 | | | | | | | 21.4 | 202.0 | 22.3 | 7.7 |
| Nov. 10, 2016 | 632 | 23.4 | 2.8 | 1.3 | | 0.0 | 21.9 | 249.0 | 27.1 | 9.0 |
| Nov. 11, 2016 | | | | | | | | 214.0 | | 9.6 |
| Nov. 12, 2016 | | | | | | | | | | |
| Nov. 13, 2016 | | | | | | | | | | |
| Nov. 14, 2016 | 643 | 8.0 | 2.9 | 1.3 | 17.3 | 0.0 | | 217.0 | 15.3 | 11.1 |
| Nov. 15, 2016 | | | | | | | | 197.2 | | 7.9 |
| Nov. 16, 2016 | 633 | 13.7 | 2.5 | 1.6 | 16.8 | <0.40 | 29.2 | 267.0 | | 12.8 |
| Nov. 17, 2016 | | | | | | | | 273.0 | 31.2 | 12.9 |
| Nov. 18, 2016 | | | | | | | | 263.0 | | 12.1 |
| Nov. 19, 2016 | | | | | | | | | | |
| Nov. 20, 2016 | | | | | | | | 266.0 | | 12.1 |
| Nov. 21, 2016 | 652 | 12.8 | 3.8 | 1.4 | 15.2 | 0.0 | 26.6 | 257.0 | 24.9 | 11.1 |
| Nov. 22, 2016 | | | | | | | | | | |
| Nov. 23, 2016 | | | | | | | 31.8 | 174.0 | | 9.2 |
| Nov. 24, 2016 | | | | | | | | | | |
| Nov. 25, 2016 | | | | | | | | | | |
| Nov. 26, 2016 | | | | | | | | | | |
| Nov. 27, 2016 | | | | | | | | | | 9.2 |
| Nov. 28, 2016 | 529 | 9.7 | 3.7 | 1.7 | 15.9 | 0.0 | 26.7 | 176.0 | 22.6 | 10.8 |
| Nov. 29, 2016 | | | | | | | | 275.5 | 21.8 | 10.7 |
| Nov. 30, 2016 | | | | | | | | 316.0 | | 9.4 |
| Dec. 1, 2016 | 588 | 16.8 | 4.7 | 1.7 | 14.9 | 0.1 | 23.4 | 309.0 | 29.4 | 10.2 |
| Dec. 2, 2016 | | | | | | | | 184.8 | 15.2 | 9.7 |
| Dec. 3, 2016 | | | | | | | | 215.6 | 19.8 | 12.6 |
| Dec. 4, 2016 | 594 | 14.7 | 4.2 | 1.3 | 13.4 | 0.0 | 30.5 | 232.3 | 22.8 | 7.3 |
| Dec. 5, 2016 | | | | | | | | | | |
| Dec. 6, 2017 | | | | | | | | 296.0 | | 8.8 |
| Dec. 7, 2017 | | | | | | | | | | |
| Dec. 8, 2017 | 624 | 17.3 | 3.7 | 1.2 | 14.8 | 0.0 | 24.1 | 288.0 | | 7.9 |
| Dec. 9, 2017 | | | | | | | | | | |
| Dec. 10, 2017 | | | | | | | 22.4 | 293.0 | | 6.9 |
| Feb. 27, 2017 | | | | | | | 30.5 | 201.7 | | |
| Feb. 28, 2017 | | | | | | | | 166.4 | | |
| Mar. 1, 2017 | | | | | | | | | | |
| Mar. 2, 2017 | | | | | | | 31.8 | 190.0 | 14.0 | 3.5 |
| Mar. 3, 2017 | 634 | 22.8 | | | | | | | | |
| Mar. 4, 2017 | | | | | | | | 187.6 | 13.4 | 3.9 |
| Mar. 5, 2017 | | | | | | | | 197.1 | | 4.4 |
| Mar. 6, 2017 | 576 | 26.4 | | | | | | 157.5 | | |
| Mar. 7, 2017 | | | 1.0 | 0.4 | | | 24.5 | 253.6 | 8.6 | 3.8 |
| Mar. 8, 2017 | | | | | | | | 276.0 | | 17.2 |
| Mar. 9, 2017 | | | | | | | 26.8 | 162.4 | | 49.5 |
| Mar. 10, 2017 | | | | | | | | 252.0 | 23.1 | |
| Mar. 11, 2017 | 561 | 21.9 | 2.7 | 1.2 | 18.9 | | 34.6 | 243.0 | | |
| Mar. 12, 2017 | | | | | | | | 305.0 | 27.6 | |
| Mar. 13, 2017 | 645 | | | | | | 31.8 | 167.9 | 10.5 | 12.4 |
| Mar. 14, 2017 | | | | | | | | 128.1 | | |
| Mar. 15, 2017 | | | | | | | | 243.6 | | |
| Mar. 16, 2017 | | | 3.5 | 1.7 | 14.2 | | 22.7 | 211.4 | 27.5 | 5.9 |
| Mar. 17, 2017 | 694 | | | | | | | | | 4.2 |
| Mar. 18, 2017 | | | | | | | 29.4 | | | |
| Mar. 19, 2017 | | | | | | | | 287.0 | 27.2 | 7.1 |
| Mar. 20, 2017 | | | | | | | 24.2 | 318.9 | | 6.8 |
| Mar. 21, 2017 | | | | | | | | | | 4.9 |
| Mar. 22, 2017 | 602 | 24.3 | 3.1 | 1.6 | 16.8 | | 24.6 | 301.5 | 34.6 | 9.1 |
| Mar. 23, 2017 | | | | | | | | | | 5.2 |
| Mar. 24, 2017 | | | | | | | 33.7 | 311.2 | | |
| May 1, 2017 | | | | | | | | 214.2 | | |
| May 2, 2017 | 512 | 9.2 | 2.2 | 1.0 | 16.4 | | | | | |
| May 3, 2017 | | | | | | | 33.9 | | | 5.6 |
| May 4, 2017 | | | | | | | | | | |
| May 5, 2017 | 419 | 14.5 | 1.4 | 0.6 | 14.5 | | 43.6 | 276.0 | | 14.0 |
| May 6, 2017 | | | | | | | | 268.4 | 11.2 | |
| May 7, 2017 | | | | | | | 40.9 | 286.4 | 18.5 | |
| May 8, 2017 | 340 | 10.2 | 2.3 | 0.9 | 14.8 | | | 271.2 | 15.3 | |
| May 9, 2017 | | | | | | | | | | 3.8 |
| May 10, 2017 | 498 | 33.6 | 2.7 | 1.2 | 19.4 | | 44.4 | 480.0 | 55.9 | 67.3 |
| May 11, 2017 | 294 | 12.7 | 1.6 | 0.6 | 17.3 | | 31.3 | 252.0 | 24.0 | 24.2 |
| May 12, 2017 | | | | | | | | 294.0 | | |
| May 13, 2017 | 403 | | | | | | 31.5 | 298.0 | | 4.9 |
| May 14, 2017 | | | | | | | | | | |
| May 15, 2017 | 404 | 16.5 | 1.8 | 0.7 | 16.0 | | 31.3 | 224.0 | 14.6 | 4.0 |
| May 16, 2017 | | | | | | | | 198.0 | | |
| May 17, 2017 | 476 | 18.2 | | | | | 36.3 | | | |
| May 18, 2017 | | | 2.8 | 1.2 | 12.5 | | | 279.0 | 19.2 | 1.1 |

| Date | | | | | | | | | |
|---|---|---|---|---|---|---|---|---|---|
| May 19, 2017 | | | | | | | 322.0 | | |
| May 20, 2017 | | | | | | 40.8 | 267.0 | 16.4 | 14.9 |
| May 21, 2017 | 290 | 9.4 | 1.1 | 0.4 | 13.0 | | 305.4 | | |
| May 22, 2017 | | | | | | | 438.0 | | 13.5 |
| May 23, 2017 | 212 | 8.5 | 2.1 | 0.9 | 13.0 | 32.8 | 244.0 | | |
| May 24, 2017 | 358 | 27.5 | 2.8 | 1.2 | 11.8 | | 590.0 | 56.9 | |
| May 25, 2017 | 493 | 12.3 | 1.4 | 0.6 | 9.2 | | 389.0 | | 47.5 |
| May 26, 2017 | | | | | | 35.1 | 327.1 | | |
| May 27, 2017 | | | | | | | 472.6 | | 6.9 |
| May 28, 2017 | 374 | 15.7 | 1.3 | 0.5 | 8.6 | | 328.1 | | |
| May 29, 2017 | | | | | | 30.2 | | | 7.8 |
| May 30, 2017 | | | | | | | | | |
| May 31, 2017 | 299 | 14.7 | 2.8 | 1.1 | 11.4 | | 297.0 | 66.2 | 4.8 |
| Jun. 1, 2017 | | | | | | 39.4 | | | |
| Jun. 2, 2017 | | | | | | | 384.0 | | 6.9 |
| Jun. 3, 2017 | 338 | 12.5 | 1.4 | 0.6 | 15.9 | | | | 7.9 |
| Jun. 4, 2017 | | | | | | | 374.8 | | |
| Jun. 5, 2017 | | | | | | 33.3 | 358.0 | | 5.3 |
| Jun. 6, 2017 | 274 | 3.3 | 2.3 | 1.1 | 14.0 | | 324.8 | | |
| Jun. 7, 2017 | | | | | | | | | |
| Jun. 8, 2017 | | | | | | 37.6 | 442.0 | | 8.1 |
| Jun. 9, 2017 | | | | | | | 384.0 | | 7.2 |
| Jun. 10, 2017 | 293 | 3.5 | 3.2 | 1.3 | 10.5 | | | | |
| Jun. 11, 2017 | | | | | | 25.8 | | | |
| Jun. 12, 2017 | | | | | | | 413.8 | | 4.7 |
| Jun. 13, 2017 | | | | | | | 386.7 | | |
| Jun. 14, 2017 | 418 | 12.1 | 2.2 | 0.9 | 12.4 | 24.6 | | | 6.1 |
| Jun. 15, 2017 | | | | | | | 440.5 | | 7.5 |
| Jun. 16, 2017 | | | | | | | 396.4 | | |
| Jun. 17, 2017 | 302 | 6.9 | | | | 29.1 | | | 4.5 |
| Jun. 18, 2017 | | | | | | | | | |
| Jun. 19, 2017 | | | | | | 38.4 | 386.5 | | 4.7 |
| Jun. 20, 2017 | 342 | 15.4 | 3.0 | 1.2 | 14.0 | | 349.6 | | 4.4 |
| Jun. 21, 2017 | | | | | | 44.1 | 366.7 | 36.7 | |
| Jun. 22, 2017 | | | | | | | | | |
| Jun. 23, 2017 | 374 | 15.0 | 2.3 | 1.0 | 13.0 | | 304.2 | 63.9 | 7.4 |
| Jun. 24, 2017 | | | | | | 41.7 | 308.6 | 64.8 | 3.9 |
| Jun. 25, 2017 | | | | | | | | | |
| Jun. 26, 2017 | | | | | | | 479.2 | 47.9 | |
| Jun. 27, 2017 | | | | | | 35.8 | 334.9 | 46.9 | 6.4 |
| Jun. 28, 2017 | 356 | 15.3 | 2.9 | 1.2 | 13.0 | | | | |
| Jun. 29, 2017 | | | | | | | 406.0 | 73.1 | 8.4 |
| Jun. 30, 2017 | | | | | | | 370.4 | 70.4 | |
| Jul. 1, 2017 | | | | | | | 254.0 | 27.9 | |
| Jul. 2, 2017 | 297 | 3.3 | 2.9 | 1.3 | 17.2 | 28.0 | 267.9 | 64.3 | 5.1 |
| Jul. 3, 2017 | | | | | | | 224.5 | 38.2 | |
| Jul. 4, 2017 | | | | | | | | | |
| Jul. 5, 2017 | | | | | | 29.8 | | | |
| Jul. 6, 2017 | | | | | | | 269.7 | | |
| Jul. 7, 2017 | 326 | 13.0 | 2.4 | 0.9 | 13.4 | 35.3 | 261.0 | 46.4 | 5.4 |
| Jul. 8, 2017 | | | | | | | | | |
| Jul. 9, 2017 | | | | | | | 317.8 | | 10.7 |
| Jul. 10, 2017 | | | | | | | 324.0 | | |
| Jul. 11, 2017 | 278 | 13.9 | 3.3 | 1.5 | 11.7 | 25.6 | 274.0 | 23.9 | 9.6 |
| Jul. 12, 2017 | 304 | 22.0 | | | | | 302.1 | | |
| Jul. 13, 2017 | | | | | | 37.1 | 348.2 | | |
| Jul. 14, 2017 | | | | | | | | 2.0 | |
| Jul. 15, 2017 | 469 | 15.9 | 1.8 | 0.8 | 10.4 | | 297.4 | 38.7 | 8.5 |
| Jul. 16, 2017 | | | | | | | 263.8 | 36.9 | 7.1 |
| Jul. 17, 2017 | | | | | | 44.5 | 179.0 | | |
| Jul. 18, 2017 | | | | | | | 223.0 | 20.1 | 6.8 |
| Jul. 19, 2017 | | | | | | | | | |
| Jul. 20, 2017 | 342 | 9.6 | 1.8 | 0.7 | 12.9 | 31.3 | | | |
| Jul. 21, 2017 | | | | | | | 195.0 | 39.0 | 8.9 |
| Jul. 22, 2017 | | | | | | 23.9 | | | |
| Jul. 23, 2017 | | | | | | | 267.1 | 56.1 | 11.4 |
| Jul. 24, 2017 | | | | | | 32.6 | 251.4 | 65.4 | 8.4 |
| Jul. 25, 2017 | 422 | 11.0 | 1.3 | 0.5 | 15.3 | | | | |
| Jul. 26, 2017 | | | | | | 39.0 | 350.0 | 70.0 | 7.2 |
| Jul. 27, 2017 | | | | | | | | | |
| Jul. 28, 2017 | 371 | 5.2 | 3.2 | 1.3 | 13.8 | 35.4 | 452.1 | 63.3 | 4.6 |
| Jul. 29, 2017 | | | | | | | 425.1 | 97.8 | 5.6 |
| Jul. 30, 2017 | | | | | | 42.0 | | | |
| Jul. 31, 2017 | 370 | 11.5 | 3.0 | 1.3 | 11.1 | | 504.8 | 45.4 | 7.2 |
| Aug. 1, 2017 | | | | | | 36.3 | 478.3 | 81.3 | 4.3 |
| Aug. 2, 2017 | | | | | | | 508.2 | 71.1 | 6.5 |

| | | Plug Flow Reactor First Zone | | | | | | | | | | |
|---|---|---|---|---|---|---|---|---|---|---|---|---|
| Date | Scenario | TSS, mg/L | VSS, mg/L | pH | ORP | TKN, mg/L | NO2 + NO3, mg/L | VFA, mg-HAc/L | Mg, mg/L | TP, mg-P/L | sTP, mg-P/L | OrthoP, mg-P/L |
| Sep. 29, 2016 | Baseline | | | | | | | | | | | |
| Sep. 30, 2016 | Two Zone | | | | | | | | | | | |
| Oct. 1, 2016 | Reactor | | | | | | | | | | | |
| Oct. 2, 2016 | | | | | | | | | | | | |
| Oct. 3, 2016 | | | | | | | | | | | | |
| Oct. 4, 2016 | | | | | | | | | | | | |
| Oct. 5, 2016 | | | | | | | | | | | | |
| Oct. 6, 2016 | | | | | | | | | | | | |
| Oct. 7, 2016 | | | | | | | | | | | | |
| Oct. 8, 2016 | | | | | | | | | | | | |
| Oct. 9, 2016 | | | | 7.2 | | | | | | | | |
| Oct. 10, 2016 | | | | 7.0 | | | | | | | | |
| Oct. 11, 2016 | | 15,300 | 11,400 | 7.2 | | | | | | | | |
| Oct. 12, 2016 | | 17,000 | 12,900 | 6.8 | | | | | | | | |
| Oct. 13, 2016 | | 25,500 | 19,700 | 7.2 | | | | | | | | |
| Oct. 14, 2016 | | 21,580 | | 7.1 | | | | | | | | |
| Oct. 15, 2016 | | | | 6.6 | | | | | | | | |
| Oct. 16, 2016 | | | | 7.2 | | | | | | | | |
| Oct. 17, 2016 | | 29,580 | 21,002 | 6.7 | | | | | | 642.6 | | |
| Oct. 18, 2016 | | 34,870 | 25,804 | 7.0 | | | | | | | | |
| Oct. 19, 2016 | | 32,120 | 25,054 | 7.2 | | | | | | | | |
| Oct. 20, 2016 | | 32,480 | 24,685 | 7.2 | | | | | | 623.5 | | |
| Oct. 21, 2016 | | 35,120 | 29,501 | 6.8 | | | | | | 798.6 | | |
| Oct. 22, 2016 | | 27,080 | 21,935 | 7.0 | | | | | | 610.4 | | |
| Oct. 23, 2016 | | 35,110 | 27,386 | 7.0 | −168 | | | | | | | |
| Oct. 24, 2016 | | 38,000 | 26,980 | 7.0 | | | | | | 721.8 | | |
| Oct. 25, 2016 | | 23,580 | 18,864 | 6.6 | −195 | | | 26.5 | 24.2 | | | |
| Oct. 26, 2016 | Scenario 7 | 41,220 | 33,388 | 6.8 | | | | | | 814.1 | 23.1 | 21.4 |
| Oct. 27, 2016 | HRT12; SRT42 | 40,580 | 12,000 | 7.2 | −165 | | | | | | | |
| Oct. 28, 2016 | | 35,120 | 25,638 | 6.9 | | | | 25.7 | 21.6 | 876.3 | 32.1 | 27.7 |
| Oct. 29, 2016 | | 34,880 | 25,462 | 6.9 | −175 | | | | | | | 30.8 |
| Oct. 30, 2016 | | 26,780 | 21,424 | 6.6 | −127 | | | | | 745.6 | | |
| Oct. 31, 2016 | | 28,840 | 22,784 | 6.9 | | | | | | | 49.1 | 44.2 |
| Nov. 1, 2016 | | 35,820 | 27,940 | 6.9 | −137 | 526.7 | 0.2 | 29.7 | 31.3 | 660.0 | | |
| Nov. 2, 2016 | | 37,360 | 29,514 | 7.2 | | | | 32.8 | 27.8 | | 36.8 | 32.3 |
| Nov. 3, 2016 | scenario 8 | 41,050 | 29,556 | 7.1 | −185 | | | 30.1 | 23.8 | 943.4 | 42.0 | 35.9 |
| Nov. 4, 2016 | HRT9, SRT30 | 40,550 | 30,413 | | | 662.0 | 0.4 | | | | | |
| Nov. 5, 2016 | | 43,500 | 30,450 | | | | | 39.9 | 28.5 | | 27.2 | 28.0 |
| Nov. 6, 2016 | | 40,000 | 29,200 | | | | | | | 834.0 | 37.1 | 36.7 |
| Nov. 7, 2016 | | 42,840 | 30,416 | 7.6 | −193 | | 0.0 | 28.9 | 15.2 | | 26.6 | 25.6 |
| Nov. 8, 2016 | | 25,130 | 19,350 | | | | | | | | 24.3 | 21.9 |
| Nov. 9, 2016 | | 39,520 | 30,826 | 7.0 | −201 | | | 34.6 | 24.0 | 841.4 | | |
| Nov. 10, 2016 | | 42,250 | 30,843 | 7.3 | | | | | | | 43.8 | 38.1 |
| Nov. 11, 2016 | scenario 9 HRT9, SRT48 | 41,250 | 31,350 | 7.2 | −219 | | | | | | 39.7 | 38.2 |
| Nov. 12, 2016 | | 37,420 | 27,691 | | | | | | | 687.5 | | |
| Nov. 13, 2016 | | 38,450 | 31,145 | | | | | | | 861.0 | | |
| Nov. 14, 2016 | | 41,380 | 32,276 | 7.1 | −209 | 371.0 | 8.0 | 32.6 | | 799.5 | 43.1 | 43.5 |
| Nov. 15, 2016 | | 25,000 | 20,000 | 7.3 | −221 | | | | | 324.1 | | |
| Nov. 16, 2016 | | 26,010 | 13,240 | 6.9 | −229 | 597.8 | 0.0 | 30.1 | 33.2 | | 32.7 | 32.1 |
| Nov. 17, 2016 | scenario 10 | 22,510 | 16,207 | | | | | | | | | |
| Nov. 18, 2016 | HRT6, SRT18 | 24,990 | 19,492 | 6.7 | −278 | | | | 34.2 | 412.5 | 17.2 | 17.7 |
| Nov. 19, 2016 | | 23,400 | 18,954 | | | | 2.4 | | | 545.0 | | |
| Nov. 20, 2016 | | 21,560 | 16,170 | 6.8 | −260 | | | | | | 39.6 | 36.3 |
| Nov. 21, 2016 | | 20,070 | 12,860 | 7.3 | −251 | | | 30.9 | 24.1 | | 25.7 | 26.0 |
| Nov. 22, 2016 | | 21,120 | 15,629 | | | | | | | 689.4 | | |
| Nov. 23, 2016 | | 21,890 | 15,323 | 7.3 | −248 | | | 30.1 | 35.3 | | 30.6 | 25.9 |
| Nov. 24, 2016 | | 20,360 | 14,659 | 7.2 | | | | | | n/a | | |
| Nov. 25, 2016 | | 21,820 | 15,274 | 7.2 | | | | | | n/a | | |
| Nov. 26, 2016 | | 21,010 | 15,547 | 6.7 | −268 | | | | | n/a | | |
| Nov. 27, 2016 | scenario 11 | 20,800 | 14,768 | 7.1 | | | | | | | | |
| Nov. 28, 2016 | HRT18, SRT36 | 20,000 | 14,600 | 6.7 | −193 | 533.8 | 0.2 | 31.5 | 38.4 | | 26.1 | 24.4 |
| Nov. 29, 2016 | | 20,000 | 16,200 | 7.1 | | | | | | 437.5 | 34.2 | 31.1 |
| Nov. 30, 2016 | | 20,580 | 15,641 | 7.1 | −285 | | | | | | | |
| Dec. 1, 2016 | | 19,020 | 15,026 | 7.2 | | | | 37.9 | 27.1 | | 60.1 | 61.3 |
| Dec. 2, 2016 | Scenario 12 | 36,440 | 25,144 | 6.6 | −286 | | | | | 764.2 | 45.7 | 40.4 |
| Dec. 3, 2016 | HRT24, SRT54 | 34,560 | 24,883 | 7.4 | | 611.1 | 0.0 | | | 645.7 | 31.9 | 31.6 |
| Dec. 4, 2016 | | 36,440 | 25,144 | 6.9 | −239 | | | 35.2 | 39.0 | | 46.8 | 45.0 |
| Dec. 5, 2016 | | 38,690 | 28,244 | 6.7 | | | | | | | | |
| Dec. 6, 2017 | | 36,440 | 25,508 | 7.0 | −249 | 562.7 | 0.0 | | | 809.1 | 65.5 | 58.5 |

-continued

| | | Plug Flow Reactor First Zone | | | | | | | | | | |
|---|---|---|---|---|---|---|---|---|---|---|---|---|
| Date | Scenario | TSS, mg/L | VSS, mg/L | pH | ORP | TKN, rng/L | NO2 + NO3, mg/L | VFA, mg-HAc/L | Mg, mg/L | TP, mg-P/L | sTP, mg-P/L | OrthoP, mg-P/L |
| Dec. 7, 2017 | n/a | 40,020 | 30,815 | 6.9 | | | | | | | | |
| Dec. 8, 2017 | n/a | 39,820 | 29,865 | 7.0 | −248 | 638.8 | 0.0 | 25.2 | 24.5 | | 39.0 | 39.4 |
| Dec. 9, 2017 | | 36,440 | 28,059 | 6.6 | | | | | | | | |
| Dec. 10, 2017 | | 36,440 | 28,788 | 7.0 | −276 | | 0.0 | 25.4 | 26.6 | 772.0 | 56.1 | 48.4 |
| Feb. 27, 2017 | | 15,890 | 12,080 | 6.7 | | | | | | | | |
| Feb. 28, 2017 | | 18,950 | 14,970 | 7.3 | −275 | | | 30.7 | | 442.9 | 36.3 | 33.3 |
| Mar. 1, 2017 | | 32,000 | 6,400 | 6.7 | −253 | | | | | | | |
| Mar. 2, 2017 | SCENARIO 13 | 32,580 | 26,060 | 7.4 | −162 | | | 30.9 | 34.4 | 768.2 | 19.5 | 19.5 |
| Mar. 3, 2017 | HRT12, SRT24 | 34,870 | 27,900 | 6.7 | −264 | | | | | | | |
| Mar. 4, 2017 | Qr = 200 | 38,470 | 29,620 | 7.1 | −197 | | | | | | | |
| Mar. 5, 2017 | | | | 7.3 | −181 | | | | | | 29.4 | 27.5 |
| Mar. 6, 2017 | | 41,500 | 34,072 | | −191 | | | | | 967.2 | 27.1 | 27.9 |
| Mar. 7, 2017 | | 38,540 | 30,830 | 7.0 | −286 | 617.6 | 0.4 | 29.2 | 27.6 | | | |
| Mar. 8, 2017 | | 31,070 | 25,170 | | −187 | | | | | 578.3 | 24.4 | 22.4 |
| Mar. 9, 2017 | | 34,520 | 27,270 | 6.9 | −162 | | | 27.5 | 27.2 | | | |
| Mar. 10, 2017 | Scenario 14 | 44,870 | 35,900 | 6.8 | −264 | | | | | 976.9 | 49.5 | 43.8 |
| Mar. 11, 2017 | HRT = 12, SRT = 42 | 39,860 | 29,900 | 6.7 | −258 | 568.3 | 0.0 | | 41.2 | 805.8 | 55.0 | 47.0 |
| Mar. 12, 2017 | Qr = 100 | 39,510 | 32,000 | 6.6 | −172 | | | | | | | |
| Mar. 13, 2017 | | 41,280 | 30,550 | 7.2 | −267 | | 0.0 | 36.6 | 35.6 | 788.9 | 32.8 | 29.0 |
| Mar. 14, 2017 | | 41,290 | 31,790 | 7.2 | −234 | | | | | | | |
| Mar. 15, 2017 | | 42,170 | 32,890 | 6.7 | −230 | | | | | | | |
| Mar. 16, 2017 | | 39,830 | 32,260 | 6.7 | −205 | | | 26.4 | 30.0 | 728.9 | 28.4 | 27.8 |
| Mar. 17, 2017 | | 36,780 | 29,060 | 7.3 | −188 | 639.8 | 0.1 | | | | | |
| Mar. 18, 2017 | Scenario 15 | 36,220 | 26,800 | 7.4 | −276 | | | 30.2 | 30.2 | | | |
| Mar. 19, 2017 | H = 18, 48 | 39,510 | 30,420 | 6.6 | −283 | | | | | 824.4 | 38.6 | 35.7 |
| Mar. 20, 2017 | Qr = 200 | 41,280 | 33,020 | 7.3 | −248 | | | | 29.3 | 885.4 | 53.7 | 53.2 |
| Mar. 21, 2017 | | 38,500 | 30,800 | 6.8 | −236 | | | | | | | |
| Mar. 22, 2017 | | 39,640 | 30,920 | 7.3 | −227 | 575.5 | 0.0 | 36.4 | 20.1 | 793.2 | 42.3 | 42.7 |
| Mar. 23, 2017 | | 34,560 | 27,300 | 6.8 | −283 | | | | | | | |
| Mar. 24, 2017 | | 33,710 | 25,620 | 7.2 | −181 | | | 38.1 | 36.0 | 725.2 | 38.2 | 37.8 |
| May 1, 2017 | | 10,580 | 8,040 | 7.1 | | | | | | | | |
| May 2, 2017 | | 12,270 | 9,330 | 6.8 | −248 | 523.1 | 0.0 | | | 281.6 | | |
| May 3, 2017 | Scenario 16 | 18,120 | 14,310 | 6.9 | −230 | | | | | | | |
| May 4, 2017 | HRT = 12 | 19,850 | 16,080 | 7.1 | | | | 24.9 | | 452.5 | | |
| May 5, 2017 | SRT = 24 | 28,000 | 22,400 | 6.7 | −298 | 385.6 | 0.2 | | | 592.7 | 56.5 | 49.1 |
| May 6, 2017 | Qr = 50 | 31,959 | 24,290 | 6.7 | | | | | | | | 36.2 |
| May 7, 2017 | | 26,676 | 20,010 | 6.8 | −237 | | | 31.2 | 34.5 | | | |
| May 8, 2017 | | 26,154 | 19,090 | 7.1 | −157 | 358.3 | 0.0 | | | 574.1 | 62.6 | 53.5 |
| May 9, 2017 | | 31,500 | 24,570 | 6.7 | −171 | | | | | | | |
| May 10, 2017 | | 26,914 | 21,530 | 6.6 | −242 | 486.2 | 0.2 | 33.0 | 34.4 | 583.4 | 42.7 | 39.9 |
| May 11, 2017 | | 32,679 | 25,820 | 6.6 | −172 | | | | | | | |
| May 12, 2017 | | 27,081 | 21,660 | 6.7 | −270 | | | 22.6 | | 509.7 | 19.5 | 20.1 |
| May 13, 2017 | | 32,420 | 24,640 | 7.0 | −173 | | 0.0 | | | 678.4 | | 26.3 |
| May 14, 2017 | | 28,579 | 18,520 | 6.6 | −196 | | | | | | | |
| May 15, 2017 | Scenario 17 | 26,550 | 19,910 | 6.7 | −253 | 427.1 | 1.3 | 45.4 | 33.8 | 605.3 | 20.3 | 18.0 |
| May 16, 2017 | HRT = 18 | 28,125 | 21,090 | 6.9 | −223 | | | | | 631.9 | 34.8 | 32.2 |
| May 17, 2017 | SRT = 24 | 27,987 | 21,550 | | −146 | | 0.7 | 35.4 | 40.8 | | | |
| May 18, 2017 | Qr = 200 | 28,137 | 20,540 | 6.7 | −148 | | | | | 570.8 | 43.7 | 39.0 |
| May 19, 2017 | | 31,973 | 24,300 | | −203 | | | | | 614.5 | | 34.8 |
| May 20, 2017 | | 31,863 | 25,170 | 6.7 | −283 | | | | | | | |
| May 21, 2017 | | 32,287 | 24,220 | 6.7 | | 311.9 | 0.2 | 27.8 | | 710.7 | 21.4 | 18.8 |
| May 22, 2017 | | 31,200 | 25,270 | 6.7 | −217 | | | | | | | |
| May 23, 2017 | | 32,562 | 25,720 | 6.8 | | 220.5 | 0.0 | 43.2 | 37.7 | 603.9 | 40.8 | 36.8 |
| May 24, 2017 | Scenario 18 | 31,770 | 23,190 | 6.7 | −245 | | | | | | | 19.1 |
| May 25, 2017 | H = 18 | 26,693 | 21,620 | 7.0 | −204 | 486.8 | 0.3 | | | 614.1 | 72.1 | 63.8 |
| May 26, 2017 | S = 36 | 30,009 | 24,010 | 6.7 | −270 | | | | | | | |
| May 27, 2017 | Qr = 200 | 30,573 | 24,460 | 7.0 | −245 | | | | | | | |
| May 29, 2017 | | 31,111 | 24,290 | 6.9 | −284 | | | | | | | |
| May 30, 2017 | | 26,545 | 21,500 | 6.6 | −281 | | | | | | | |
| May 31, 2017 | | 27,192 | 21,750 | 6.4 | −193 | 307.1 | 0.2 | 36.0 | | 618.6 | | |
| Jun. 1, 2017 | | 31,575 | 25,260 | 7.0 | −257 | | | | | | | |
| Jun. 2, 2017 | Scenario 19 | 31,707 | 23,780 | 6.7 | −175 | | | | | 726.2 | 37.4 | 34.6 |
| Jun. 3, 2017 | h = 12 | 26,394 | 21,380 | 7.1 | −177 | | | | | | | |
| Jun. 4, 2017 | s = 30 | 31,114 | 23,960 | 7.1 | −261 | | | | | 592.5 | 56.1 | 57.8 |
| Jun. 5, 2017 | Qr = 200 | 32,739 | 25,540 | 6.8 | −241 | | | | | | | |
| Jun. 6, 2017 | | 32,596 | 25,750 | 6.8 | −191 | 290.9 | 0.0 | 45.4 | | 745.1 | 24.5 | 25.3 |
| Jun. 7, 2017 | | 27,465 | 20,600 | 6.9 | −256 | | | | | | | |
| Jun. 8, 2017 | | 29,551 | 21,570 | 6.8 | −224 | | | | | 565.0 | 52.4 | 49.9 |
| Jun. 9, 2017 | | 30,444 | 22,220 | 7.0 | −177 | | | | | | | 56.8 |
| Jun. 10, 2017 | | 32,286 | 25,830 | 6.9 | −197 | 282.3 | 0.0 | 23.8 | | | | |

Plug Flow Reactor First Zone

| Date | Scenario | TSS, mg/L | VSS, mg/L | pH | ORP | TKN, mg/L | NO2 + NO3, mg/L | VFA, mg-HAc/L | Mg, mg/L | TP, mg-P/L | sTP, mg-P/L | OrthoP, mg-P/L |
|---|---|---|---|---|---|---|---|---|---|---|---|---|
| Jun. 11, 2017 | RUN 20 | 34,660 | 25,650 | 6.7 | −282 | | | | | | | |
| Jun. 12, 2017 | h = 12 | 36,880 | 27,660 | 6.7 | −247 | | | | | 820.1 | 77.9 | 70.8 |
| Jun. 13, 2017 | s = 54 | 35,840 | 34,580 | 6.7 | −205 | | | | | 737.1 | 44.3 | 41.4 |
| Jun. 14, 2017 | Qr = 50 | 34,990 | 27,290 | 6.8 | −270 | 434.7 | 0.0 | 50.3 | 30.3 | | | |
| Jun. 15, 2017 | | 37,520 | 27,760 | 6.6 | −299 | | | | | 801.4 | 43.2 | 36.9 |
| Jun. 16, 2017 | | 34,120 | 26,610 | 6.5 | −311 | | | | | 704.1 | | 49.0 |
| Jun. 17, 2017 | | 33,250 | 30,250 | 6.5 | −278 | | 0.0 | 28.2 | 32.7 | | | |
| Jun. 18, 2017 | | 34,890 | 26,170 | 6.7 | −287 | | | | | | | |
| Jun. 19, 2017 | | 35,720 | 28,930 | 6.8 | −304 | | | | | 673.6 | 58.5 | 51.8 |
| Jun. 20, 2017 | | 36,580 | 28,530 | 6.5 | −178 | 320.4 | 0.0 | | 54.2 | | | |
| Jun. 21, 2017 | | 34,200 | 26,680 | 6.4 | −209 | | | | | 720.3 | 75.2 | 70.3 |
| Jun. 22, 2017 | | 30,463 | 22,240 | 7.2 | −286 | | | | | | | |
| Jun. 23, 2017 | | 32,371 | 25,250 | 6.7 | −189 | 359.9 | 0.0 | | 19.5 | 740.3 | 33.0 | 30.0 |
| Jun. 24, 2017 | run 21 | 28,039 | 20,470 | 6.8 | −221 | | | | | 569.0 | 41.0 | 38.7 |
| Jun. 25, 2017 | H = 18 | 33,596 | 26,540 | 6.7 | −173 | | | | | | | |
| Jun. 26, 2017 | S = 48 | 35,326 | 26,850 | 7.4 | −189 | | | | | 651.5 | 99.7 | 96.8 |
| Jun. 27, 2017 | Qr = 50 | 29,325 | 20,480 | 6.5 | −172 | | | | | 656.6 | 55.3 | 54.2 |
| Jun. 28, 2017 | | 32,801 | 26,570 | 6.9 | −199 | 369.0 | 0.0 | 23.6 | 21.4 | | | |
| Jun. 29, 2017 | | 34,958 | 27,970 | 6.5 | −209 | | | | | 675.1 | 100.1 | 90.2 |
| Jun. 30, 2017 | | 33,670 | 26,600 | 6.4 | −175 | | | | | | | 108.9 |
| Jul. 1, 2017 | | 34,520 | 27,270 | 6.4 | −192 | | | | | | | |
| Jul. 2, 2017 | | 36,980 | 29,580 | 6.8 | −153 | 317.3 | 0.0 | 41.7 | 32.8 | | | |
| Jul. 3, 2017 | | 34,700 | 25,330 | 7.1 | −189 | | | | | 700.3 | 11.2 | 11.3 |
| Jul. 4, 2017 | | 33,710 | 25,620 | 6.8 | −225 | | | | | | | |
| Jul. 5, 2017 | | 33,580 | 26,860 | 7.3 | −223 | | | | | | | |
| Jul. 6, 2017 | | 39,861 | 29,100 | 6.7 | −182 | | | | | 814.3 | 22.6 | 20.4 |
| Jul. 7, 2017 | | 40,870 | 29,840 | 6.8 | −312 | 318.9 | 0.2 | 24.8 | 31.6 | | 31.9 | 29.5 |
| Jul. 8, 2017 | run 22 | 39,680 | 32,140 | 6.7 | −302 | | | | | | | |
| Jul. 9, 2017 | h = 12 | 39,352 | 31,480 | 6.7 | −295 | | | | | 720.7 | 40.4 | 36.4 |
| Jul. 10, 2017 | s = 54 | 38,155 | 28,620 | 6.9 | −283 | | | | | | | |
| Jul. 11, 2017 | Qr = 100 | 41,850 | 33,900 | 6.5 | −184 | 260.7 | 0.0 | 40.6 | 34.1 | 888.0 | 43.6 | 41.1 |
| Jul. 12, 2017 | | 40,120 | 31,290 | 7.1 | −216 | | | | | | | |
| Jul. 13, 2017 | | 38,271 | 28,320 | 7.1 | −303 | | | | | 759.3 | 34.2 | 33.2 |
| Jul. 14, 2017 | | 43,690 | 34,520 | 6.7 | −272 | | | | | | | |
| Jul. 15, 2017 | | 41,580 | 31,190 | 6.8 | −309 | 441.0 | 0.0 | | 39.2 | 926.7 | 33.4 | 33.7 |
| Jul. 16, 2017 | | 42,580 | 34,490 | 6.7 | −223 | | | | | | | 33.2 |
| Jul. 17, 2017 | | 44,620 | 33,470 | 6.6 | −318 | | | | | 820.8 | 15.9 | 15.4 |
| Jul. 18, 2017 | | 41,260 | 30,950 | 6.4 | −247 | | | | | | | |
| Jul. 19, 2017 | | 40,580 | 30,840 | 6.4 | −261 | | | | | | | |
| Jul. 20, 2017 | | 37,725 | 30,180 | 7.4 | −319 | 319.3 | 0.1 | 33.0 | 33.5 | | | |
| Jul. 21, 2017 | | 39,447 | 29,980 | 6.6 | −189 | | | | | 755.9 | 18.6 | 19.2 |
| Jul. 22, 2017 | | 38,308 | 27,960 | 6.4 | −232 | | | | | | | |
| Jul. 23, 2017 | run 23 | 37,144 | 29,340 | 6.9 | −287 | | | | | 746.2 | 56.4 | 54.8 |
| Jul. 24, 2017 | h = 18 | 39,066 | 31,640 | 7.0 | −185 | | | | | | 38.9 | 35.7 |
| Jul. 25, 2017 | s = 54 | 38,709 | 29,810 | 6.4 | −262 | 384.8 | 0.1 | 44.2 | 34.8 | | | |
| Jul. 26, 2017 | Qr = 200 | 39,424 | 29,170 | 6.4 | −262 | | | | | 814.3 | 26.0 | 25.2 |
| Jul. 27, 2017 | | 38,814 | 28,720 | 7.0 | −200 | | | | | | | |
| Jul. 28, 2017 | | 37,420 | 28,070 | 6.6 | −284 | 384.8 | 0.0 | 43.5 | 36.5 | 799.4 | 50.5 | 48.6 |
| Jul. 29, 2017 | | 39,702 | 30,570 | 6.9 | −257 | | | | | 853.5 | 27.8 | 24.8 |
| Jul. 30, 2017 | | 37,430 | 27,320 | 7.4 | −191 | | | | | | | |
| Jul. 31, 2017 | | 37,081 | 27,440 | 6.4 | −207 | 392.5 | 0.0 | 34.0 | 34.2 | 745.1 | 99.9 | 84.7 |
| Aug. 1, 2017 | | 38,501 | 31,190 | 7.1 | −206 | | | | | | | |
| Aug. 2, 2017 | | 36,897 | 29,890 | 6.6 | −206 | | | | | 804.7 | 58.7 | 57.0 |

Plug Flow Reactor Waste Sludge

| Date | Scenario | TSS, mg/L | VSS, mg/L | TKN, mg/L | NO2 + NO3, mg/L | Mg, mg/L | TP, mg-P/L | sTP, mg-P/L | OrthoP, mg-P/L |
|---|---|---|---|---|---|---|---|---|---|
| Sep. 29, 2016 | Baseline | | | | | | | | |
| Sep. 30, 2016 | Two Zone | | | | | | | | |
| Oct. 1, 2016 | Reactor | | | | | | | | |
| Oct. 2, 2016 | | | | | | | | | |
| Oct. 3, 2016 | | | | | | | | | |
| Oct. 4, 2016 | | | | | | | | | |
| Oct. 5, 2016 | | | | | | | | | |
| Oct. 6, 2016 | | | | | | | | | |
| Oct. 7, 2016 | | | | | | | | | |
| Oct. 8, 2016 | | | | | | | | | |
| Oct. 9, 2016 | | | | | | | | | |

-continued

| | | Plug Flow Reactor Waste Sludge | | | | | | | |
|---|---|---|---|---|---|---|---|---|---|
| Date | Scenario | TSS, mg/L | VSS, mg/L | TKN, mg/L | NO2 + NO3, mg/L | Mg, mg/L | TP, mg-P/L | sTP, mg-P/L | OrthoP, mg-P/L |
| Oct. 10, 2016 | | | | | | | | | |
| Oct. 11, 2016 | | 8,250 | | | | | 204.0 | | |
| Oct. 12, 2016 | | 9,500 | | | | | | | |
| Oct. 13, 2016 | | 25,100 | 19,600 | | | | | | |
| Oct. 14, 2016 | | 12,410 | | | | | 274.0 | | |
| Oct. 15, 2016 | | 12,000 | | | | | | | |
| Oct. 16, 2016 | | 8,520 | | | | | | | |
| Oct. 17, 2016 | | 12,220 | 9,530 | | | | 264.0 | | |
| Oct. 18, 2016 | | 16,890 | | | | | | | |
| Oct. 19, 2016 | | 12,000 | | | | | | | |
| Oct. 20, 2016 | | 13,970 | | | | | 336.1 | | |
| Oct. 21, 2016 | | 12,300 | 10,300 | | | | 314.5 | | |
| Oct. 22, 2016 | | 17,590 | | | | | 289.0 | | |
| Oct. 23, 2016 | | 10,000 | | | | | | | |
| Oct. 24, 2016 | | 13,880 | 5,380 | | | | 187.0 | | |
| Oct. 25, 2016 | | 520 | 420 | | | 25.4 | | | |
| Oct. 26, 2016 | Scenario 7 | 9,900 | | | | | 167.0 | 20.0 | 59.5 |
| Oct. 27, 2016 | HRT12; SRT42 | 9,900 | 8,080 | | | | | | |
| Oct. 28, 2016 | | 8,990 | | | | 22.7 | 229.0 | 56.0 | 58.5 |
| Oct. 29, 2016 | | 9,910 | | | | | | | 58.7 |
| Oct. 30, 2016 | | 11,880 | | | | | 234.0 | | |
| Oct. 31, 2016 | | 11,650 | | | | | | 77.0 | 64.5 |
| Nov. 1, 2016 | | 6,900 | 3,300 | 552.1 | 0.6 | 31.3 | 210.0 | | |
| Nov. 2, 2016 | | 8,000 | | | | | | 25.0 | 49.8 |
| Nov. 3, 2016 | scenario 8 | 9,100 | 7,500 | | | 30.1 | 184.0 | 38.0 | 56.2 |
| Nov. 4, 2016 | HRT9, SRT30 | 10,090 | | 486.7 | 1.5 | | | | |
| Nov. 5, 2016 | | 1,400 | 966 | | | | | | 52.6 |
| Nov. 6, 2016 | | 10,020 | | | | | 196.4 | 59.0 | 58.4 |
| Nov. 7, 2016 | | 7,010 | | | | 18.2 | | | 43.0 |
| Nov. 8, 2016 | | 8,740 | 6,580 | | | | | 37.0 | 46.9 |
| Nov. 9, 2016 | | 8,040 | | | | 34.6 | 217.5 | | |
| Nov. 10, 2016 | scenario 9 | 6,050 | 5,820 | | | | | 64.0 | 60.9 |
| Nov. 11, 2016 | HRT9, SRT48 | 6,020 | | | | | | 72.0 | 71.8 |
| Nov. 12, 2016 | | 7,820 | 6,810 | | | | 225.7 | | |
| Nov. 13, 2016 | | 9,770 | | | | | | | |
| Nov. 14, 2016 | | 10,020 | 4,300 | 671.3 | 0.2 | | 155.0 | 80.5 | 72.9 |
| Nov. 15, 2016 | | 12,540 | 1,200 | | | | | | |
| Nov. 16, 2016 | | 16,050 | | | | | | 36.0 | 54.6 |
| Nov. 17, 2016 | scenario 10 | 7,010 | 11,540 | | | | | | |
| Nov. 18, 2016 | HRT6, SRT18 | 8,740 | | | | 41.2 | 297.0 | 21.0 | 37.4 |
| Nov. 19, 2016 | | 8,040 | | | | | 286.0 | | |
| Nov. 20, 2016 | | 6,050 | | | | | | 62.0 | 63.5 |
| Nov. 21, 2016 | | 6,020 | 12,080 | | | | | | 57.6 |
| Nov. 22, 2016 | | 7,820 | | | | | 260.8 | | |
| Nov. 23, 2016 | | 9,770 | 16,930 | | | 34.0 | | 58.0 | 54.5 |
| Nov. 24, 2016 | | | | | | | | | |
| Nov. 25, 2016 | | | | | | | | | |
| Nov. 26, 2016 | | | | | | | | | |
| Nov. 27, 2016 | scenario 11 | 14,250 | | | | | | | |
| Nov. 28, 2016 | HRT18, SRT36 | 13,000 | 18,690 | 847.7 | 0.0 | 34.1 | | 26.0 | 59.2 |
| Nov. 29, 2016 | | 13,000 | | | | | 284.8 | 38.0 | 82.7 |
| Nov. 30, 2016 | | 13,410 | 15,560 | | | | | | |
| Dec. 1, 2016 | | 13,840 | | | | | | 93.0 | 82.0 |
| Dec. 2, 2016 | Scenario 12 | 18,950 | 15,100 | | | | 387.0 | 27.0 | 54.6 |
| Dec. 3, 2016 | HRT24, SRT54 | 19,630 | | 742.0 | 0.0 | | 415.0 | | 53.8 |
| Dec. 4, 2016 | | 18,950 | 15,070 | | | 43.3 | | | 76.5 |
| Dec. 5, 2016 | | 18,420 | | | | | | | |
| Dec. 6, 2017 | | 17,520 | 14,020 | 738.7 | 0.1 | | 402.0 | 79.0 | 95.2 |
| Dec. 7, 2017 | n/a | 22,990 | | | | | | | |
| Dec. 8, 2017 | n/a | 20,130 | 16,130 | 763.6 | 0.0 | | | 106.0 | 94.5 |
| Dec. 9, 2017 | | 18,950 | | | | | | | |
| Dec. 10, 2017 | | 17,540 | 14,030 | 951.4 | 0.1 | 30.9 | 414.0 | 77.0 | 72.5 |
| Feb. 27, 2017 | | 8,540 | | | | | | | |
| Feb. 28, 2017 | | 11,590 | | | | | 349.2 | | 49.0 |
| Mar. 1, 2017 | | 23,000 | 4,500 | | | | | | |

-continued

| | | Plug Flow Reactor Waste Sludge | | | | | | | |
|---|---|---|---|---|---|---|---|---|---|
| Date | Scenario | TSS, mg/L | VSS, mg/L | TKN, mg/L | NO2 + NO3, mg/L | Mg, mg/L | TP, mg-P/L | sTP, mg-P/L | OrthoP, mg-P/L |
| Mar. 2, 2017 | SCENARIO 13 | 22,870 | 18,070 | | | 34.8 | 373.0 | 32.0 | 25.0 |
| Mar. 3, 2017 | HRT12, SRT24 | 24,690 | | 926.6 | 0.3 | | | | |
| Mar. 4, 2017 | Qr = 200 | 22,190 | 16,200 | | | | | | |
| Mar. 5, 2017 | | 25,630 | | | | | | | 50.5 |
| Mar. 6, 2017 | | 22,350 | 17,000 | | | | | | |
| Mar. 7, 2017 | | 21,710 | | | 0.0 | | 356.0 | | |
| Mar. 8, 2017 | | 21,000 | 17,000 | | | | | | 37.5 |
| Mar. 9, 2017 | | 24,560 | | | | 35.1 | 184.7 | 35.1 | |
| Mar. 10, 2017 | Scenario 14 | 28,960 | 23,170 | | | | | | 82.5 |
| Mar. 11, 2017 | HRT = 12, SRT = 42 | 24,710 | | 702.2 | 0.0 | | 446.4 | | 91.5 |
| Mar. 12, 2017 | Qr = 100 | 22,940 | 18,350 | | | | | | |
| Mar. 13, 2017 | | 23,850 | | 685.2 | 0.1 | 36.9 | 198.2 | 36.9 | 63.1 |
| Mar. 14, 2017 | | 24,880 | 19,160 | | | | | | |
| Mar. 15, 2017 | | 25,480 | 19,620 | | | | | | |
| Mar. 16, 2017 | | 23,570 | | 573.6 | 0.0 | 31.1 | 247.4 | 31.1 | 48.9 |
| Mar. 17, 2017 | | 20,940 | | 853.1 | 0.0 | | | | |
| Mar. 18, 2017 | Scenario 15 | 22,470 | 17,080 | | | | 249.6 | | |
| Mar. 19, 2017 | H = 18, H = 48 | 20,450 | | | | | | | 86.1 |
| Mar. 20, 2017 | Qr = 200 | 22,850 | 18,280 | | | 41.2 | 385.5 | 41.2 | 81.4 |
| Mar. 21, 2017 | | 21,520 | | | | | | | |
| Mar. 22, 2017 | | 20,180 | | 1035.0 | 0.1 | | 313.4 | | 68.5 |
| Mar. 23, 2017 | | 21,100 | | | | | | | |
| Mar. 24, 2017 | | 18,470 | 13,480 | | | 47.2 | 307.6 | 47.2 | 81.5 |
| May 1, 2017 | | 8,740 | | | | | 227.2 | | |
| May 2, 2017 | | 10,250 | 7,585 | | | | | | |
| May 3, 2017 | Scenario 16 | 12,024 | | | | | | | |
| May 4, 2017 | HRT = 12 | 13,486 | | | | | | | |
| May 5, 2017 | SRT = 24 | 22,680 | 19,278 | | | | 314.2 | | 85.0 |
| May 6, 2017 | Qr = 50 | 21,190 | | | | | 283.5 | | |
| May 7, 2017 | | 16,162 | 13,253 | | | 34.3 | 215.4 | | |
| May 8, 2017 | | 20,462 | | | | | 271.1 | | |
| May 9, 2017 | | 17,539 | 14,207 | 541.8 | 0.1 | | | | 91.0 |
| May 10, 2017 | | 19,244 | | 13.0 | | 50.1 | 280.0 | 76.6 | 63.6 |
| May 11, 2017 | | 18,648 | | 794.6 | 0.1 | | | | |
| May 12, 2017 | | 22,677 | 18,595 | | | | 318.2 | 40.8 | 35.2 |
| May 13, 2017 | | 20,916 | | | | | | | 57.8 |
| May 14, 2017 | | 21,134 | 16,907 | 434.5 | 0.0 | | | | |
| May 15, 2017 | Scenario 17 | 18,479 | | | | 51.5 | 180.0 | 31.9 | 30.7 |
| May 16, 2017 | HRT = 18 | 21,009 | | 341.6 | 0.3 | 85.1 | | | |
| May 17, 2017 | SRT = 24 | 18,136 | 13,965 | | | | | | |
| May 18, 2017 | Qr = 200 | 20,563 | | 684.5 | 0.7 | | 181.0 | 102.7 | 83.5 |
| May 19, 2017 | | 19,165 | 13,799 | | | | | | 63.1 |
| May 20, 2017 | | 21,167 | | | | | | | |
| May 21, 2017 | | 19,992 | | | | | 234.2 | 51.9 | 47.6 |
| May 22, 2017 | | 18,420 | 15,657 | 468.4 | 0.9 | | | | 52.9 |
| May 23, 2017 | | 19,016 | 15,403 | | | 43.9 | 189.3 | 64.5 | 52.9 |
| May 24, 2017 | Scenario 18 | 22,087 | | | | | | | 49.1 |
| May 25, 2017 | H = 18 | 18,704 | | | | | 363.0 | 145.7 | 151.8 |
| May 26, 2017 | S = 36 | 22,435 | 17,499 | 561.8 | 1.3 | | | | |
| May 27, 2017 | Qr = 200 | 17,170 | | | | | | | |
| May 29, 2017 | | 24,940 | | 623.5 | 0.0 | | | | |
| May 30, 2017 | | 19,566 | 14,479 | | | | | | |
| May 31, 2017 | | 18,942 | | | | | 372.4 | | |
| Jun. 1, 2017 | | 25,573 | 21,226 | 746.8 | 0.11 | | | | |
| Jun. 2, 2017 | Scenario 19 | 22,011 | | | | | 530.1 | 71.1 | 63.5 |
| Jun. 3, 2017 | h = 12 | 21,617 | 16,213 | | | | | | |
| Jun. 4, 2017 | s = 30 | 24,092 | | | | | 415.6 | 115.6 | 93.2 |
| Jun. 5, 2017 | Qr = 200 | 25,929 | | | | | | | |
| Jun. 6, 2017 | | 24,643 | | | | | 421.8 | 63.6 | 52.1 |
| Jun. 7, 2017 | | 20,022 | 14,216 | 286.3 | 0.2 | | | | |
| Jun. 8, 2017 | | 19,462 | | | | | 537.3 | 85.0 | 81.7 |
| Jun. 9, 2017 | | 21,968 | 17,794 | | | | | | 85.2 |
| Jun. 10, 2017 | | 20,921 | | | | | | | |
| Jun. 11, 2017 | RUN 20 | 22,635 | | 457.6 | 0.0 | | | | |
| Jun. 12, 2017 | h = 12 | 21,914 | | | | | 738.9 | 137.9 | 115.9 |
| Jun. 13, 2017 | s = 54 | 17,231 | 13,440 | | | | | | 94.7 |
| Jun. 14, 2017 | Qr = 50 | 20,796 | | | | 19.5 | | | |
| Jun. 15, 2017 | | 20,151 | 14,710 | 113.5 | 0.1 | | 806.4 | 121.9 | 115.0 |
| Jun. 16, 2017 | | 21,969 | | | | | | | 72.7 |
| Jun. 17, 2017 | | 18,658 | 13,247 | | | 35.9 | | | |

-continued

| | | Plug Flow Reactor Waste Sludge | | | | | | | |
|---|---|---|---|---|---|---|---|---|---|
| Date | Scenario | TSS, mg/L | VSS, mg/L | TKN, mg/L | NO2 + NO3, mg/L | Mg, mg/L | TP, mg-P/L | sTP, mg-P/L | OrthoP, mg-P/L |
| Jun. 18, 2017 | | 19,205 | | 418.4 | 0.0 | | | | |
| Jun. 19, 2017 | | 19,561 | 15,062 | | | | 813.7 | 110.8 | 104.5 |
| Jun. 20, 2017 | | 23,140 | | | | 40.2 | | | |
| Jun. 21, 2017 | | 19,979 | 15,184 | | | | 686.1 | 145.8 | 125.7 |
| Jun. 22, 2017 | | 18,902 | | | | | | | |
| Jun. 23, 2017 | | 19,665 | | | | 27.5 | 336.3 | 72.1 | 67.4 |
| Jun. 24, 2017 | run 21 | 19,515 | | 372.2 | 0.1 | | | | 93.5 |
| Jun. 25, 2017 | H = 18 | 21,498 | 18,058 | | | | | | |
| Jun. 26, 2017 | S = 48 | 24,209 | | | | | 577.3 | 172.1 | 162.4 |
| Jun. 27, 2017 | Qr = 50 | 18,369 | | | | | | | 100.9 |
| Jun. 28, 2017 | | 19,175 | 15,532 | | | 30.4 | | | |
| Jun. 29, 2017 | | 23,418 | | 738.0 | 0.0 | | 496.4 | 159.8 | 159.8 |
| Jun. 30, 2017 | | 20,867 | | | | | | | 177.7 |
| Jul. 1, 2017 | | 24,862 | 18,647 | | | | | | |
| Jul. 2, 2017 | | 27,789 | | | | 45.1 | 336.8 | | |
| Jul. 3, 2017 | | 23,176 | | 242.8 | 0.0 | | 261.2 | 34.2 | 30.8 |
| Jul. 4, 2017 | | 21,852 | 17,919 | | | | | | |
| Jul. 5, 2017 | | 19,528 | | | | | | | |
| Jul. 6, 2017 | | 27,982 | 22,665 | | | | 709.4 | 67.3 | 62.9 |
| Jul. 7, 2017 | | 26,200 | | | | 29.3 | | | 55.8 |
| Jul. 8, 2017 | run 22 | 26,018 | | 1048.2 | 0.0 | | | | |
| Jul. 9, 2017 | h = 12 | 26,090 | | | | | 1009.6 | 51.1 | 48.2 |
| Jul. 10, 2017 | s = 54 | 24,415 | 19,288 | | | | | | |
| Jul. 11, 2017 | Qr = 100 | 27,083 | | | | 54.0 | 1022.6 | 90.9 | 75.1 |
| Jul. 12, 2017 | | 27,540 | | 320.3 | 0.0 | | | | |
| Jul. 13, 2017 | | 25,412 | 18,297 | | | | 1300.4 | 90.2 | 85.1 |
| Jul. 14, 2017 | | 24,818 | | | | | | | |
| Jul. 15, 2017 | | 28,383 | | | | 59.4 | 1167.7 | 67.8 | 60.5 |
| Jul. 16, 2017 | | 23,591 | | 375.9 | 0.0 | | | | 48.0 |
| Jul. 17, 2017 | | 23,255 | 17,209 | | | | 428.2 | 35.9 | 30.7 |
| Jul. 18, 2017 | | 26,234 | | | | | 629.3 | | |
| Jul. 19, 2017 | | 24,841 | 20,370 | | | | | | |
| Jul. 20, 2017 | | 27,867 | | | | 37.1 | | | |
| Jul. 21, 2017 | | 23,964 | 17,014 | 550.6 | 0.1 | | 228.1 | 43.8 | 38.1 |
| Jul. 22, 2017 | | 27,015 | | | | | | | |
| Jul. 23, 2017 | run 23 | 25,258 | | | | | 444.7 | 74.4 | 70.9 |
| Jul. 24, 2017 | h = 18 | 25,616 | 19,468 | | | | 407.6 | | 62.3 |
| Jul. 25, 2017 | s = 54 | 25,207 | | | 0.0 | 46.4 | | | |
| Jul. 26, 2017 | Qr = 200 | 26,808 | 22,251 | | | | 493.7 | 82.6 | 67.7 |
| Jul. 27, 2017 | | 26,300 | | | | | | | |
| Jul. 28, 2017 | | 26,901 | 21,521 | | | 49.8 | 651.5 | 80.5 | 67.1 |
| Jul. 29, 2017 | | 25,409 | | 708.7 | 0.0 | | 700.4 | | 67.2 |
| Jul. 30, 2017 | | 26,051 | | | | | | | |
| Jul. 31, 2017 | | 27,062 | 21,379 | | | 36.0 | 851.2 | 121.6 | 122.8 |
| Aug. 1, 2017 | | 26,196 | | 446.7 | 0.0 | | 742.1 | | |
| Aug. 2, 2017 | | 27,285 | 20,191 | | | | 625.1 | 135.3 | 106.5 |

| | | Plug Flow Reactor Second Zone | | | | | | | | | |
|---|---|---|---|---|---|---|---|---|---|---|---|
| Date | Scenario | TSS, mg/L | VSS, mg/L | pH | ORP | TKN, mg·L | NO2 + NO3, mg/L | VFA, mg-HAc/L | Mg, mg/L | TP, mg-P/L | sTP, mg-P/L | OrthoP, mg-P/L |
| Sep. 29, 2016 | Baseline | | | | | | | | | | |
| Sep. 30, 2016 | Two Zone | | | | | | | | | | |
| Oct. 1, 2016 | Reactor | | | | | | | | | | |
| Oct. 2, 2016 | | | | | | | | | | | |
| Oct. 3, 2016 | | | | | | | | | | | |
| Oct. 4, 2016 | | | | | | | | | | | |
| Oct. 5, 2016 | | | | | | | | | | | |
| Oct. 6, 2016 | | | | | | | | | | | |
| Oct. 7, 2016 | | | | | | | | | | | |
| Oct. 8, 2016 | | | | | | | | | | | |
| Oct. 9, 2016 | | | | | | | | | | | |
| Oct. 10, 2016 | | | | | | | | | | | |
| Oct. 11, 2016 | | | | | | | | | | | | 1.1 |
| Oct. 12, 2016 | | | | | | | | | | | |
| Oct. 13, 2016 | | | | | | | | | | | |
| Oct. 14, 2016 | | | | | −182.0 | | | | | | |
| Oct. 15, 2016 | | | | | −265.0 | | | | | | |
| Oct. 16, 2016 | | | | 6.8 | −238.0 | | | | | | |

-continued

| | | | | | TKN, | NO2 + | VFA, | | | sTP, | |
|---|---|---|---|---|---|---|---|---|---|---|---|
| | | TSS, | VSS, | | | mg · | NO3, | mg- | Mg, | TP, mg- | mg- | OrthoP, |
| Date | Scenario | mg/L | mg/L | pH | ORP | L | mg/L | HAc/L | mg/L | P/L | P/L | mg-P/L |

| Date | Scenario | TSS, mg/L | VSS, mg/L | pH | ORP | TKN, mg·L | NO2+NO3, mg/L | VFA, mg-HAc/L | Mg, mg/L | TP, mg-P/L | sTP, mg-P/L | OrthoP, mg-P/L |
|---|---|---|---|---|---|---|---|---|---|---|---|---|
| Oct. 17, 2016 | | 18,330 | 14,480 | 7.1 | | | | | | 390.0 | | |
| Oct. 18, 2016 | | 17,820 | 13,190 | 6.8 | | | | | | | | |
| Oct. 19, 2016 | | | | 6.6 | | | | | | | | |
| Oct. 20, 2016 | | 28,240 | 15,930 | 7.2 | | | | | | 647.0 | | |
| Oct. 21, 2016 | | 27,630 | 10,980 | 6.6 | | | | | | 623.0 | | |
| Oct. 22, 2016 | | 25,250 | 13,790 | 7.0 | | | | | | 421.0 | | |
| Oct. 23, 2016 | | 15,000 | 10,500 | 6.9 | −200.0 | | | | | | | |
| Oct. 24, 2016 | | 20,820 | 16,660 | 6.2 | | | | | | 284.0 | | |
| Oct. 25, 2016 | | 5,930 | 4,680 | 6.7 | −200.0 | | | 31.3 | 28.2 | | | |
| Oct. 26, 2016 | Scenario 7 | 14,850 | 10,990 | 6.6 | | | | | | 269.0 | 63.1 | 59.5 |
| Oct. 27, 2016 | HRT12; SRT42 | 16,590 | 13,270 | 6.6 | −210.0 | | | | | | | |
| Oct. 28, 2016 | | 13,620 | 11,300 | 6.6 | | | | 26.9 | 25.5 | 337.0 | 64.7 | 61.6 |
| Oct. 29, 2016 | | 12,390 | 10,410 | 6.9 | −180.0 | | | | | | 54.6 | 58.1 |
| Oct. 30, 2016 | | 14,850 | 11,430 | 6.6 | −150.0 | | | | | 312.0 | | |
| Oct. 31, 2016 | | 20,080 | 16,670 | 7.2 | | | | | | | 62.4 | 70.1 |
| Nov. 1, 2016 | | 20,510 | 14,970 | 6.8 | −140.0 | 552.1 | 0.6 | 37.1 | 34.0 | 451.4 | | |
| Nov. 2, 2016 | | 12,000 | 10,080 | | −260.0 | | | 39.2 | 38.5 | | 43.1 | 51.3 |
| Nov. 3, 2016 | scenario 8 | 16,650 | 12,990 | 7.1 | −271.0 | | | 35.6 | 31.4 | 380.4 | 63.4 | 59.8 |
| Nov. 4, 2016 | HRT9, SRT30 | 21,580 | 15,970 | | −250.0 | 529.0 | 1.5 | | | | | |
| Nov. 5, 2016 | | 19,000 | 12,920 | | −242.0 | | | 46.2 | 38.3 | | 47.7 | 49.2 |
| Nov. 6, 2016 | | 20,000 | 13,800 | | −248.0 | | | | | 442.0 | 53.9 | 57.3 |
| Nov. 7, 2016 | | 24,250 | 19,400 | 7.5 | −261.0 | | | 36.1 | 34.2 | | | 40.6 |
| Nov. 8, 2016 | | 20,000 | 15,800 | | | | | | | | 42.0 | 43.8 |
| Nov. 9, 2016 | | 20,000 | 15,400 | 7.0 | −254.0 | | | 35.3 | 34.3 | 442.0 | | |
| Nov. 10, 2016 | scenario 9 | 22,450 | 18,180 | 7.3 | | | | | | | 54.1 | 61.5 |
| Nov. 11, 2016 | HRT9, SR148 | 29,630 | 23,110 | 7.3 | −271.0 | | | | | | 68.5 | 65.9 |
| Nov. 12, 2016 | | 25,870 | 18,110 | | | | | | | 634.0 | | |
| Nov. 13, 2016 | | 27,690 | 22,150 | | | | | | | | | |
| Nov. 14, 2016 | | 25,390 | 19,300 | 7.0 | −264.0 | 706.6 | 0.2 | 37.0 | | 417.0 | 76.8 | 77.6 |
| Nov. 15, 2016 | | 12,890 | 9,670 | 7.3 | −283.0 | | | | | 242.0 | | |
| Nov. 16, 2016 | | 26,850 | 20,140 | 6.9 | −274.0 | | | 36.7 | 44.5 | | 45.6 | 50.1 |
| Nov. 17, 2016 | scenario 10 | 25,410 | 17,280 | | | | | | | | | |
| Nov. 18, 2016 | HRT6, SRT18 | 19,870 | 15,500 | 6.6 | −285.0 | | | | 40.8 | 536.0 | 45.2 | 41.1 |
| Nov. 19, 2016 | | 18,700 | 14,590 | | | | | | | 523.0 | | |
| Nov. 20, 2016 | | 17,040 | 13,970 | 6.8 | −231.0 | | | | | | 68.4 | 60.5 |
| Nov. 21, 2016 | | 16,260 | 11,380 | 7.3 | −246.0 | | | 35.0 | 30.7 | | 63.3 | 63.3 |
| Nov. 22, 2016 | | 19,620 | 15,890 | 6.6 | | | | | | 502.0 | | |
| Nov. 23, 2016 | | 18,590 | 13,200 | 7.1 | −267.0 | | | 36.8 | 31.8 | | 59.0 | 56.2 |
| Nov. 24, 2016 | | 20,360 | 15,070 | 7.1 | | | | | | | | |
| Nov. 25, 2016 | | 19,830 | 16,460 | 6.7 | −267.0 | | | | | | | |
| Nov. 26, 2016 | | 20,150 | 15,110 | 6.8 | −296.0 | | | | | | | |
| Nov. 27, 2016 | scenario 11 | 16,980 | 14,090 | 6.7 | | | | | | | | |
| Nov. 28, 2016 | HRT18, SRT36 | 18,000 | 13,860 | 7.1 | −247.0 | 763.7 | 0.0 | 33.7 | 37.9 | | 63.2 | 58.0 |
| Nov. 29, 2016 | | 16,980 | 14,260 | 7.2 | | | | | | 381.0 | 87.6 | 81.9 |
| Nov. 30, 2016 | | 16,580 | 12410 | 6.7 | −297.0 | | | | | | | |
| Dec. 1, 2016 | | 15,670 | 11,440 | 6.8 | | | | 39.0 | 27.2 | | 79.3 | 90.1 |
| Dec. 2, 2016 | Scenario 12 | 34,520 | 24,850 | 6.6 | −314.0 | | | | | 708.0 | 52.3 | 59.4 |
| Dec. 3, 2016 | HRT24, SRT54 | 33,520 | 27,490 | 6.7 | | 772.9 | 0.0 | | | 701.0 | | 58.5 |
| Dec. 4, 2016 | | 34,520 | 28,650 | 6.5 | −316.0 | | | 37.6 | 43.7 | | 72.0 | 75.0 |
| Dec. 5, 2016 | | 35,200 | 24,640 | 6.7 | | | | | | | | |
| Dec. 6, 2017 | | 34,520 | 25,540 | 7.2 | −290.0 | 677.7 | 0.1 | | | 732.0 | 79.2 | 94.3 |
| Dec. 7, 2017 | n/a | 34,520 | 26,240 | 6.7 | | | | | | | | |
| Dec. 8, 2017 | n/a | 32,470 | 25,330 | 7.0 | −260.0 | 694.2 | 0.0 | 30.1 | 25.8 | | 104.3 | 98.4 |
| Dec. 9, 2017 | | 34,520 | 25,540 | 6.4 | | | | | | | | |
| Dec. 10, 2017 | | 33,580 | 25,520 | 6.6 | −297.0 | 914.8 | 0.1 | 28.8 | 32.5 | 746.0 | 65.5 | 78.0 |
| Feb. 27, 2017 | | | | | | | | | | | | |
| Feb. 28, 2017 | | 8,560 | | 6.6 | −208.0 | | | 34.8 | | 210.0 | 57.2 | 55.5 |
| Mar. 1, 2017 | | 12,230 | | 6.2 | −261.0 | | | | | | | |
| Mar. 2, 2017 | SCENARIO 13 | 21,000 | 4,300 | 6.7 | −240.0 | | | 34.0 | 30.8 | 460.0 | 36.8 | 43.3 |
| Mar. 3, 2017 | HRT12, SRT24 | 22,870 | | 6.7 | −221.0 | 850.1 | 0.2 | | | | | |
| Mar. 4, 2017 | Qr = 200 | 23,450 | 19,850 | 7.0 | −259.0 | | | | | | | |
| Mar. 5, 2017 | | 24,630 | | 6.9 | | | | | | 550.0 | 49.5 | 50.0 |
| Mar. 6, 2017 | | 29,420 | 12,000 | | −271.0 | | | | | 550.0 | 50.9 | 53.6 |
| Mar. 7, 2017 | | 14,600 | | 6.9 | −278.0 | | 0.0 | 31.2 | 26.7 | | | |
| Mar. 8, 2017 | | 16,520 | | | | | | | | 350.0 | 46.9 | 53.3 |

-continued

| | | Plug Flow Reactor Second Zone | | | | | | | | | |
|---|---|---|---|---|---|---|---|---|---|---|---|
| Date | Scenario | TSS, mg/L | VSS, mg/L | pH | ORP | TKN, mg·L | NO2 + NO3, mg/L | VFA, mg-HAc/L | Mg, mg/L | TP, mg-P/L | sTP, mg-P/L | OrthoP, mg-P/L |
| Mar. 9, 2017 | | 28,410 | | 6.4 | −276.0 | | | 31.2 | 35.8 | | | |
| Mar. 10, 2017 | Scenario 14 | 33,580 | 26,864 | 6.9 | −233.0 | | | | | 660.0 | 90.1 | 84.2 |
| Mar. 11, 2017 | HRT = 12, SRT = 42 | 42,590 | 34,072 | 6.5 | −242.0 | 675.2 | 0.0 | | 37.0 | 860.0 | 80.4 | 85.5 |
| Mar. 12, 2017 | Qr = 100 | 36,580 | 29,264 | 6.4 | −238.0 | | | | | | | |
| Mar. 13, 2017 | | 36,890 | 29,512 | 6.9 | −223.0 | 721.3 | 0.1 | 37.3 | 39.3 | 750.0 | 52.1 | 57.9 |
| Mar. 14, 2017 | | 39,870 | 30,520 | 6.4 | −297.0 | | | | | | | |
| Mar. 15, 2017 | | 37,450 | | 7.6 | −282.0 | | | | | | | |
| Mar. 16, 2017 | | 38,990 | 31,000 | 6.6 | −225.0 | 585.3 | 0.0 | 29.9 | 31.4 | 750.0 | 48.4 | 55.6 |
| Mar. 17, 2017 | | 35,870 | 28,690 | 7.1 | −174.0 | 907.6 | 0.0 | | | | | |
| Mar. 18, 2017 | Scenario 15 | 34,120 | 25,410 | 7.2 | −224.0 | | | 34.6 | 38.4 | | | |
| Mar. 19, 2017 | H = 18, H = 48 | 33,440 | 26,890 | 7.0 | −263.0 | | | | | 680.0 | 90.9 | 81.2 |
| Mar. 20, 2017 | Qr = 200 | 29,640 | | 7.1 | −246.0 | | | | 30.1 | 650.0 | 74.0 | 83.1 |
| Mar. 21, 2017 | | 29,630 | | 6.7 | −243.0 | | | | | | | |
| Mar. 22, 2017 | | 32,725 | 26,540 | 7.2 | −224.0 | 924.1 | 0.1 | 38.2 | 36.0 | 710.0 | 59.0 | 67.8 |
| Mar. 23, 2017 | | 33,694 | 26,950 | 6.6 | −282.0 | | | | | | | |
| Mar. 24, 2017 | | 32,832 | | 6.7 | −263.0 | | | 45.5 | 47.2 | 610.0 | 85.5 | 80.7 |
| May 1, 2017 | | 8,960 | | | | | | | | 230.0 | 37.7 | 37.3 |
| May 2, 2017 | | 9,870 | 7,700 | 6.9 | | | | | | | | |
| May 3, 2017 | Scenario 16 | 15,221 | 11,870 | 6.6 | | | | | | | | |
| May 4, 2017 | HRT = 12 | 15,682 | 15,240 | 6.7 | | | | 30.4 | | 320.0 | | |
| May 5, 2017 | SRT = 24 | 25,200 | 19,150 | 6.8 | −277.0 | | | | | 540.0 | 75.4 | 87.7 |
| May 6, 2017 | Qr = 50 | 24,080 | 18,780 | 6.8 | | | | | | | 89.0 | 103.5 |
| May 7, 2017 | | 21,840 | 17,690 | 6.9 | −223.0 | | | 33.3 | 30.4 | | | |
| May 8, 2017 | | 23,520 | 18,350 | 6.4 | −229.0 | 576.4 | 0.1 | | | 500.0 | 85.9 | 87.7 |
| May 9, 2017 | | 24,360 | 19,000 | 6.6 | −234.0 | | | | | | | |
| May 10, 2017 | | 22,120 | 16,810 | 6.6 | −137.0 | 764.0 | 0.1 | 36.7 | 33.5 | 450.0 | 95.1 | 90.6 |
| May 11, 2017 | | 25,200 | 20,410 | 6.7 | −248.0 | | | | | | | |
| May 12, 2017 | | 25,480 | 19,360 | 7.2 | −212.0 | | | 26.1 | | 510.0 | 45.0 | 39.5 |
| May 13, 2017 | | 25,200 | 20,160 | 6.9 | −248.0 | 462.2 | 0.0 | | | 490.0 | 59.8 | 65.7 |
| May 14, 2017 | | 24,292 | 19,190 | 7.0 | −257.0 | | | | | | | |
| May 15, 2017 | Scenario 17 | 21,240 | 16,350 | 6.7 | −217.0 | 359.6 | 0.2 | 48.5 | 48.5 | 410.0 | 28.7 | 33.4 |
| May 16, 2017 | HRT = 18 | 25,313 | 20,250 | 6.4 | −266.0 | | | | | 500.0 | 78.5 | 82.6 |
| May 17, 2017 | SRT = 24 | 25,188 | 20,650 | | | 611.2 | 0.7 | 43.2 | | | | |
| May 18, 2017 | Qr = 200 | 24,479 | 19,090 | 6.7 | −237.0 | 57.1 | | 285.0 | 50.1 | 450.0 | 84.3 | 79.5 |
| May 19, 2017 | | 25,898 | 20,200 | | | | | | | 500.0 | 67.3 | 59.0 |
| May 20, 2017 | | 28,995 | 22,040 | 6.8 | −247.0 | | | | | | | |
| May 21, 2017 | | 27,767 | 21,100 | 7.2 | −219.0 | 454.8 | 1.0 | 30.9 | | 560.0 | 53.9 | 52.3 |
| May 22, 2017 | | 25,584 | 19,700 | | | | | | | | | |
| May 23, 2017 | | 26,050 | 21,100 | 6.8 | −276.0 | 20.8 | | 48.0 | 44.5 | 490.0 | 51.2 | 55.7 |
| May 24, 2017 | Scenario 18 | 25,098 | 19,330 | | −269.0 | | | | | | | 54.5 |
| May 25, 2017 | H = 18 | 24,291 | 19,920 | 6.8 | | 585.2 | 1.2 | | | >1225 | 196.7 | 172.5 |
| May 26, 2017 | S = 36 | 25,208 | 19,410 | 7.2 | −233.0 | | | | | | | |
| May 27, 2017 | Qr = 200 | 23,847 | 18,360 | 7.2 | −282.0 | | | | | | | |
| May 29, 2017 | | 28,341 | 22,960 | 6.1 | −218.0 | | | | | | | |
| May 30, 2017 | | 21,501 | 16,770 | 6.7 | −124.0 | | | | | | | |
| May 31, 2017 | | 23,385 | 15,420 | 6.7 | −285.0 | 704.5 | 0.1 | 40.4 | | 490.0 | 6.7 | 6.5 |
| Jun. 1, 2017 | | 28,733 | 22,700 | 6.6 | −256.0 | | | | | | | |
| Jun. 2, 2017 | Scenario 19 | 28,219 | 22,580 | 6.7 | −224.0 | | | | | 590.0 | 65.0 | 70.6 |
| Jun. 3, 2017 | h = 12 | 23,755 | 20,480 | 7.1 | −263.0 | | | | | | | |
| Jun. 4, 2017 | s = 30 | 27,691 | 21,320 | 6.8 | −232.0 | | | | | 590.0 | 77.7 | 86.3 |
| Jun. 5, 2017 | Qr = 200 | 29,465 | 23,280 | 6.9 | −290.0 | | | | | | | |
| Jun. 6, 2017 | | 27,381 | 21,080 | 6.8 | −234.0 | 311.2 | 0.2 | 52.0 | | 560.0 | 45.9 | 51.6 |
| Jun. 7, 2017 | | 22,247 | 17,130 | 6.8 | −146.0 | | | | | | | |
| Jun. 8, 2017 | | 26,300 | 20,510 | 7.4 | −112.0 | | | | | | 85.1 | 86.0 |
| Jun. 9, 2017 | | 26,791 | 20,900 | 6.7 | −208.0 | | | | | 520.0 | 89.0 | 94.7 |
| Jun. 10, 2017 | | 29,057 | 22,080 | 6.4 | −287.0 | 416.0 | 0.0 | | 26.4 | 580.0 | | |
| Jun. 11, 2017 | RUN 20 | 25,433 | 20,600 | 6.7 | −235.0 | | | | | | | |
| Jun. 12, 2017 | h = 12 | 33,690 | 25,940 | 6.6 | −228.0 | | | | | | | 107.3 |
| Jun. 13, 2017 | s = 54 | 22,378 | 18,350 | 6.8 | −250.0 | | | | | 678.0 | 92.7 | 98.6 |
| Jun. 14, 2017 | Qr = 50 | 23,107 | 17,560 | 6.4 | −286.0 | 118.2 | 0.1 | 51.3 | 41.9 | | | |
| Jun. 15, 2017 | | 24,575 | 19,910 | 6.1 | −252.0 | | | | | | 120.4 | 108.5 |
| Jun. 16, 2017 | | 24,684 | 19,250 | 6.6 | −240.0 | | | | | 480.0 | | 79.0 |
| Jun. 17, 2017 | | 21,950 | 17,340 | 6.6 | −215.0 | 414.3 | 0.0 | 34.0 | 39.7 | 490.0 | | |
| Jun. 18, 2017 | | 22,332 | 17,640 | 6.5 | −272.0 | | | | | | | |
| Jun. 19, 2017 | | 23,567 | 22,480 | 6.5 | −249.0 | | | | | | 114.9 | 103.5 |
| Jun. 20, 2017 | | 28,219 | 22,010 | 6.4 | −289.0 | | | | 51.3 | 869.0 | | |
| Jun. 21, 2017 | | 24,666 | 19,490 | 6.9 | −212.0 | | | | | 540.0 | 121.1 | 115.3 |
| Jun. 22, 2017 | | 25,894 | 20,200 | 7.1 | −287.0 | | | | | | | |
| Jun. 23, 2017 | | 26,221 | 20,710 | 7.0 | −242.0 | 396.0 | 0.1 | | 26.7 | | | 62.4 |
| Jun. 24, 2017 | run 21 | 24,394 | 19,270 | 7.2 | −258.0 | | | | | 510.0 | 106.4 | 107.5 |
| Jun. 25, 2017 | H = 18 | 26,541 | 20,170 | 6.8 | −235.0 | | | | | 876.0 | | |

-continued

| | | Plug Flow Reactor Second Zone | | | | | | | | | | |
|---|---|---|---|---|---|---|---|---|---|---|---|---|
| Date | Scenario | TSS, mg/L | VSS, mg/L | pH | ORP | TKN, mg·L | NO2 + NO3, mg/L | VFA, mg-HAc/L | Mg, mg/L | TP, mg-P/L | sTP, mg-P/L | OrthoP, mg-P/L |
| Jun. 26, 2017 | S = 48 | 31,440 | 25,150 | 6.6 | −232.0 | | | | | | | 164.0 |
| Jun. 27, 2017 | Qr = 50 | 25,513 | 20,670 | 7.0 | −229.0 | | | | | 520.0 | 79.4 | 93.4 |
| Jun. 28, 2017 | | 25,913 | 20,990 | 7.5 | −187.0 | 745.5 | 0.0 | 28.5 | 33.0 | 470.0 | | |
| Jun. 29, 2017 | | 30,413 | 24,330 | 7.0 | −268.0 | | | | | | 145.5 | 158.2 |
| Jun. 30, 2017 | | 26,970 | 21,850 | 7.1 | −246.0 | | | | | | | 167.6 |
| Jul. 1, 2017 | | 30,140 | 24,110 | 7.3 | −287.0 | | | | | 600.0 | | |
| Jul. 2, 2017 | | 30,537 | 23,820 | 7.2 | −232.0 | 250.3 | 0.0 | 44.5 | 39.1 | | | |
| Jul. 3, 2017 | | 29,820 | 24,450 | 6.7 | −249.0 | | | | | 570.0 | 32.3 | 30.5 |
| Jul. 4, 2017 | | 29,680 | 24,340 | 7.1 | −244.0 | | | | | | | |
| Jul. 5, 2017 | | 30,190 | 23,250 | 6.8 | −232.0 | | | | | | | |
| Jul. 6, 2017 | | 35,875 | 20,570 | 7.0 | −226.0 | | | | | 740.0 | 60.5 | 59.9 |
| Jul. 7, 2017 | | 37,560 | 29,670 | 7.0 | −142.0 | 935.9 | 0.0 | 28.1 | 31.6 | | | 52.6 |
| Jul. 8, 2017 | run 22 | 36,520 | 28,850 | 6.4 | −220.0 | | | | | | | |
| Jul. 9, 2017 | h = 12 | 35,220 | 26,770 | 6.5 | −290.0 | | | | | 910.0 | 47.2 | 53.6 |
| Jul. 10, 2017 | s = 54 | 30,906 | 23,490 | 7.0 | −289.0 | | | | | | | |
| Jul. 11, 2017 | Qr = 100 | 39,150 | 32,100 | 6.8 | −292.0 | 24.2 | 0.0 | 49.1 | 44.3 | 318.0 | 82.9 | 79.1 |
| Jul. 12, 2017 | | 34,960 | 23,590 | 7.4 | −282.0 | | | | | 630.0 | | |
| Jul. 13, 2017 | | 37,540 | 30,030 | 7.0 | −312.0 | | | | | 700.0 | 80.6 | 89.6 |
| Jul. 14, 2017 | | 41,160 | 33,340 | 6.5 | −321.0 | | | | | | | |
| Jul. 15, 2017 | | 40,290 | 33,040 | 7.0 | −310.0 | 404.2 | 0.0 | | 60.4 | 710.0 | 77.7 | 68.8 |
| Jul. 16, 2017 | | 40,360 | 39,980 | 6.5 | −281.0 | | | | | | | 51.1 |
| Jul. 17, 2017 | | 39,570 | 32,450 | 6.7 | −219.0 | | | | | 740.0 | 31.9 | 30.7 |
| Jul. 18, 2017 | | 40,200 | 32,160 | 6.2 | −268.0 | | | | | | | |
| Jul. 19, 2017 | | 39,650 | 32,510 | 6.8 | −287.0 | | | | | | | |
| Jul. 20, 2017 | | 31,312 | 23,800 | 6.4 | −282.0 | 514.6 | 0.1 | 74.5 | 38.2 | 600.0 | | |
| Jul. 21, 2017 | | 31,952 | 30,440 | 6.5 | −237.0 | | | | | 620.0 | 36.7 | 36.3 |
| Jul. 22, 2017 | | 31,413 | 24,500 | 6.9 | −274.0 | | | | | | | |
| Jul. 23, 2017 | run 23 | 29,715 | 23,180 | 7.0 | −242.0 | | | | | | 75.0 | 80.6 |
| Jul. 24, 2017 | h = 18 | 30,862 | 25,310 | 7.6 | −269.0 | | 0.0 | | | 580.0 | 72.1 | 70.0 |
| Jul. 25, 2017 | s = 54 | 34,064 | 26,570 | 6.7 | −213.0 | | | 45.1 | 43.2 | | | |
| Jul. 26, 2017 | Qr = 200 | 31,539 | 30,650 | 6.7 | −284.0 | | | | | 690.0 | 61.9 | 64.5 |
| Jul. 27, 2017 | | 34,156 | 26,980 | 6.9 | −250.0 | | | | | | | |
| Jul. 28, 2017 | | 34,052 | 27,580 | 6.7 | −218.0 | 632.8 | 0.0 | 51.4 | 46.7 | 690.0 | 79.4 | 77.1 |
| Jul. 29, 2017 | | 31,762 | 24,770 | 6.1 | −267.0 | | | | | | | 73.0 |
| Jul. 30, 2017 | | 29,944 | 23,060 | 7.0 | −244.0 | | | | | | | |
| Jul. 31, 2017 | | 30,406 | 24,330 | 7.3 | −270.0 | 425.4 | 0.0 | 174.0 | 38.5 | 560.0 | 122.8 | 122.8 |
| Aug. 1, 2017 | | 32,341 | 26,200 | 6.9 | −317.0 | | | | | | | |
| Aug. 2, 2017 | | 32,100 | 24,720 | 6.4 | −233.0 | | | | | 680.0 | 107.6 | 107.6 |

| | | Plug Flow Reactor Effluent | | | | | | |
|---|---|---|---|---|---|---|---|---|
| Date | Scenario | TSS, mg/L | VSS, mg/L | pH | VFA, mg-HAc/L | TKN, mg/L | sol. TKN, mg/l | NH3, mg/L |
| Sep. 29, 2016 | Baseline | | | | | | | |
| Sep. 30, 2016 | Two Zone | | | | | | | |
| Oct. 1, 2016 | Reactor | | | | | | | |
| Oct. 2, 2016 | | | | | | | | |
| Oct. 3, 2016 | | | | | | | | |
| Oct. 4, 2016 | | | | | | | | |
| Oct. 5, 2016 | | | | | | | | |
| Oct. 6, 2016 | | | | | | | | |
| Oct. 7, 2016 | | | | | | | | |
| Oct. 8, 2016 | | | | | | | | |
| Oct. 9, 2016 | | | | | | | | |
| Oct. 10, 2016 | | | | | | | | |
| Oct. 11, 2016 | | 51.0 | 34.0 | | | | | |
| Oct. 12, 2016 | | 620.0 | 467.0 | | | | | |
| Oct. 13, 2016 | | 116.0 | 72.0 | | | | | |
| Oct. 14, 2016 | | 260.0 | | | | | | |
| Oct. 15, 2016 | | | | | | | | |
| Oct. 16, 2016 | | | | | | | | |
| Oct. 17, 2016 | | 480.0 | | | | | | |
| Oct. 18, 2016 | | 320.0 | | | | | | |
| Oct. 19, 2016 | | 190.0 | | | | | | |
| Oct. 20, 2016 | | 85.0 | 64.0 | | | | | |
| Oct. 21, 2016 | | 340.0 | | | | | | |
| Oct. 22, 2016 | | 280.0 | | | | | | |

-continued

| Date | Scenario | | | | | | | |
|---|---|---|---|---|---|---|---|---|
| Oct. 23, 2016 | | 400.0 | | | | | | |
| Oct. 24, 2016 | | 460.0 | 350.0 | | | | | |
| Oct. 25, 2016 | | 6600.0 | 5300.0 | 6.8 | | | | |
| Oct. 26, 2016 | Scenario 7 | 1000.0 | | | | | | |
| Oct. 27, 2016 | HRT12; SRT42 | 4000.0 | 3300.0 | 6.7 | 49.6 | | | |
| Oct. 28, 2016 | | 4200.0 | | | | | | |
| Oct. 29, 2016 | | 3980.0 | 3300.0 | 6.9 | 43.2 | | | |
| Oct. 30, 2016 | | 3340.0 | | | | | | |
| Oct. 31, 2016 | | 3450.0 | 2980.0 | 7.0 | | | | |
| Nov. 1, 2016 | | 8100.0 | 6900.0 | | 25.8 | 536.0 | 59.8 | 44.5 |
| Nov. 2, 2016 | | 6010.0 | 5138.6 | | | 279.0 | 36.1 | 34.6 |
| Nov. 3, 2016 | scenario 8 | 11000.0 | 9000.0 | 7.1 | | | | |
| Nov. 4, 2016 | HRT9, SRT30 | 7150.0 | | | 112.0 | 575.0 | 33.2 | 25.4 |
| Nov. 5, 2016 | | 9000.0 | 7470.0 | | | | | |
| Nov. 6, 2016 | | 8000.0 | | | 89.0 | | | |
| Nov. 7, 2016 | | 14750.0 | 12300.0 | 7.3 | | 947.0 | 32.5 | 26.4 |
| Nov. 8, 2016 | | 5500.0 | | | 87.1 | | | |
| Nov. 9, 2016 | | 6000.0 | 3900.0 | 6.9 | | | | |
| Nov. 10, 2016 | scenario 9 | 13450.0 | | | | | | |
| Nov. 11, 2016 | HRT9, SRT48 | 7210.0 | 5700.0 | | 132.1 | 519.5 | | 18.5 |
| Nov. 12, 2016 | | 6850.0 | | | | | | |
| Nov. 13, 2016 | | 5480.0 | 4600.0 | | | | | |
| Nov. 14, 2016 | | 9200.0 | 7800.0 | 7.0 | | 768.0 | 40.1 | 10.7 |
| Nov. 15, 2016 | | 4600.0 | 3600.0 | 7.3 | 51.5 | | | |
| Nov. 16, 2016 | | 6500.0 | 10000.0 | 6.9 | | 1020.0 | 22.4 | 11.6 |
| Nov. 17, 2016 | scenario 10 | 6500.0 | 5590.0 | | 63.8 | 473.4 | | |
| Nov. 18, 2016 | HRT6, SRT18 | 5870.0 | | 6.5 | | | | |
| Nov. 19, 2016 | | 5870.0 | 4637.3 | | 59.1 | 402.8 | | 24.2 |
| Nov. 20, 2016 | | 6870.0 | | 6.8 | | | | |
| Nov. 21, 2016 | | 5980.0 | | 6.9 | 46.5 | 658.0 | 44.7 | |
| Nov. 22, 2016 | | 6680.0 | 5344.0 | | | | | |
| Nov. 23, 2016 | | 9850.0 | | | 68.2 | 631.4 | | |
| Nov. 24, 2016 | | 9110.0 | 7290.0 | n/a | | | n/a | n/a |
| Nov. 25, 2016 | | 8760.0 | 7010.0 | n/a | | | n/a | n/a |
| Nov. 26, 2016 | | 7620.0 | 6700.0 | n/a | | | n/a | n/a |
| Nov. 27, 2016 | scenario 11 | 7430.0 | 6000.0 | | | | | |
| Nov. 28, 2016 | HRT18, SRT36 | 7000.0 | | 6.6 | 77.2 | 7411.5 | 53.0 | 27.3 |
| Nov. 29, 2016 | | 7030.0 | 5600.0 | | | | | |
| Nov. 30, 2016 | | 6890.0 | 5510.0 | 6.6 | 114.2 | 713.5 | 29.7 | |
| Dec. 1, 2016 | | 6710.0 | | | | | | |
| Dec. 2, 2016 | Scenario 12 | 13580.0 | 10860.0 | | | | | |
| Dec. 3, 2016 | HRT24, SRT54 | 12590.0 | 10070.0 | 6.7 | 116.4 | 765.2 | 42.5 | 31.2 |
| Dec. 4, 2016 | | 13480.0 | 10860.0 | | | | | |
| Dec. 5, 2016 | | 13680.0 | 10700.0 | | | | | |
| Dec. 6, 2017 | | 13200.0 | 10900.0 | 6.5 | 95.4 | 684.5 | 42.8 | 25.2 |
| Dec. 7, 2017 | n/a | 12500.0 | | | | | | |
| Dec. 8, 2017 | n/a | 12750.0 | 10890.0 | 6.9 | 110.5 | 746.5 | 51.0 | 35.1 |
| Dec. 9, 2017 | | 14270.0 | 11420.0 | | | | | |
| Dec. 10, 2017 | | 13580.0 | | 6.4 | 124.6 | 905.7 | 49.5 | 19.8 |
| Feb. 27, 2017 | | 43.0 | 31.9 | | 85.6 | | | |
| Feb. 28, 2017 | | 112.0 | | | | | | |
| Mar. 1, 2017 | | 93.0 | 30.0 | | 98.7 | | | |
| Mar. 2, 2017 | SCENARIO 13 | 72.0 | 51.0 | 6.7 | | | | |
| Mar. 3, 2017 | HRT12, SRT24 | 238.0 | | | 124.0 | 759.0 | 38.0 | 29.5 |
| Mar. 4, 2017 | Qr = 200 | 142.0 | 115.3 | | | | | |
| Mar. 5, 2017 | | 181.0 | | | 119.2 | | | |
| Mar. 6, 2017 | | 312.0 | | | 121.0 | 642.5 | 35.7 | |
| Mar. 7, 2017 | | 217.0 | 158.4 | 6.9 | 87.6 | | | 26.0 |
| Mar. 8, 2017 | | 220.0 | 160.0 | | | | | |
| Mar. 9, 2017 | | 369.0 | | 6.9 | 141.0 | | | |
| Mar. 10, 2017 | Scenario 14 | 412.0 | | | | | | |
| Mar. 11, 2017 | HRT = 12, SRT = 42 | 178.0 | 143.0 | 6.7 | 152.0 | 726.0 | 42.7 | 31.2 |
| Mar. 12, 2017 | Qr = 100 | 454.0 | | | | | | |
| Mar. 13, 2017 | | 1690.0 | 1225.3 | | 480.0 | 736.0 | 33.5 | 36.5 |
| Mar. 14, 2017 | | 690.0 | | 6.9 | | | | |
| Mar. 15, 2017 | | 485.0 | | | 103.5 | | | |
| Mar. 16, 2017 | | 218.0 | 162.6 | 6.6 | | 597.2 | 31.4 | 17.5 |
| Mar. 17, 2017 | | 223.0 | | | 93.5 | 965.5 | 64.4 | 25.7 |

-continued

| Date | Scenario | | | | | | |
|---|---|---|---|---|---|---|---|
| Mar. 18, 2017 | Scenario 15 | 178.0 | 125.6 | 6.8 | | | |
| Mar. 19, 2017 | H = 18, | 245.0 | | | 76.9 | | |
| | H = 48 | | | | | | |
| Mar. 20, 2017 | Qr = 200 | 336.0 | 234.9 | 6.7 | | | |
| Mar. 21, 2017 | | 209.0 | | | | | |
| Mar. 22, 2017 | | 185.0 | 142.3 | 7.1 | 128.5 | 825.1 | 63.5 | 19.6 |
| Mar. 23, 2017 | | 142.0 | | | | | 0.0 | |
| Mar. 24, 2017 | | 197.0 | 154.1 | 7.0 | 108.0 | | | |
| May 1, 2017 | | 24.0 | 18.0 | | | | | 0.0 |
| May 2, 2017 | | 67.0 | 51.0 | 6.4 | | 654.2 | 46.7 | 22.6 |
| May 3, 2017 | Scenario 16 | 62.0 | 49.0 | 7.0 | | | | |
| May 4, 2017 | HRT = 12 | 265.0 | 201.0 | 6.9 | 86.5 | | | |
| May 5, 2017 | SRT = 24 | 84.0 | 66.0 | 7.0 | | 851.2 | 60.8 | 23.0 |
| May 6, 2017 | Qr = 50 | 96.0 | 75.0 | 6.4 | | | | |
| May 7, 2017 | | 237.0 | 190.0 | 6.4 | 85.5 | | | |
| May 8, 2017 | | 177.0 | 133.0 | 6.6 | | 554.2 | 36.9 | 19.8 |
| May 9, 2017 | | 87.0 | 70.0 | 7.1 | | | | |
| May 10, 2017 | | 132.0 | 99.0 | 6.9 | 135.7 | 694.5 | | 23.2 |
| May 11, 2017 | | 98.0 | 79.0 | 6.5 | | 495.2 | | 17.7 |
| May 12, 2017 | | 92.0 | 72.0 | 6.6 | 186.0 | 884.0 | | 24.6 |
| May 13, 2017 | | 203.0 | 158.0 | 6.8 | | 502.4 | 29.6 | 15.2 |
| May 14, 2017 | | 201.0 | 147.0 | 6.5 | | | | |
| May 15, 2017 | Scenario 17 | 102.0 | 74.0 | 7.0 | | 352.5 | 22.0 | 11.8 |
| May 16, 2017 | HRT = 18 | 86.0 | 66.0 | 6.6 | 99.0 | | | |
| May 17, 2017 | SRT = 24 | 57.0 | 44.0 | 7.1 | | 657.2 | 38.7 | 18.8 |
| May 18, 2017 | Qr = 200 | 61.0 | 49.0 | 7.0 | | | | |
| May 19, 2017 | | 81.0 | 66.0 | 6.9 | | | | |
| May 20, 2017 | | 43.0 | 35.0 | 7.1 | 89.5 | | | |
| May 21, 2017 | | 114.0 | 88.0 | 6.9 | | 425.0 | 26.6 | 11.2 |
| May 22, 2017 | | 83.0 | 64.0 | 6.7 | | | | |
| May 23, 2017 | | 500.0 | 38.0 | 6.7 | | 548.2 | 27.4 | 14.4 |
| May 24, 2017 | Scenario 18 | 85.0 | 68.0 | 6.9 | 68.5 | | | |
| May 25, 2017 | H = 18 | 117.0 | 87.0 | 7.0 | | 585.2 | 27.9 | 16.3 |
| May 26, 2017 | S = 36 | 213.0 | 160.0 | 7.0 | | | | |
| May 27, 2017 | Qr = 200 | 232.0 | 174.0 | 7.0 | | | | |
| May 29, 2017 | | 117.0 | 90.0 | 7.0 | | | | |
| May 30, 2017 | | 101.0 | 75.0 | 6.8 | | | | |
| May 31, 2017 | | 95.0 | 72.0 | 7.1 | 97.5 | 652.3 | 36.2 | 21.7 |
| Jun. 1, 2017 | | 149.0 | 118.0 | 6.7 | | | 0.0 | |
| Jun. 2, 2017 | Scenario 19 | 312.0 | 253.0 | 6.5 | | | | |
| Jun. 3, 2017 | h = 12 | 147.0 | 115.0 | 6.9 | 105.5 | | | |
| Jun. 4, 2017 | s = 30 | 253.0 | 190.0 | 6.7 | | | | |
| Jun. 5, 2017 | Qr = 200 | 53.0 | 43.0 | 6.7 | | | | |
| Jun. 6, 2017 | | 176.0 | 128.0 | 7.0 | | 324.2 | 16.2 | 8.5 |
| Jun. 7, 2017 | | 288.0 | 219.0 | 7.0 | | | | |
| Jun. 8, 2017 | | 157.0 | 118.0 | 7.0 | | | | |
| Jun. 9, 2017 | | 232.0 | 176.0 | 7.2 | 137.5 | | | |
| Jun. 10, 2017 | | 399.0 | 323.0 | 7.1 | | 452.2 | 22.6 | 13.7 |
| Jun. 11, 2017 | RUN 20 | 678.0 | 515.0 | 6.8 | | | | |
| Jun. 12, 2017 | h = 12 | 985.0 | 788.0 | 6.7 | 96.5 | | | |
| Jun. 13, 2017 | s = 54 | 4780.0 | 3824.0 | 6.6 | | | | |
| Jun. 14, 2017 | Qr = 50 | 3540.0 | 2584.0 | 6.4 | | 128.5 | 5.8 | 3.6 |
| Jun. 15, 2017 | | 2790.0 | 2232.0 | 6.7 | 87.5 | | | |
| Jun. 16, 2017 | | 1190.0 | 893.0 | 6.4 | | | | |
| Jun. 17, 2017 | | 1970.0 | 1517.0 | 6.8 | | 445.5 | 20.3 | 14.4 |
| Jun. 18, 2017 | | 2390.0 | 1769.0 | 6.7 | 88.6 | | | |
| Jun. 19, 2017 | | 2360.0 | 1746.0 | 6.5 | | | | |
| Jun. 20, 2017 | | 2080.0 | 1581.0 | 6.4 | | 521.2 | 32.6 | 17.4 |
| Jun. 21, 2017 | | 2090.0 | 1588.0 | 6.7 | | | | |
| Jun. 22, 2017 | | 326.0 | 245.0 | 6.7 | 135.5 | | | |
| Jun. 23, 2017 | | 215.0 | 157.0 | 6.7 | | 412.5 | 21.7 | 11.8 |
| Jun. 24, 2017 | run 21 | 890.0 | 703.0 | 7.0 | | | | |
| Jun. 25, 2017 | H = 18 | 1270.0 | 965.0 | 6.4 | 152.5 | | | |
| Jun. 26, 2017 | S = 48 | 987.0 | 740.0 | 6.8 | | | | |
| Jun. 27, 2017 | Qr = 50 | 578.0 | 422.0 | 6.8 | | | | |
| Jun. 28, 2017 | | 286.0 | 217.0 | 6.6 | 113.8 | 745.5 | 39.2 | 22.6 |
| Jun. 29, 2017 | | 241.0 | 190.0 | 6.8 | | | | |
| Jun. 30, 2017 | | 266.0 | 215.0 | 6.8 | | | | |
| Jul. 1, 2017 | | 259.0 | 194.0 | 6.6 | 124.2 | | | |
| Jul. 2, 2017 | | 540.0 | 432.0 | 6.6 | | 255.4 | 15.0 | 8.0 |
| Jul. 3, 2017 | | 625.0 | 481.0 | 6.7 | | | | |
| Jul. 4, 2017 | | 340.0 | 258.0 | 6.5 | 87.5 | | | |
| Jul. 5, 2017 | | 410.0 | 299.0 | 6.4 | | | | |
| Jul. 6, 2017 | | 2630.0 | 1920.0 | 6.4 | | | | |
| Jul. 7, 2017 | | 6942.0 | 5484.0 | 7.1 | 125.7 | 985.2 | 61.6 | 26.6 |
| Jul. 8, 2017 | run 22 | 5037.0 | 3778.0 | 6.6 | | | | |
| Jul. 9, 2017 | h = 12 | 4727.0 | 3593.0 | 6.9 | 143.5 | | | |
| Jul. 10, 2017 | s = 54 | 3569.0 | 2855.0 | 6.6 | | | | |
| Jul. 11, 2017 | Qr = 100 | 8148.0 | 6111.0 | 6.8 | 135.8 | 324.2 | 16.2 | 8.5 |

-continued

| Date | run | | | | | | | |
|---|---|---|---|---|---|---|---|---|
| Jul. 12, 2017 | | 3068.0 | 2454.0 | 6.8 | | 258.2 | 12.9 | |
| Jul. 13, 2017 | | 9278.0 | 7051.0 | 6.4 | 96.1 | | | |
| Jul. 14, 2017 | | 9451.0 | 7372.0 | 6.8 | | | | |
| Jul. 15, 2017 | | 9330.0 | 7277.0 | 6.9 | 85.4 | 425.5 | 26.6 | 13.3 |
| Jul. 16, 2017 | | 7294.0 | 5471.0 | 6.6 | | | | |
| Jul. 17, 2017 | | 5311.0 | 3930.0 | 6.7 | 78.1 | | | |
| Jul. 18, 2017 | | 4783.0 | 3874.0 | 6.5 | | | | |
| Jul. 19, 2017 | | 5772.0 | 4271.0 | 6.6 | | | | |
| Jul. 20, 2017 | | 852.0 | 690.0 | 6.9 | 114.2 | 485.5 | 27.0 | 15.7 |
| Jul. 21, 2017 | | 1177.0 | 883.0 | 6.6 | | | | |
| Jul. 22, 2017 | | 2611.0 | 1932.0 | 6.8 | | | | |
| Jul. 23, 2017 | run 23 | 4107.0 | 3162.0 | 6.7 | 119.5 | | | |
| Jul. 24, 2017 | h = 18 | 4444.0 | 3511.0 | 6.8 | | | | |
| Jul. 25, 2017 | s = 54 | 1395.0 | 1018.0 | 6.8 | 135.2 | 596.7 | 39.8 | 16.6 |
| Jul. 26, 2017 | Qr = 200 | 1800.0 | 1422.0 | 6.8 | | | | |
| Jul. 27, 2017 | | 1844.0 | 1401.0 | 6.6 | | | | |
| Jul. 28, 2017 | | 1626.0 | 1236.0 | 6.7 | 79.3 | 652.4 | 34.3 | 22.5 |
| Jul. 29, 2017 | | 1821.0 | 1384.0 | 6.9 | | | | |
| Jul. 30, 2017 | | 638.0 | 472.0 | 6.9 | 148.9 | | | |
| Jul. 31, 2017 | | 4589.0 | 3488.0 | 6.8 | | 452.5 | 30.2 | 12.2 |
| Aug. 1, 2017 | | 1284.0 | 1002.0 | 6.7 | 152.1 | | | |
| Aug. 2, 2017 | | 1797.0 | 1438.0 | 6.9 | | | | |

| | Plug Flow Reactor Effluent | | | | | | |
|---|---|---|---|---|---|---|---|
| Date | sol. NH3, mg/L | NO2 + NO3, mg/L | sol. NO2 + NO3, mg/L | Mg, mg/L | TP, mg-P/L | sTP, mg-P/L | OrthoP, mg-P/L |
| Sep. 29, 2016 | | | | | | | |
| Sep. 30, 2016 | | | | | | | |
| Oct. 1, 2016 | | | | | | | |
| Oct. 2, 2016 | | | | | | | |
| Oct. 3, 2016 | | | | | | | |
| Oct. 4, 2016 | | | | | | | |
| Oct. 5, 2016 | | | | | | | |
| Oct. 6, 2016 | | | | | | | |
| Oct. 7, 2016 | | | | | | | |
| Oct. 8, 2016 | | | | | | | |
| Oct. 9, 2016 | | | | | | | |
| Oct. 10, 2016 | | | | | | | |
| Oct. 11, 2016 | | | | | | | |
| Oct. 12, 2016 | | | | | | | |
| Oct. 13, 2016 | | | | | | | |
| Oct. 14, 2016 | | | | | | | |
| Oct. 15, 2016 | | | | | | | |
| Oct. 16, 2016 | | | | | | | |
| Oct. 17, 2016 | | | | | | | |
| Oct. 18, 2016 | | | | | | | |
| Oct. 19, 2016 | | | | | | | |
| Oct. 20, 2016 | | | | | 50.1 | 46.1 | 46.3 |
| Oct. 21, 2016 | | | | | | | |
| Oct. 22, 2016 | | | | | | | |
| Oct. 23, 2016 | | | | | | | |
| Oct. 24, 2016 | | | | | 78.2 | 56.5 | 75.0 |
| Oct. 25, 2016 | | | | 31.0 | 188.0 | 67.5 | 56.6 |
| Oct. 26, 2016 | | | | | 133.9 | 60.8 | 59.5 |
| Oct. 27, 2016 | | | | | 131.0 | 59.6 | 58.3 |
| Oct. 28, 2016 | | | | 28.0 | 164.0 | 60.1 | 59.2 |
| Oct. 29, 2016 | | | | | | | 80.7 |
| Oct. 30, 2016 | | | | | | | |
| Oct. 31, 2016 | | | | | 175.0 | 80.1 | 75.4 |
| Nov. 1, 2016 | 40.1 | 0.4 | ND | 34.0 | 204.0 | | 62.8 |
| Nov. 2, 2016 | 33.4 | | | 36.3 | 135.0 | 56.7 | 63.3 |
| Nov. 3, 2016 | | | | 33.0 | 251.0 | 56.5 | 59.8 |
| Nov. 4, 2016 | 23.4 | 1.5 | <0.40 | | 219.0 | 59.3 | 58.7 |
| Nov. 5, 2016 | | | | 43.2 | | | 51.8 |
| Nov. 6, 2016 | | | | | | | 52.1 |
| Nov. 7, 2016 | 25.6 | | | 38.4 | 347.0 | 51.2 | 50.8 |
| Nov. 8, 2016 | | | | | 162.0 | 61.7 | 59.2 |
| Nov. 9, 2016 | | | | 33.3 | 141.0 | 49.9 | 69.4 |
| Nov. 10, 2016 | | | | | 348.0 | 86.5 | 84.2 |
| Nov. 11, 2016 | | | | 41.5 | 221.0 | 73.1 | 72.4 |
| Nov. 12, 2016 | | | | | | | |
| Nov. 13, 2016 | | | | | | | |
| Nov. 14, 2016 | 9.4 | 0.1 | 0.0 | 39.4 | 244.0 | 68.7 | 78.4 |
| Nov. 15, 2016 | | | | | 240.2 | | 38.8 |
| Nov. 16, 2016 | 10.9 | 0.0 | 0.0 | 41.2 | 291.0 | 67.6 | 65.9 |

-continued

| Date | | | | | | | |
|---|---|---|---|---|---|---|---|
| Nov. 17, 2016 | | | | | | | 46.1 |
| Nov. 18, 2016 | | | | 38.1 | 196.4 | 61.0 | 57.1 |
| Nov. 19, 2016 | 25.1 | | | | | | |
| Nov. 20, 2016 | | | | | 218.9 | 75.0 | 70.4 |
| Nov. 21, 2016 | | | | 33.7 | 180.4 | 62.1 | 58.6 |
| Nov. 22, 2016 | | | | | | | |
| Nov. 23, 2016 | | | | 35.7 | | | 56.8 |
| Nov. 24, 2016 | n/a | n/a | n/a | n/a | | n/a | n/a |
| Nov. 25, 2016 | n/a | n/a | n/a | n/a | | n/a | n/a |
| Nov. 26, 2016 | n/a | n/a | n/a | n/a | | n/a | n/a |
| Nov. 27, 2016 | | | | | | | |
| Nov. 28, 2016 | 26.4 | 0.0 | 0.0 | 37.9 | 186.7 | 69.4 | 67.4 |
| Nov. 29, 2016 | | | | | 204.5 | 103.4 | 98.7 |
| Nov. 30, 2016 | | | | | | | 103.1 |
| Dec. 1, 2016 | | | | 39.4 | 197.4 | 102.3 | 101.2 |
| Dec. 2, 2016 | | | | | | | 71.6 |
| Dec. 3, 2016 | 30.0 | 0.1 | 0.0 | | | | 81.2 |
| Dec. 4, 2016 | | | | 40.9 | 314.2 | 87.4 | 86.2 |
| Dec. 5, 2016 | | | | | | | |
| Dec. 6, 2017 | 25.3 | 0.0 | 0.0 | 45.2 | 317.4 | 113.4 | 112.3 |
| Dec. 7, 2017 | | | | | | | |
| Dec. 8, 2017 | 30.2 | 0.0 | 0.0 | 28.4 | 328.5 | 95.4 | 94.4 |
| Dec. 9, 2017 | | | | | | | |
| Dec. 10, 2017 | 14.3 | 0.0 | 0.0 | 30.7 | 310.5 | 103.1 | 101.3 |
| Feb. 27, 2017 | | | | | | | 56.8 |
| Feb. 28, 2017 | | | | 39.1 | | | 51.4 |
| Mar. 1, 2017 | | | | | | | |
| Mar. 2, 2017 | | | | 31.8 | 29.2 | 28.0 | 39.7 |
| Mar. 3, 2017 | 29.0 | 0.2 | | | | | |
| Mar. 4, 2017 | | | | 33.2 | | | 54.5 |
| Mar. 5, 2017 | | | | 35.4 | | | 51.0 |
| Mar. 6, 2017 | | | | | | | 36.2 |
| Mar. 7, 2017 | 28.1 | 0.0 | 0.0 | 30.3 | 32.0 | 25.4 | 54.0 |
| Mar. 8, 2017 | | | | | 48.5 | | 62.0 |
| Mar. 9, 2017 | | | | 32.5 | 36.9 | | 45.2 |
| Mar. 10, 2017 | | | | | | | 85.9 |
| Mar. 11, 2017 | 28.4 | 0.0 | 0.0 | 39.4 | 50.0 | | 81.4 |
| Mar. 12, 2017 | | | | | | | 105.0 |
| Mar. 13, 2017 | 29.8 | 0.0 | 0.0 | 40.5 | 87.5 | 70.2 | 64.3 |
| Mar. 14, 2017 | | | | 29.3 | | 28.6 | 35.6 |
| Mar. 15, 2017 | | | | | | | 79.4 |
| Mar. 16, 2017 | 23.4 | 0.0 | 0.0 | 29.3 | 45.2 | | 64.7 |
| Mar. 17, 2017 | 24.5 | 0.0 | 0.0 | | | | |
| Mar. 18, 2017 | | | | 38.4 | 86.4 | | |
| Mar. 19, 2017 | | | | | | | 90.2 |
| Mar. 20, 2017 | | | | 39.2 | 75.4 | 91.2 | 88.4 |
| Mar. 21, 2017 | | | | | | | 84.6 |
| Mar. 22, 2017 | 27.4 | 0.1 | 0.0 | 36.7 | 84.2 | 96.4 | 94.2 |
| Mar. 23, 2017 | | | | | | | 97.1 |
| Mar. 24, 2017 | | | | 42.1 | 78.5 | 91.1 | 87.7 |
| May 1, 2017 | 0.0 | | | 50.0 | 88.0 | 60.2 | 60.2 |
| May 2, 2017 | 20.8 | 0.0 | 0.0 | | 84.2 | | |
| May 3, 2017 | | | | | | | |
| May 4, 2017 | | | | 33.0 | 94.2 | | |
| May 5, 2017 | 22.1 | 0.0 | 0.0 | | | 71.1 | 79.0 |
| May 6, 2017 | | | | | | | 88.5 |
| May 7, 2017 | | | | 32.0 | 75.5 | 84.1 | 80.9 |
| May 8, 2017 | 18.4 | 0.0 | 0.0 | | | | 76.3 |
| May 9, 2017 | | | | | | | |
| May 10, 2017 | 23.9 | 0.0 | 0.0 | 36.0 | 53.4 | 138.5 | 133.2 |
| May 11, 2017 | 17.2 | 0.0 | 0.0 | | | | |
| May 12, 2017 | 21.9 | 0.0 | 0.0 | 29.0 | 480.0 | 73.5 | 68.1 |
| May 13, 2017 | 13.5 | 0.0 | 0.0 | | | | 73.0 |
| May 14, 2017 | | | | | | | |
| May 15, 2017 | 11.9 | 0.2 | 0.0 | 49.0 | 96.4 | 46.6 | 54.8 |
| May 16, 2017 | | | | 45.0 | | | 70.0 |
| May 17, 2017 | 18.4 | 0.1 | 0.0 | 48.0 | 79.5 | | |
| May 18, 2017 | | | | | | 65.1 | 70.0 |
| May 19, 2017 | | | | | | | 81.2 |
| May 20, 2017 | | | | | | 71.1 | 68.4 |
| May 21, 2017 | 10.6 | 0.1 | 0.0 | 30.0 | 87.0 | | 79.3 |
| May 22, 2017 | | | | | | | 164.0 |
| May 23, 2017 | 13.8 | 0.0 | 0.0 | 50.0 | 81.0 | 72.6 | 83.4 |
| May 24, 2017 | | | | | | | 199.7 |
| May 25, 2017 | 15.5 | 0.0 | 0.0 | 49.0 | 92.0 | 106.6 | 128.4 |
| May 26, 2017 | | | | | | | 79.8 |
| May 27, 2017 | | | | | | | 155.2 |
| May 29, 2017 | | | | | | | |
| May 30, 2017 | | | | | | | |

-continued

| Date | | | | | | | |
|---|---|---|---|---|---|---|---|
| May 31, 2017 | 21.9 | 0.0 | 0.0 | 40.0 | 81.0 | | 89.7 |
| Jun. 1, 2017 | | | | | | | |
| Jun. 2, 2017 | | | | | | 101.1 | 105.3 |
| Jun. 3, 2017 | | | | | | | 107.9 |
| Jun. 4, 2017 | | | | | | | 96.4 |
| Jun. 5, 2017 | | | | | | | |
| Jun. 6, 2017 | 7.8 | 0.2 | 0.0 | 50.0 | 101.0 | 84.6 | 84.6 |
| Jun. 7, 2017 | | | | | | | |
| Jun. 8, 2017 | | | | | | | 116.2 |
| Jun. 9, 2017 | | | | | | 106.7 | 108.9 |
| Jun. 10, 2017 | 14.2 | 0.0 | 0.0 | 29.0 | 77.0 | | |
| Jun. 11, 2017 | | | | | | | |
| Jun. 12, 2017 | | | | | | | 137.5 |
| Jun. 13, 2017 | | | | | | 115.5 | 140.8 |
| Jun. 14, 2017 | 3.6 | 0.0 | 0.0 | 47.1 | 95.0 | | |
| Jun. 15, 2017 | | | | | | 140.3 | 144.6 |
| Jun. 16, 2017 | | | | | | | 112.8 |
| Jun. 17, 2017 | 14.4 | 0.0 | 0.0 | 38.2 | 94.0 | | |
| Jun. 18, 2017 | | | | | | | |
| Jun. 19, 2017 | | | | | | | 139.8 |
| Jun. 20, 2017 | 16.0 | 0.0 | 0.0 | 46.2 | 100.0 | 126.2 | 137.2 |
| Jun. 21, 2017 | | | | | | | 138.9 |
| Jun. 22, 2017 | | | | | | | |
| Jun. 23, 2017 | 12.0 | 0.0 | 0.0 | 29.0 | 90.0 | 108.2 | 97.5 |
| Jun. 24, 2017 | | | | | | | 101.4 |
| Jun. 25, 2017 | | | | | | | |
| Jun. 26, 2017 | | | | | | 159.2 | 159.2 |
| Jun. 27, 2017 | | | | | | | 119.8 |
| Jun. 28, 2017 | 21.0 | 0.0 | 0.0 | 32.0 | 91.0 | | |
| Jun. 29, 2017 | | | | | | | 134.1 |
| Jun. 30, 2017 | | | | | | 132.7 | 139.7 |
| Jul. 1, 2017 | | | | | | | 74.6 |
| Jul. 2, 2017 | 6.9 | 0.0 | 0.0 | 42.0 | 102.0 | 111.0 | 105.7 |
| Jul. 3, 2017 | | | | | | 47.9 | 56.4 |
| Jul. 4, 2017 | | | | | | | |
| Jul. 5, 2017 | | | | | | | |
| Jul. 6, 2017 | | | | | | | 89.4 |
| Jul. 7, 2017 | 26.6 | 0.0 | 0.0 | 29.0 | 98.0 | 67.9 | 64.1 |
| Jul. 8, 2017 | | | | | | | |
| Jul. 9, 2017 | | | | | | | 86.4 |
| Jul. 10, 2017 | | | | | | 113.0 | 109.7 |
| Jul. 11, 2017 | 8.8 | 0.0 | 0.0 | 49.5 | 81.0 | 84.9 | 78.6 |
| Jul. 12, 2017 | | | | | | | 83.9 |
| Jul. 13, 2017 | | | | | | 85.1 | 89.6 |
| Jul. 14, 2017 | | | | | | | |
| Jul. 15, 2017 | 13.0 | 0.0 | 0.0 | 55.4 | 98.0 | 105.5 | 114.7 |
| Jul. 16, 2017 | | | | | | | 68.1 |
| Jul. 17, 2017 | | | | | | | 51.2 |
| Jul. 18, 2017 | | | | | | | |
| Jul. 19, 2017 | | | | | | | |
| Jul. 20, 2017 | 14.3 | 0.0 | 0.0 | 39.4 | 101.0 | | |
| Jul. 21, 2017 | | | | | | 46.0 | 48.4 |
| Jul. 22, 2017 | | | | | | | |
| Jul. 23, 2017 | | | | | | 64.5 | 76.8 |
| Jul. 24, 2017 | | | | | | | 68.6 |
| Jul. 25, 2017 | 16.1 | 0.0 | 0.0 | 48.5 | 77.0 | | |
| Jul. 26, 2017 | | | | | | 93.9 | 94.8 |
| Jul. 27, 2017 | | | | | | | |
| Jul. 28, 2017 | 20.3 | 0.0 | 0.0 | 47.2 | 97.0 | 113.2 | 124.4 |
| Jul. 29, 2017 | | | | | | | 119.7 |
| Jul. 30, 2017 | | | | | | | |
| Jul. 31, 2017 | 11.3 | 0.0 | 0.0 | 40.5 | 85.0 | 136.4 | 136.4 |
| Aug. 1, 2017 | | | | | | | 132.2 |
| Aug. 2, 2017 | | | | | | 145.6 | 131.2 |

| | | Complete Mix Reactor Effluent | | | | | | | |
|---|---|---|---|---|---|---|---|---|---|
| Date | Scenario | Actual HRT & SRT, Hr | T, F | TSS, mg/L | VSS, mg/L | pH | ORP | VFA, mg-HAc/L | TKN, mg/L | sol. TKN, mg/l |
| Oct. 20, 2016 | | 23.5 | 71 | | | | | | | |
| Oct. 21, 2016 | | 24.5 | 75 | | | | | | | |
| Oct. 22, 2016 | | 24.4 | 78 | | | | | | | |
| Oct. 23, 2016 | | 24.4 | | | | | | | | |

| Complete Mix Reactor Effluent | | | | | | | | | |
|---|---|---|---|---|---|---|---|---|---|
| Oct. 24, 2016 | scenario 1: 24 | 25.9 | 72 | | | | | | |
| Oct. 25, 2016 | | 20.6 | 71 | 8,880 | 6,100 | | | | |
| Oct. 26, 2016 | | 23.1 | 68 | | | | | 101.5 | 773 | 49.5 |
| Oct. 27, 2016 | | 22.5 | 69 | | | | | | |
| Oct. 28, 2016 | | 22.1 | 68 | | | | | 97.5 | 801 | 39.4 |
| Oct. 29, 2016 | | 16.1 | | | | | | | |
| Oct. 30, 2016 | | 16.0 | 71 | | | | | | |
| Oct. 31, 2016 | | 16.7 | | 7,200 | 6,400 | | | 94.4 | 656 | 75.3 |
| Nov. 1, 2016 | | 15.2 | | | | 7 | −207 | | 615 | 34.5 |
| Nov. 2, 2016 | scenario 2: 16 | 15.1 | 74 | 8,300 | 6,800 | 7 | −220 | | |
| Nov. 3, 2016 | | 20.3 | 73 | | | 7 | −209 | 34.3 | 708 | 31.9 |
| Nov. 4, 2016 | | 16.0 | 74 | 9,320 | 7,260 | 7 | −198 | | |
| Nov. 5, 2016 | | 15.3 | 75 | | | 7 | −205 | | 1910 | 18.5 |
| Nov. 6, 2016 | | 15.1 | 72 | 8,600 | 7,100 | 7 | −178 | | |
| Nov. 7, 2016 | | 11.3 | 74 | 8,520 | | 8 | | | 537.2 | 40.9 |
| Nov. 8, 2016 | | 12.7 | | 9,500 | 7,000 | 7 | −194 | 89 | |
| Nov. 9, 2016 | | 12.6 | | 8,940 | | 7 | | | |
| Nov. 10, 2016 | scenario 3: 12 | 13.0 | 72 | 9,670 | | 7 | −182 | | 530.8 | 37.2 |
| Nov. 11, 2016 | | 13.2 | 73 | | | | | 86.4 | |
| Nov. 12, 2016 | | 13.6 | | 8,200 | | | | | |
| Nov. 13, 2016 | | 12.2 | | 7,700 | 6,500 | 7 | −169 | | 643 | 18.9 |
| Nov. 14, 2016 | | 12.6 | 75 | | | 7 | −158 | 77.3 | |
| Nov. 15, 2016 | | 11.7 | 74 | 6,400 | 4,800 | 7 | −163 | 112.6 | 498 | 24.4 |
| Nov. 16, 2016 | | 6.2 | 75 | | | | | | |
| Nov. 17, 2016 | | 5.6 | 76 | | | | | | 584.2 | 43.7 |
| Nov. 18, 2016 | | 5.9 | | 9,850 | 7,280 | | −140 | 86.1 | |
| Nov. 19, 2016 | Scenario 4: 6 | 6.1 | | | | 7 | −155 | | |
| Nov. 20, 2016 | | 6.1 | 74 | | | | | | |
| Nov. 21, 2016 | | 6.0 | 76 | 10,020 | 7,890 | 7 | −178 | | 610.5 | 45.8 |
| Nov. 22, 2016 | | 6.2 | 72 | | | 7 | −168 | | |
| Nov. 23, 2016 | | 34.8 | | | | 7 | | 124.2 | 620.6 | 46.2 |
| Nov. 24, 2016 | | 38.8 | 75 | | n/a | n/a | n/a | | |
| Nov. 25, 2016 | | 35.0 | 75 | | n/a | n/a | n/a | | |
| Nov. 26, 2016 | | 35.5 | 73 | | n/a | n/a | n/a | | |
| Nov. 27, 2016 | | 35.4 | 75 | | | | | | |
| Nov. 28, 2016 | Scenario 5: 36 | 35.9 | 71 | 8,920 | 7,260 | 7 | −185 | 114.6 | 549.5 | 41.2 |
| Nov. 29, 2016 | | 37.3 | 76 | | | | | | |
| Nov. 30, 2016 | | 36.6 | 76 | 10,320 | 8,340 | 7 | −195 | | |
| Dec. 1, 2016 | | 36.0 | 74 | | | 7 | | 108.4 | 614.8 | 44.9 |
| Dec. 2, 2016 | | 47.4 | 73 | 10,030 | 7,890 | | | | |
| Dec. 3, 2016 | | 48.8 | 76 | | | 7 | −212 | | |
| Dec. 4, 2016 | | 47.5 | 76 | 10,300 | 8,140 | 7 | −224 | 139.7 | 600.1 | 44.1 |
| Dec. 5, 2016 | | 48.2 | 72 | | | 7 | −214 | | |
| Dec. 6, 2017 | Scenario 6: 48 | 47.6 | 75 | 10,950 | 8,540 | | | 142.1 | |
| Dec. 7, 2017 | | 47.7 | 75 | 11,040 | 8,800 | 7 | −234 | | |
| Dec. 8, 2017 | | 48.0 | 73 | | | | | | 579.4 | 43.7 |
| Dec. 9, 2017 | | 49.1 | 68 | 9,870 | 7,740 | 7 | −228 | 140.8 | |
| Dec. 10, 2017 | | 47.8 | 70 | 10,430 | 8,120 | | | | |

| Date | NH3, mg/L | sol. NH3, mg/L | NO2 + NO3, mg/L | sol. NO2 + NO3, mg/L | Mg, mg/L | TP, mg-P/L | sTP, mg-P/L | OrthoP, mg-P/L |
|---|---|---|---|---|---|---|---|---|
| Oct. 20, 2016 | | | | | | | | 52.1 |
| Oct. 21, 2016 | | | | | | | | |
| Oct. 22, 2016 | | | | | | | | 49.7 |
| Oct. 23, 2016 | | | | | | 182 | 55.7 | 46 |
| Oct. 24, 2016 | | | | | | | | 48.5 |
| Oct. 25, 2016 | | | | | 33.4 | 187 | 59.7 | 55.5 |
| Oct. 26, 2016 | 13.6 | 12.2 | 0 | 0 | | | | 56 |
| Oct. 27, 2016 | | | | | | | | 58.1 |
| Oct. 28, 2016 | 12.1 | 10.7 | ND | 0 | 30.9 | | | |
| Oct. 29, 2016 | | | | | | 229 | 94.1 | 58.275 |
| Oct. 30, 2016 | | | | | | | | |
| Oct. 31, 2016 | 25.4 | 24.6 | ND | 0 | 36.9 | 231 | 96.3 | 60 |
| Nov. 1, 2016 | | | | | 37.1 | 186 | 60.5 | 51.28 |
| Nov. 2, 2016 | | | | | 33.5 | 200 | 49.8 | 45.12 |
| Nov. 3, 2016 | 34.7 | 33.7 | 0 | 0 | | | 70 | 47.5 |
| Nov. 4, 2016 | | | | | 28.4 | | | 51.8 |
| Nov. 5, 2016 | 15.2 | 12.7 | | | | | | 42.3 |

-continued

| | | | | | | | | |
|---|---|---|---|---|---|---|---|---|
| Complete Mix Reactor Effluent | | | | | | | | |
| Nov. 6, 2016 | | | | | 31.8 | | | 57.1 |
| Nov. 7, 2016 | 10.4 | 9.7 | 0 | 0 | | 208 | 59.7 | 45.3 |
| Nov. 8, 2016 | | | | | | 218 | 57.4 | 44.9 |
| Nov. 9, 2016 | | | | | 35.4 | 211 | 53.5 | 52.8 |
| Nov. 10, 2016 | 9.7 | 22.36 | 0 | 0 | | | | 40.8 |
| Nov. 11, 2016 | | | | | 32.4 | | | 41.7 |
| Nov. 12, 2016 | | | | | | | | |
| Nov. 13, 2016 | 15.5 | 14.8 | 0 | 0 | | 219 | 66 | 37.2 |
| Nov. 14, 2016 | | | | | | | | 38.2 |
| Nov. 15, 2016 | 8.83 | 8.53 | 0 | 0 | 35.9 | 167 | 44.3 | 41.9 |
| Nov. 16, 2016 | | | | | | | | 19.4 |
| Nov. 17, 2016 | 9.5 | 8.7 | 0 | 0 | | | | 18.6 |
| Nov. 18, 2016 | | | | | 39.1 | 255.24 | 14.8 | 13.2 |
| Nov. 19, 2016 | | | | | | | | 11.8 |
| Nov. 20, 2016 | | | | | | | | 16.3 |
| Nov. 21, 2016 | 7.9 | 7.6 | 0.2 | 0 | 34 | 258 | 15.4 | 15.5 |
| Nov. 22, 2016 | | | | | | | | 13.8 |
| Nov. 23, 2016 | 9.3 | 9.1 | 0 | 0 | 36.7 | | | 48.2 |
| Nov. 24, 2016 | | | | | | | | |
| Nov. 25, 2016 | | | | | | | | |
| Nov. 26, 2016 | | | | | | | | |
| Nov. 27, 2016 | | | | | | | | |
| Nov. 28, 2016 | 7.4 | 7 | 0 | 0 | 46.1 | 191.7 | 60.7 | 58.7 |
| Nov. 29, 2016 | | | | | | | | 75.6 |
| Nov. 30, 2016 | | | | | | 254.1 | 64.1 | 76.4 |
| Dec. 1, 2016 | 10.4 | 9.4 | 0 | 0 | 34.2 | | | 89 |
| Dec. 2, 2016 | | | | | | 267.1 | 64.6 | 59.4 |
| Dec. 3, 2016 | | | | | | | | 70.2 |
| Dec. 4, 2016 | 6.5 | 6.1 | 0 | 0 | 49.5 | 234.1 | 78.1 | 74.5 |
| Dec. 5, 2016 | | | | | | | | |
| Dec. 6, 2017 | | | | | 48.1 | 261.4 | 90.1 | 86.7 |
| Dec. 7, 2017 | | | | | | | | |
| Dec. 8, 2017 | 12.4 | 11.2 | 0 | 0 | 33.4 | 290.1 | 84.3 | 82.4 |
| Dec. 9, 2017 | | | | | | | | |
| Dec. 10, 2017 | | | | | | | | 87.6 |

What is claimed is:

1. A wastewater treatment system comprising:
a plug flow reactor having at least two zones;
an influent stream into the reactor, wherein the influent stream comprises a waste activated sludge and/or activated sludge mixed liquor; and
an effluent stream out of the reactor;
wherein the reactor is configured to decouple hydraulic retention time and solids retention time of the reactor and provides removal of phosphorus and/or magnesium from the influent stream, wherein the phosphorus and/or magnesium is released from phosphorus accumulating organisms without digesting the organisms.

2. The system of claim 1, wherein the zones are configured to facilitate phosphorus and/or magnesium removal.

3. The system of claim 1, wherein a first one of the zones allows concurrent thickening and denitrification; a second one of the zones allows thickening, volatile fatty acid production, and/or phosphorus and/or magnesium release; and a third one of the zones allows solids separation.

4. The system of claim 1, wherein the reactor further comprising baffles or walls which separate the zones.

5. The system of claim 1, further comprising a means for mixing located within the reactor, wherein said mixing occurs intermittently so as to not disrupt the plug-flow profile of the reactor, and wherein said mixing occurs at a shear rate of from about 10 $s^{-1}$ to about 50 $s^{-1}$.

6. The system of claim 1, further comprising a reactor float, wherein the reactor float is configured to remove solids from the top of any combination of the zones.

7. The system of claim 1, further comprising a solids recycle stream exiting the reactor, wherein the solids recycle stream is configured to remove solids separated from at least one of the zones of the reactor, and wherein the solids recycle streams is configured to convey higher concentration solids to one of the zones of the reactor.

8. The system of claim 7, wherein the solids recycle stream further comprising a solids recycle pump, wherein the solids recycle pump is sized from about 0% to 200% of a desired reactor flow rate.

9. The system of claim 1 further comprising an additional zone for further treatment of the effluent stream.

10. The system of claim 9 wherein the additional zone is a phosphorus recovery zone.

11. The system of claim 9 wherein the additional zone is a solids thickening zone.

12. The system of claim 9 wherein the additional zone is a solids separation zone.

13. A wastewater treatment system for removing phosphorus, comprising:
a plug flow reactor with an inlet and an outlet;
walls within the reactor to form first, second and third treatment zones;
the first treatment zone receiving wastewater via the inlet and adapted to thicken and denitrify the wastewater;
the second treatment zone receiving wastewater from the first zone and adapted to release phosphorus, wherein the phosphorus is released from phosphorus accumulating organisms without digesting the organisms;
the third treatment zone receiving wastewater from the second zone and adapted to separate solids from the wastewater; and
a float to remove the solids from the reactor,
wherein the wastewater comprises waste activated sludge and/or activated sludge mixed liquor.

14. The wastewater treatment system of claim 13 further comprising a mixer in one of the zones to mix the wastewater.

15. The wastewater treatment system of claim 13 further comprising a pump associated with the third zone to recycle the separated solids back to the first zone for further treatment.

16. The wastewater treatment system of claim 13 further comprising a control system to control flow of wastewater from each of the zones.

17. The wastewater treatment system of claim 13 further comprising first, second and third pumps connected to the first, second, and third zones, respectively, for pumping solids from the respective zones.

18. The wastewater treatment system of claim 13 further comprising an influent pump associated with the first zone, an effluent pump associated with the third zone, a recycle pump between the third and first zones, and a float pump associated with at least one of the zones.

19. The wastewater treatment system of claim 13 wherein the walls form a serpentine path through the zones.

* * * * *